April 12, 1927.

E. H. CLARK 1,624,540

TESTING DEVICE FOR TESTING REGISTER SENDERS

Filed June 29, 1925   44 Sheets-Sheet 1

Fig.1.

Inventor:
Edgar H. Clark
by E. W. Adams Att'y.

April 12, 1927.

E. H. CLARK 1,624,540

TESTING DEVICE FOR TESTING REGISTER SENDERS

Filed June 29, 1925     44 Sheets-Sheet 5

Fig. 5.

Inventor:
Edgar H. Clark
by    Atty.

E. H. CLARK 1,624,540

TESTING DEVICE FOR TESTING REGISTER SENDERS

Filed June 29, 1925 44 Sheets-Sheet 10

Inventor:
Edgar H. Clark
by E.W. Adams Att'y.

April 12, 1927.

E. H. CLARK 1,624,540

TESTING DEVICE FOR TESTING REGISTER SENDERS

Filed June 29, 1925     44 Sheets-Sheet 19

Fig. 19.

Inventor:
Edgar H. Clark
by   E. W. Adams   Att'y.

April 12, 1927.  
E. H. CLARK  
1,624,540  
TESTING DEVICE FOR TESTING REGISTER SENDERS  
Filed June 29, 1925  
44 Sheets-Sheet 34

Fig. 34.

Inventor:  
Edgar H. Clark  
by ℰ.W.Adams Att'y

April 12, 1927.

E. H. CLARK 1,624,540

TESTING DEVICE FOR TESTING REGISTER SENDERS

Filed June 29, 1925   44 Sheets-Sheet 36

Fig.36.

Inventor:
Edgar H. Clark
by ⎯⎯⎯⎯ Atty.

April 12, 1927.

E. H. CLARK 1,624,540

TESTING DEVICE FOR TESTING REGISTER SENDERS

Filed June 29, 1925   44 Sheets-Sheet 41

Inventor:
Edgar H. Clark
by E.W. Adams, Atty

April 12, 1927.  E. H. CLARK  1,624,540
TESTING DEVICE FOR TESTING REGISTER SENDERS
Filed June 29, 1925   44 Sheets-Sheet 44

Inventor
Edgar H. Clark
by _____ Atty.

Patented Apr. 12, 1927.

1,624,540

UNITED STATES PATENT OFFICE.

EDGAR H. CLARK, OF RICHMOND HILL, NEW YORK, ASSIGNOR TO WESTERN ELECTRIC COMPANY, INCORPORATED, OF NEW YORK, N. Y., A CORPORATION OF NEW YORK.

TESTING DEVICE FOR TESTING REGISTER SENDERS.

Application filed June 29, 1925. Serial No. 40,262.

This invention relates to telephone exchange systems and more particularly to testing apparatus for testing portions of such systems.

In all large metropolitan areas, in order to save trunking one or more offices known as tandem offices are provided for the purpose of connecting together other offices. Since no local connections are established, these offices are provided with means for recording and retransmitting the designation of the wanted subscriber. Due to the great number of offices in metropolitan areas and the impossibility of simultaneously changing the equipment at all offices, a condition arises where some offices are provided with apparatus of a different character from that of later established offices. It therefore becomes necessary to provide the tandem office with equipment which will respond to all types of outlying offices. During the experimental stage of machine switching operation a portion of the equipment was tried out under what is known as semi-mechanical conditions. These semi-mechanical offices are still in use, having not been replaced as yet by the later or full mechanical equipment. A tandem office is therefore supplied with register senders which operate in connection with full mechanical senders and other senders which operate in connection with semi-mechanical senders. It is therefore obvious that at some time the semi-mechanical offices will be converted into full mechanical offices and that the necessity of the senders at the tandem office to work with the semi-mechanical senders will disappear. However, during the time that the senders are in use it is necessary that they be kept in perfect working condition as is of course true of senders to work with the full mechanical offices. It is desirable, therefore, to provide a test set to test senders for correct operation.

Since the use of semi-mechanical senders will not continue for an extremely long period of time, it is not advisable to provide special testing apparatus for these senders, and a sender testing apparatus has been arranged which will test incoming from full mechanical and incoming from semi-mechanical senders. The chief difference between incoming from full mechanical senders and incoming from semi-mechanical senders lies in the manner in which the registrations of the wanted number is carried out. The manner of controlling selections at the distant office is essentially the same in the two types of senders.

It is an object of the present invention to provide a sender testing arrangement which will test senders of different types.

A feature of the invention lies in means for causing the registration of numbers in a plurality of different manners and means for discriminating between the manner of registration in accordance with the type of apparatus upon which said registration is to be set up.

Another feature of the invention lies in means for controlling the registration of a designation at a sender and for checking such registrations on the same apparatus and means for controlling the connections to such apparatus to discriminate between the receiving and setting functions.

In the drawings, Figs. 1 to 25, and 29 to 31 show a test set of the present invention.

Figs. 26, 27, 28, 32, 33 and 34 show an incoming from semi-mechanical sender.

Figs. 35 to 44 show an incoming from full mechanical sender.

Fig. 45 shows the arrangement of the other figures to constitute a clear disclosure of the present invention.

Figs. 1 and 2 show transfer relays which direct the relay call indicator pulses from the sender under test to the proper test set register.

Figs. 3, 9, 13, 14, 18, 19, 22, 23 and portions of Figs. 4, 10, 20 and 24 show the registers for controlling the setting of the sender registers.

Figure 4:
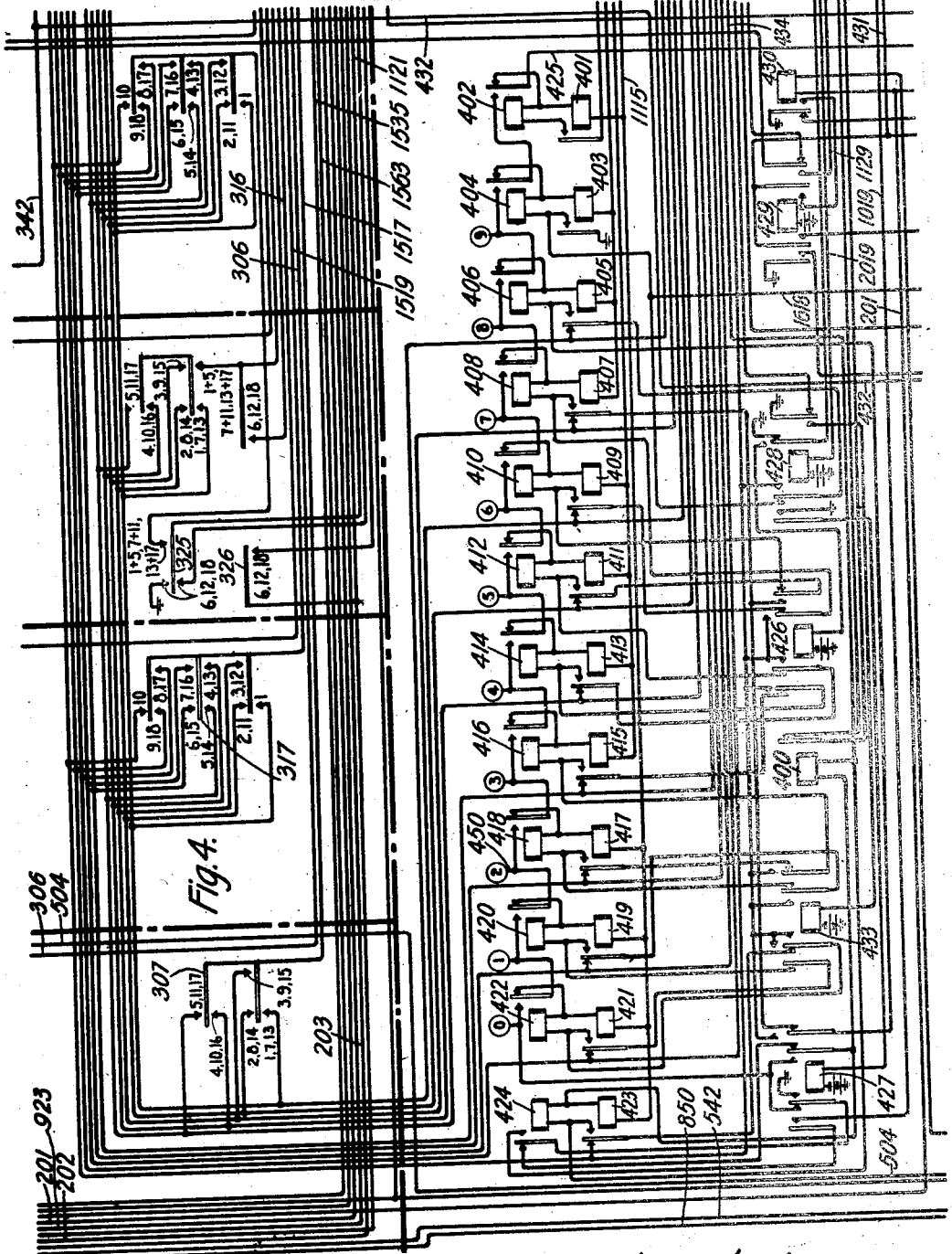

Fig. 4 shows a group of counting relays and certain control relays which are employed in checking the operation of the sender and in priming the semi-mechanical sender.

Fig. 5 shows a class sequence switch for controlling the various operations in accordance with the class of call to be simulated.

Figure 6:
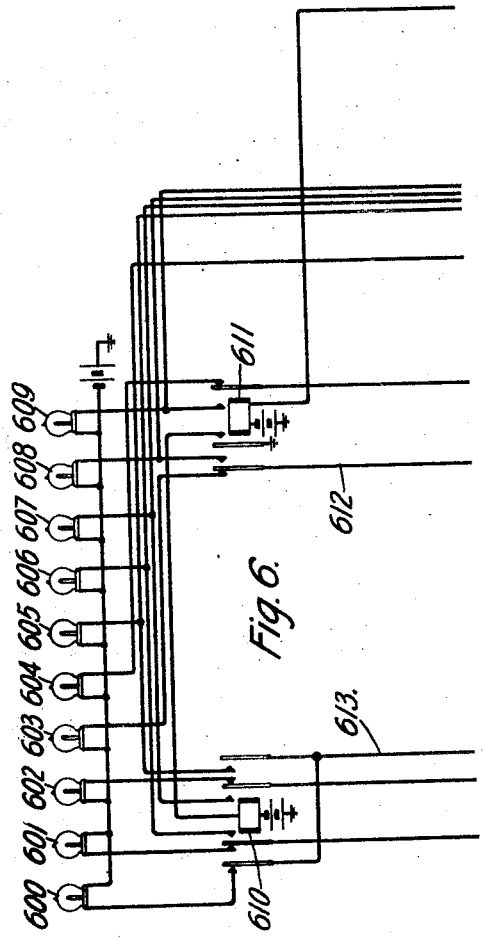

Fig. 6 shows a group of lamps which are operated when the sender fails to send out the correct call indicator pulses.

Figure 7:
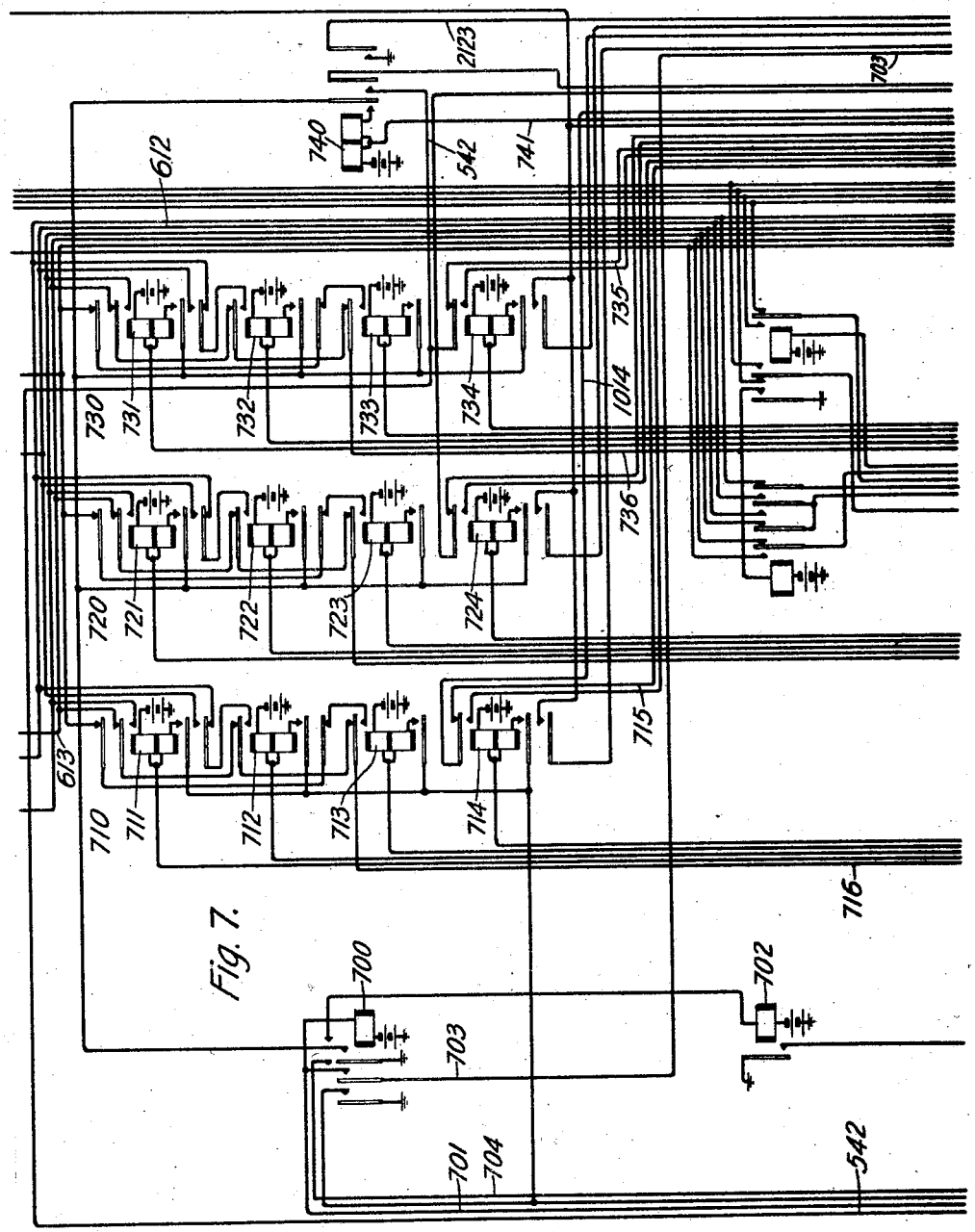
Figure 8:
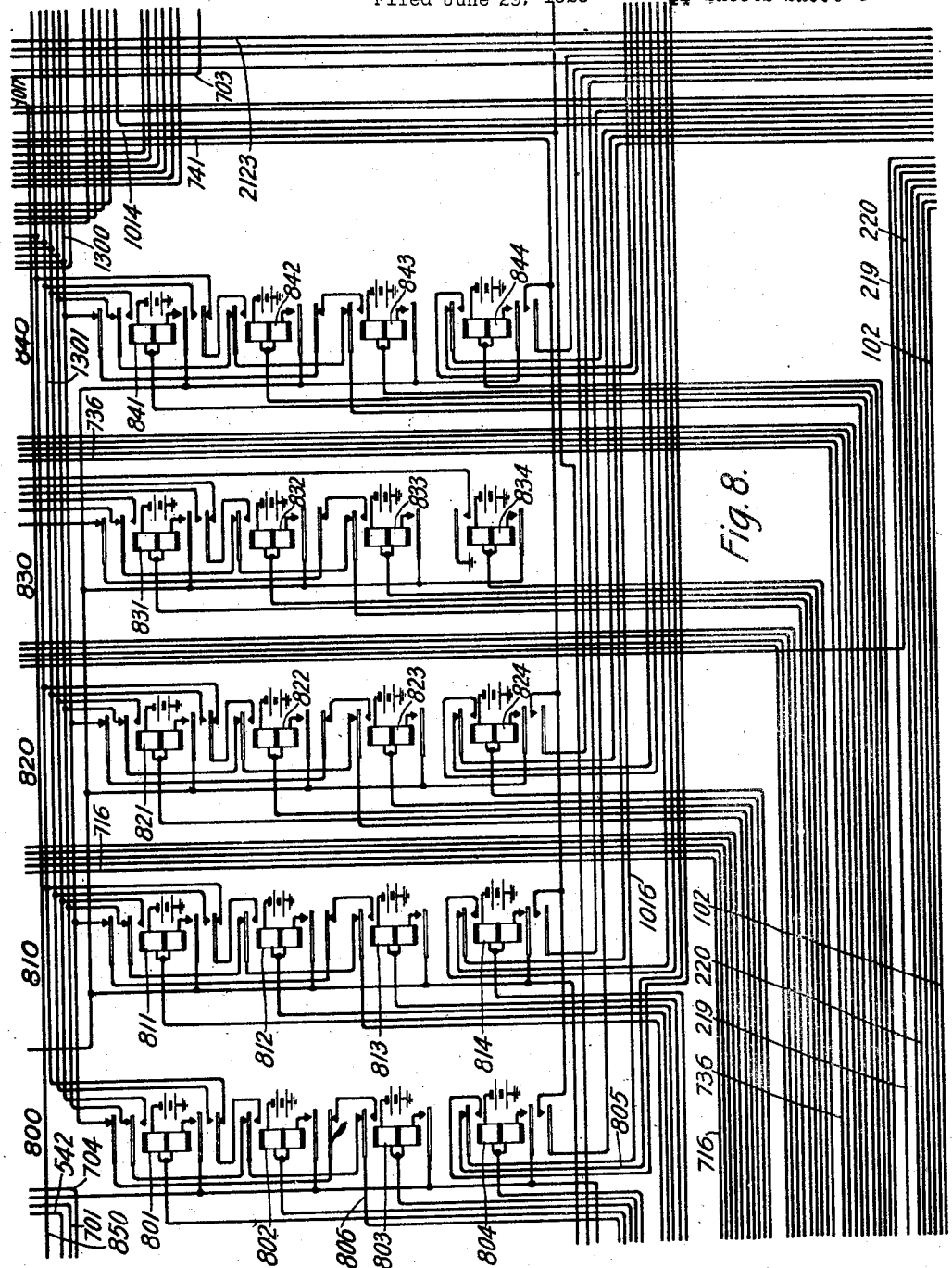

Figs. 7 and 8 show the registers for receiving call indicator pulses from the sender.

Figure 10:
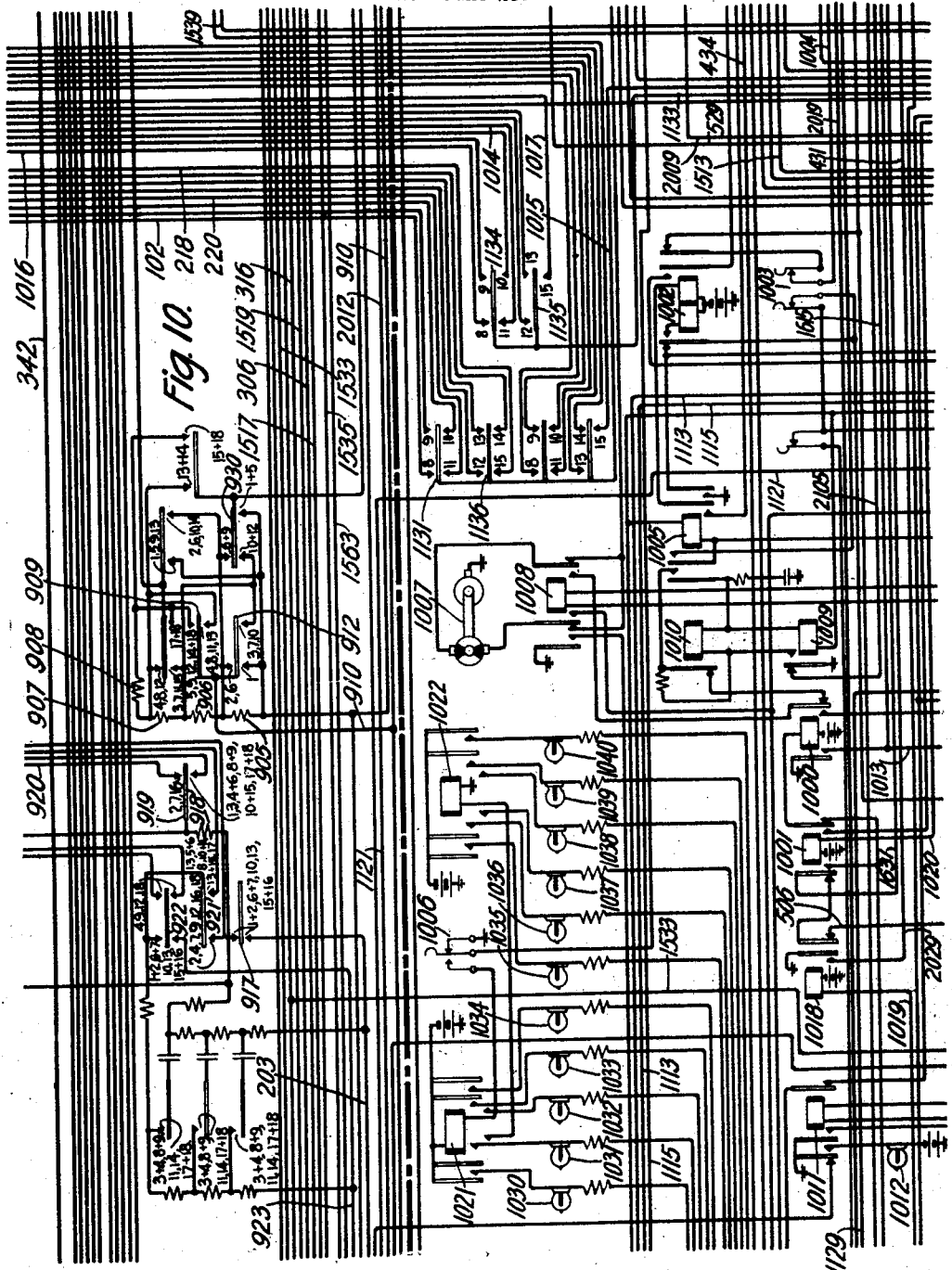
Figure 11:
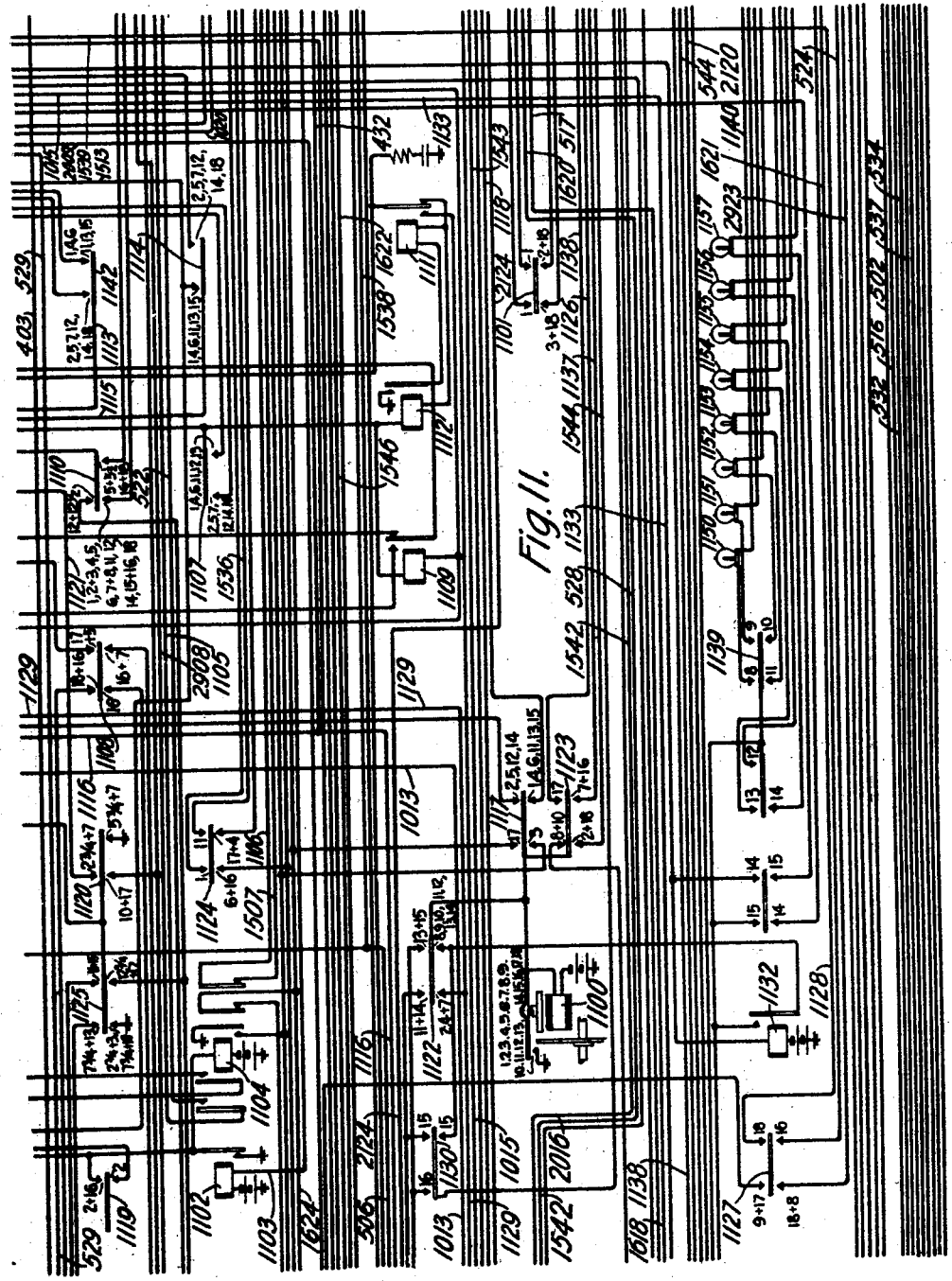
Figure 12:
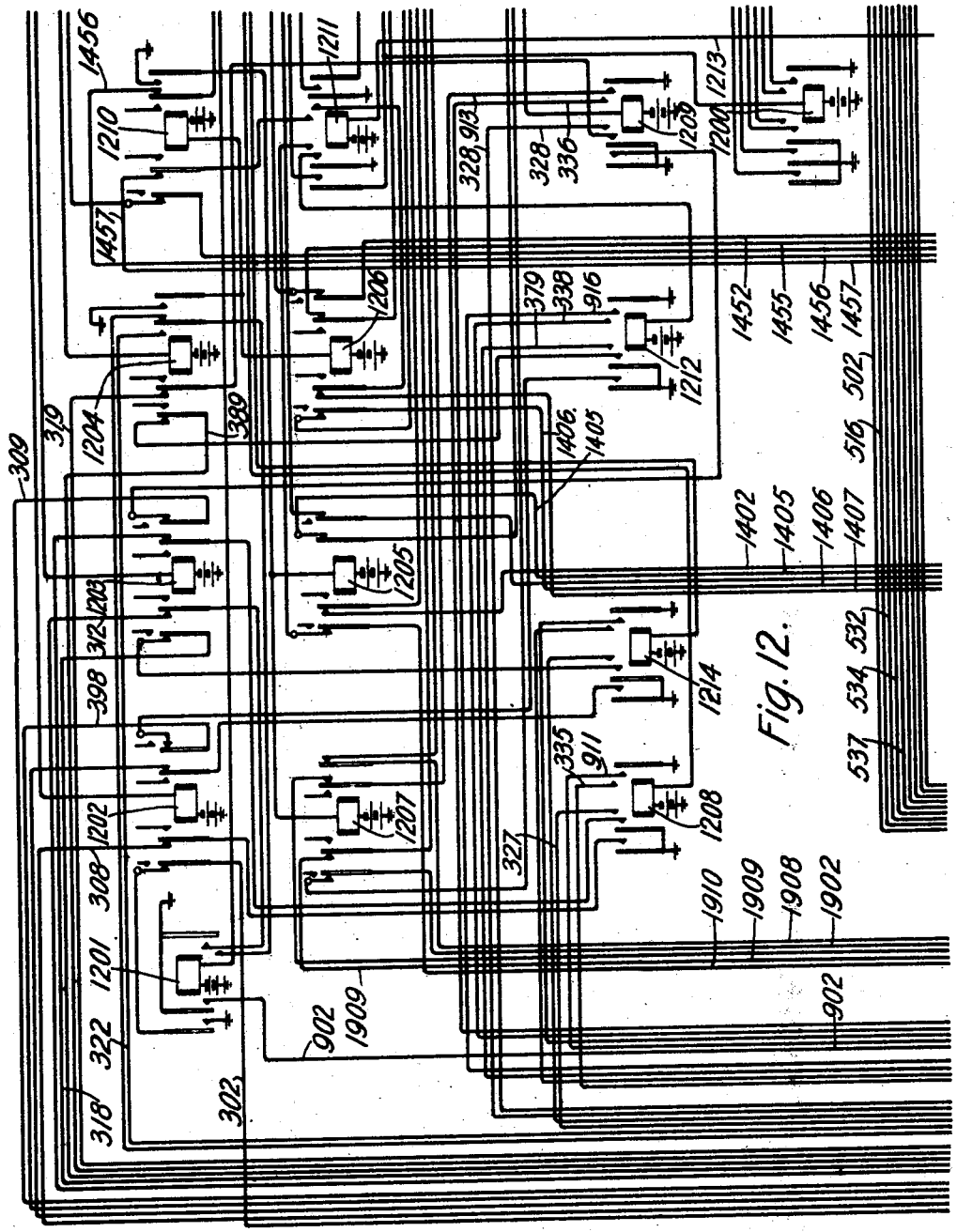
Figure 13:
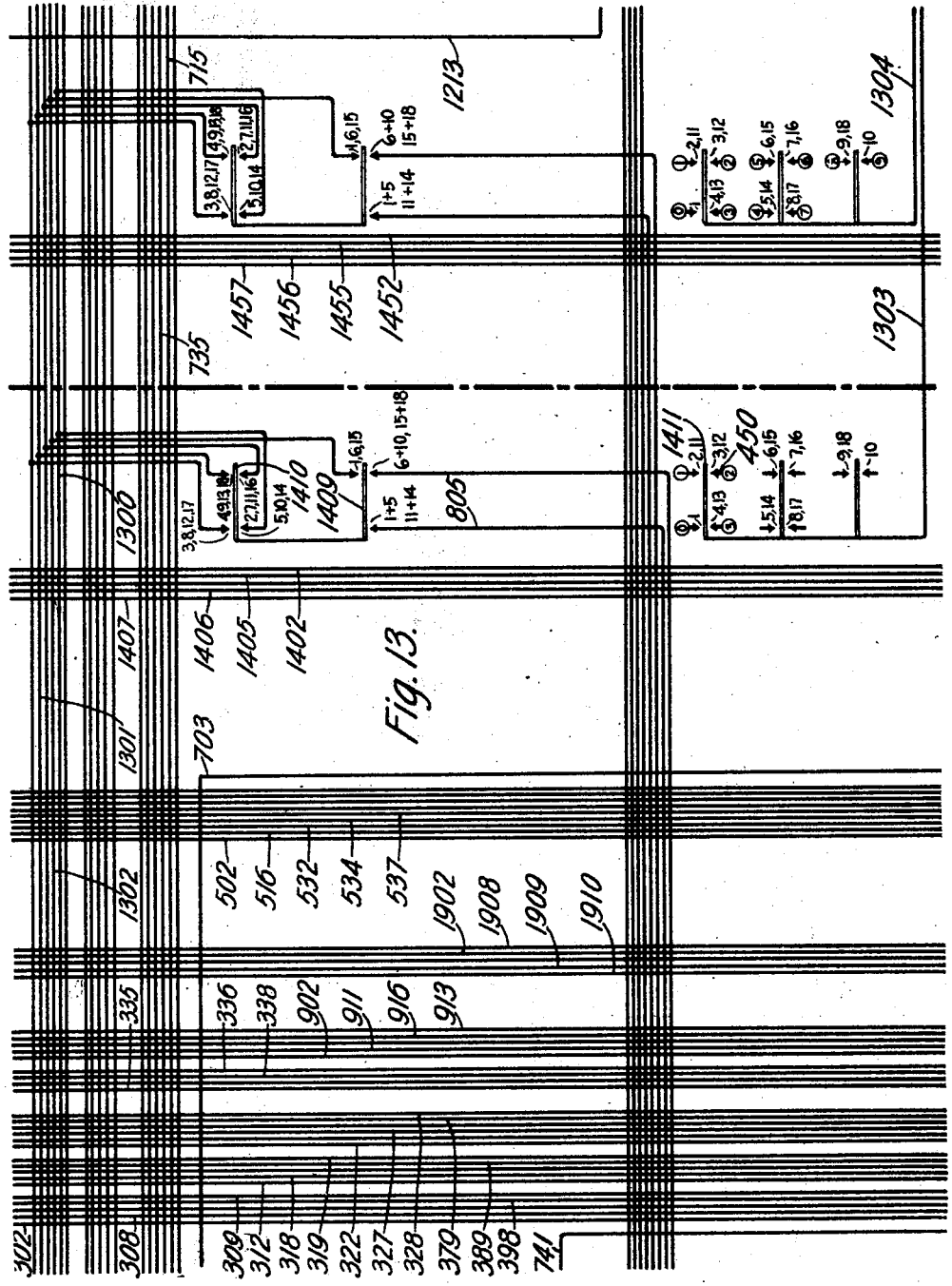

Figs. 10 and 11 show a sequence switch and associated apparatus for checking the operation of the sender, Fig. 12 shows a plurality of relays which are operated to control the setting of the registers of the test set.

Figure 15:
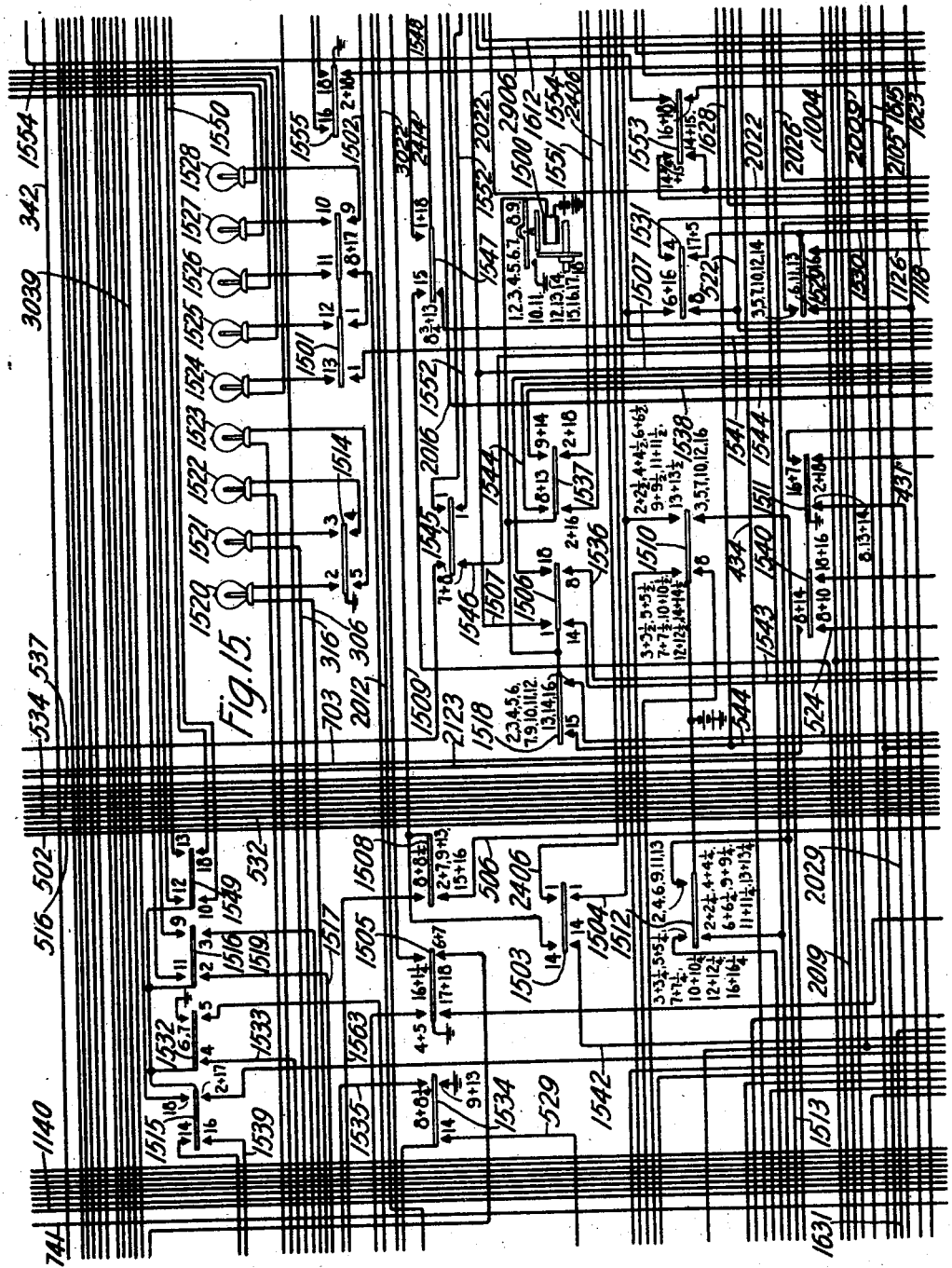

Fig. 15 shows a sequence switch and associated apparatus for controlling the setting of the registers of an incoming from full mechanical sender.

Figure 16:
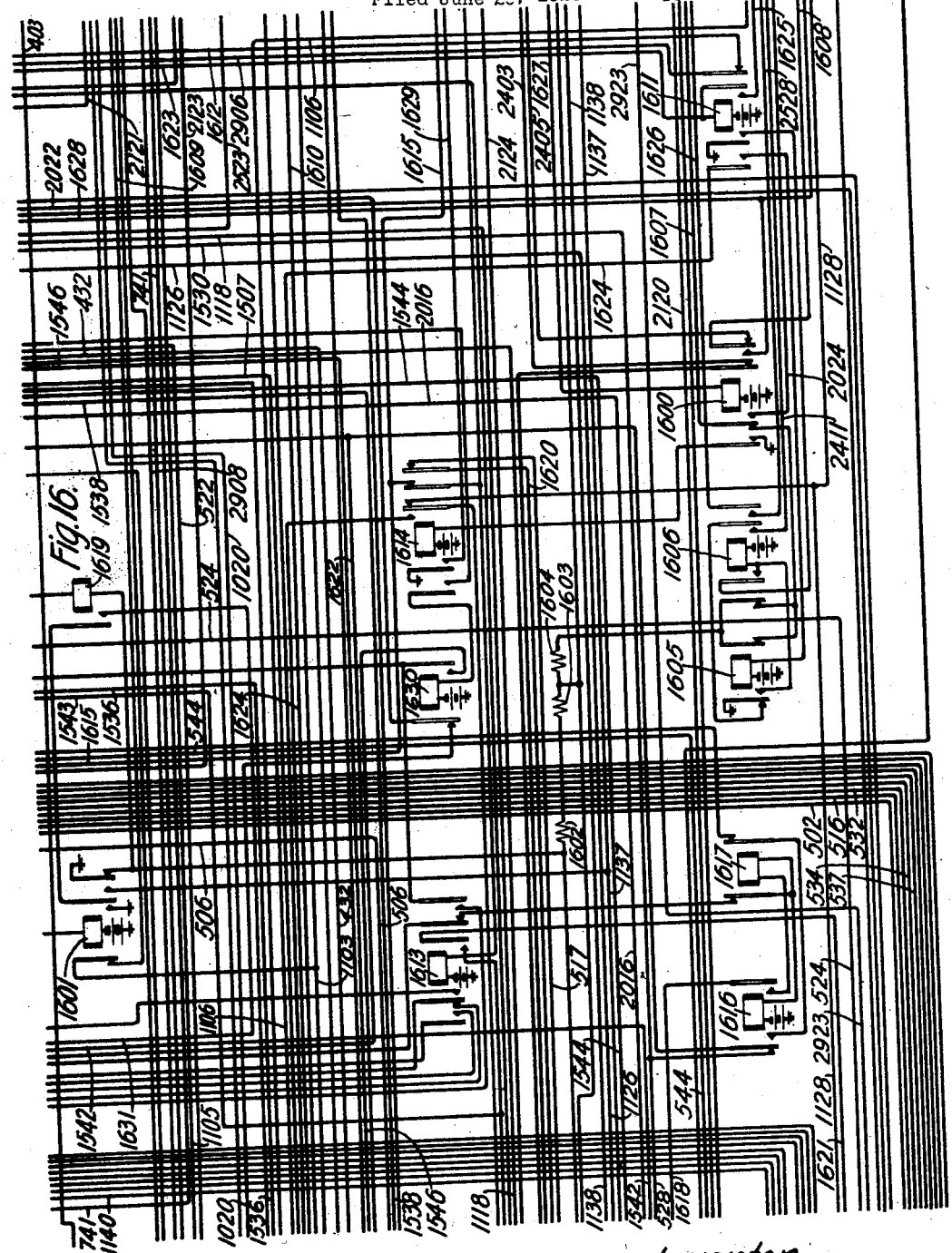
Figure 21:
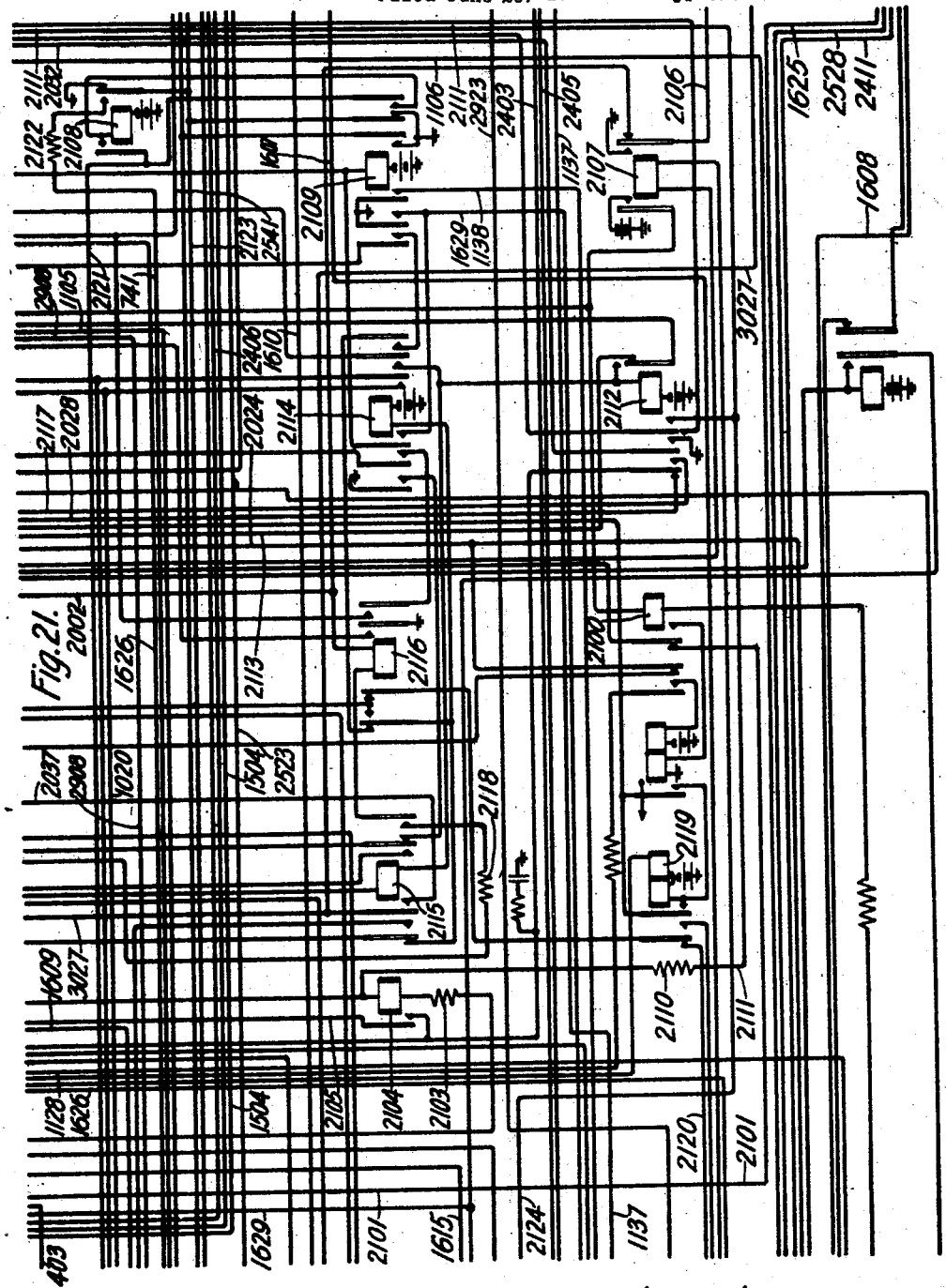
Figure 22:
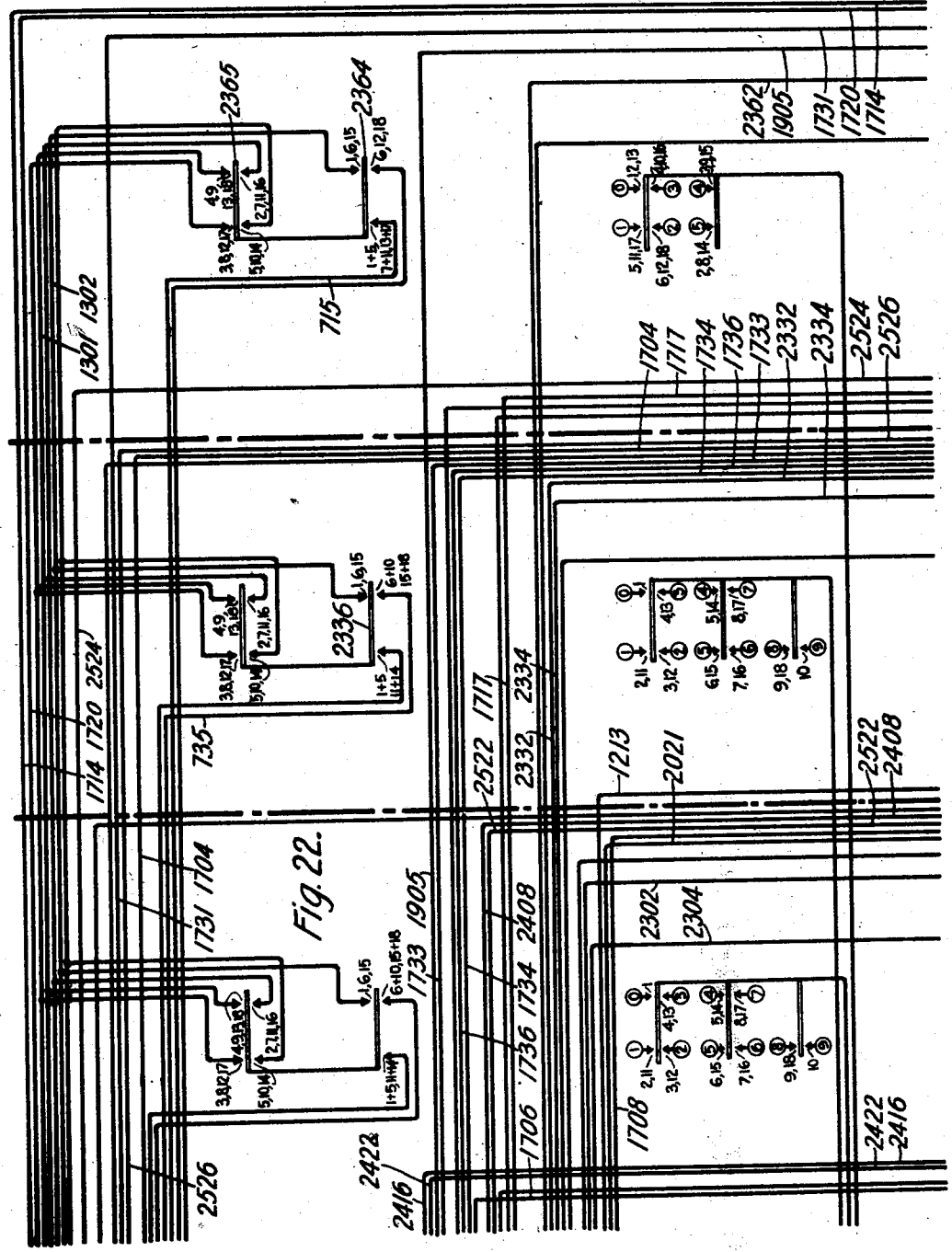

Figs. 16 and 21 show a plurality of relays which are employed in the manner to be described.

Figure 17:
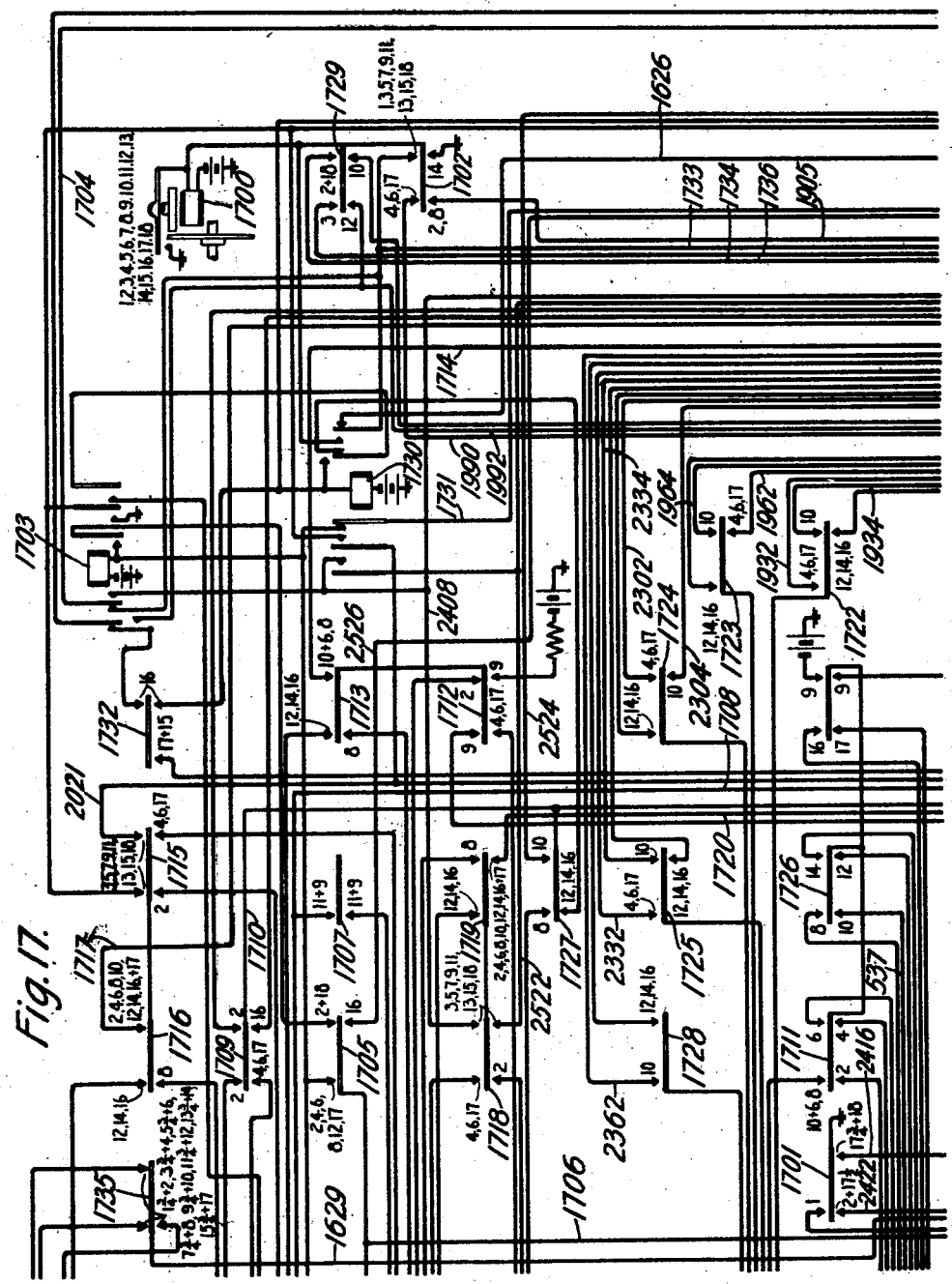
Figure 18:
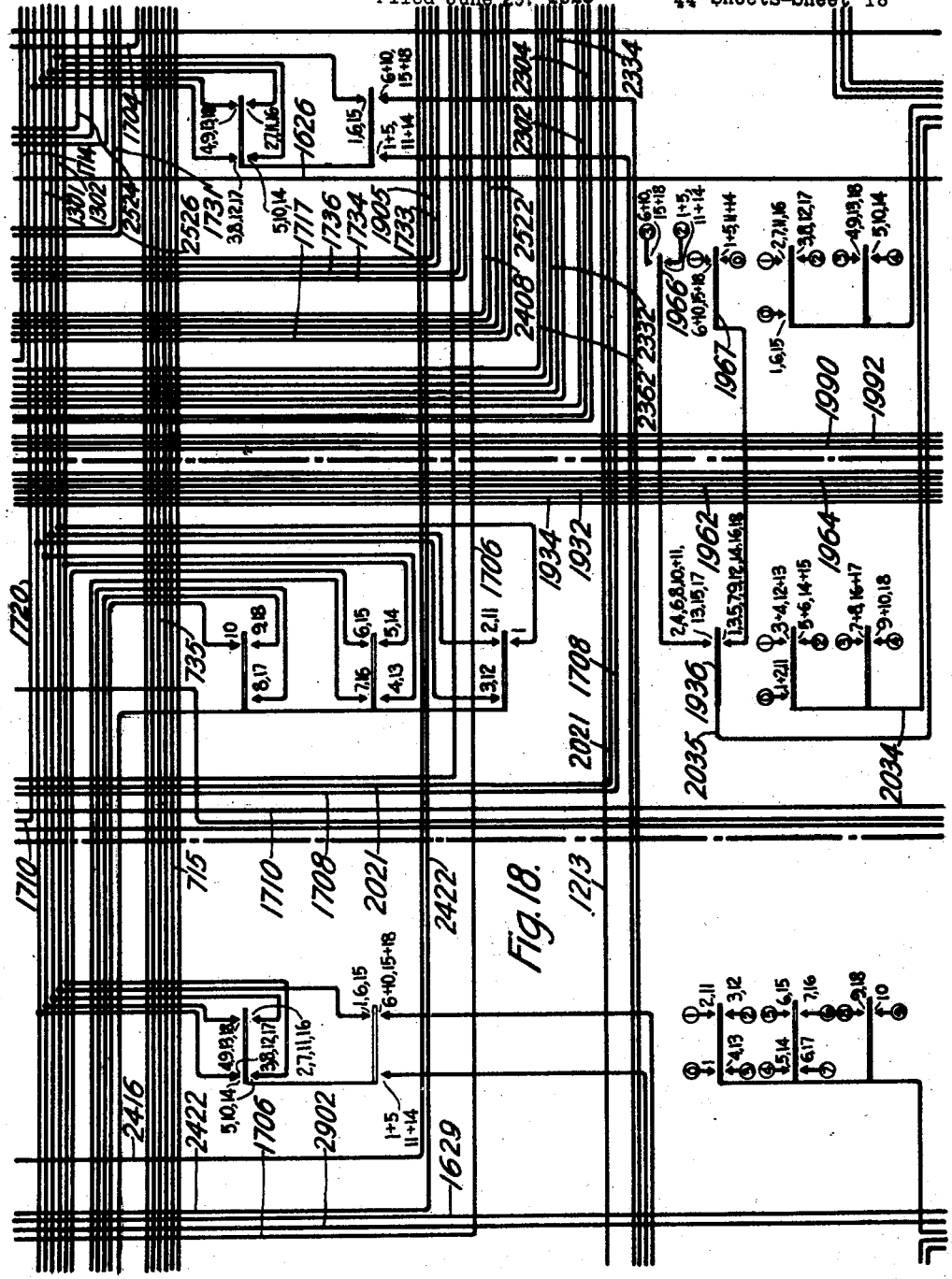

Fig. 17 shows a sequence switch which controls the setting of the test set registers.

Figure 20:
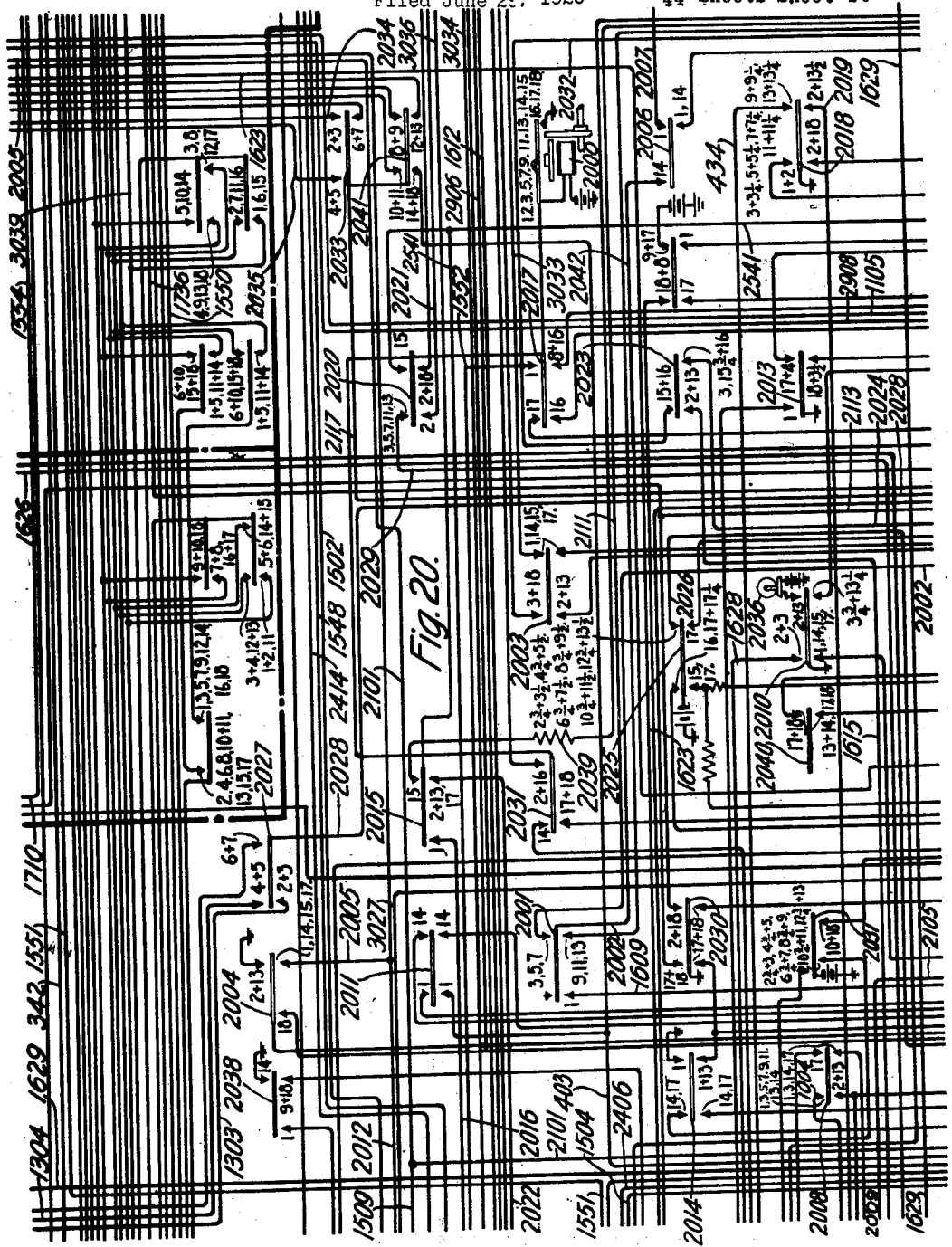

Fig. 20 shows a sequence switch and apparatus for controlling the setting of incoming from semi-mechanical senders.

Figure 24:
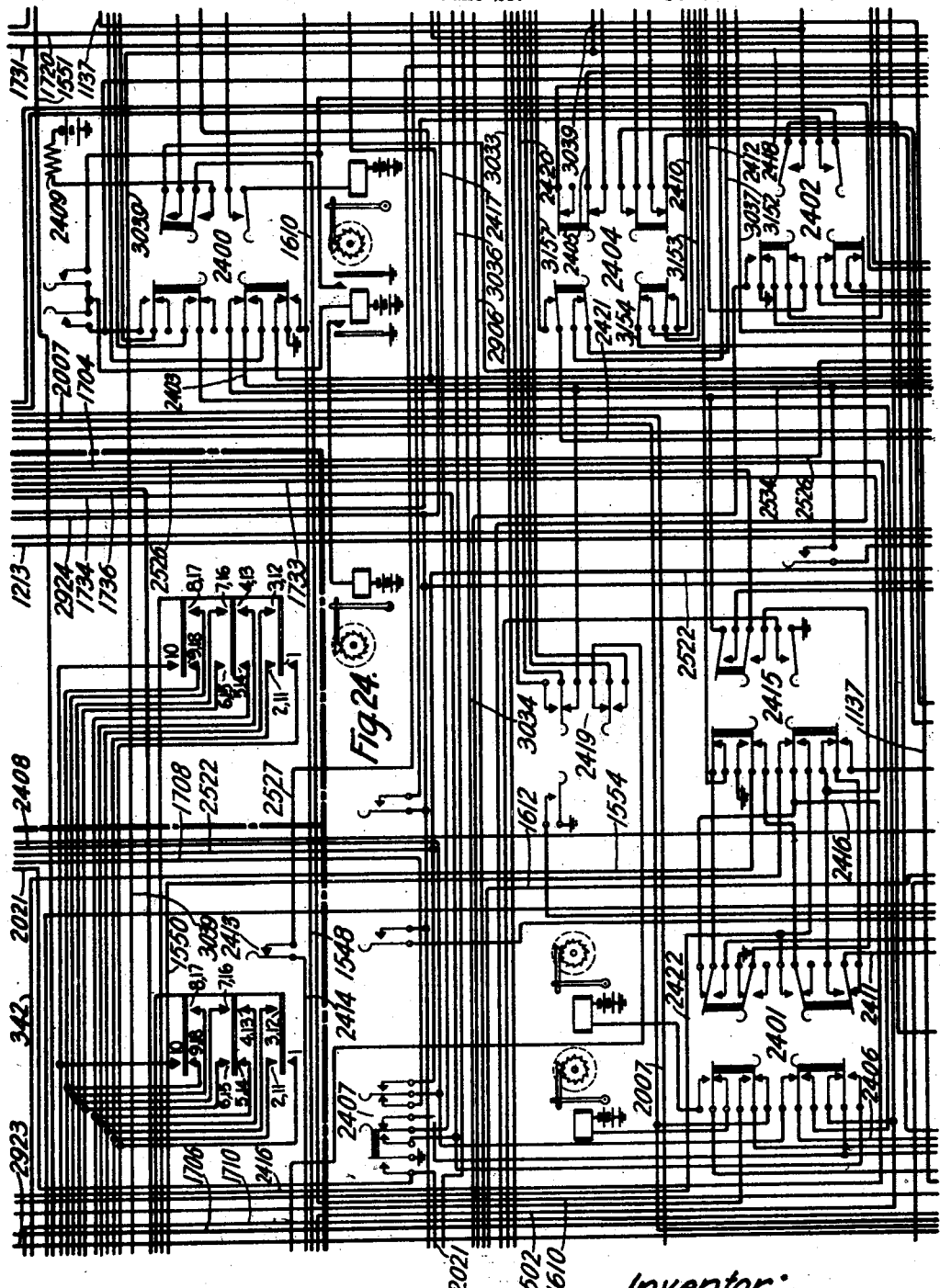

Fig. 24 shows a plurality of keys which are operated to control the tests.

Figure 25:
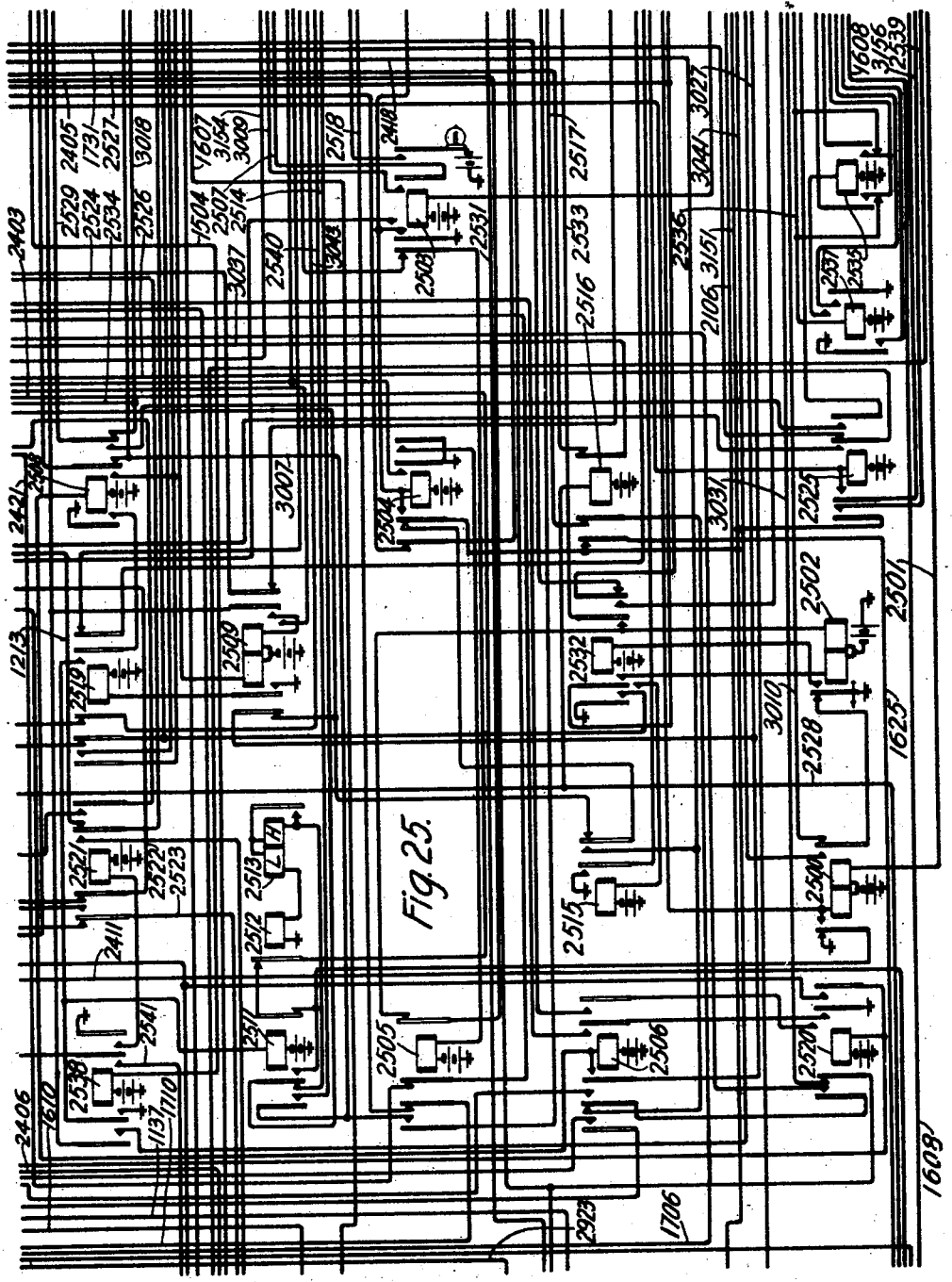

Fig. 25 shows a plurality of relays which are chiefly associated with the connection of the test set to the sender.

Figure 26:
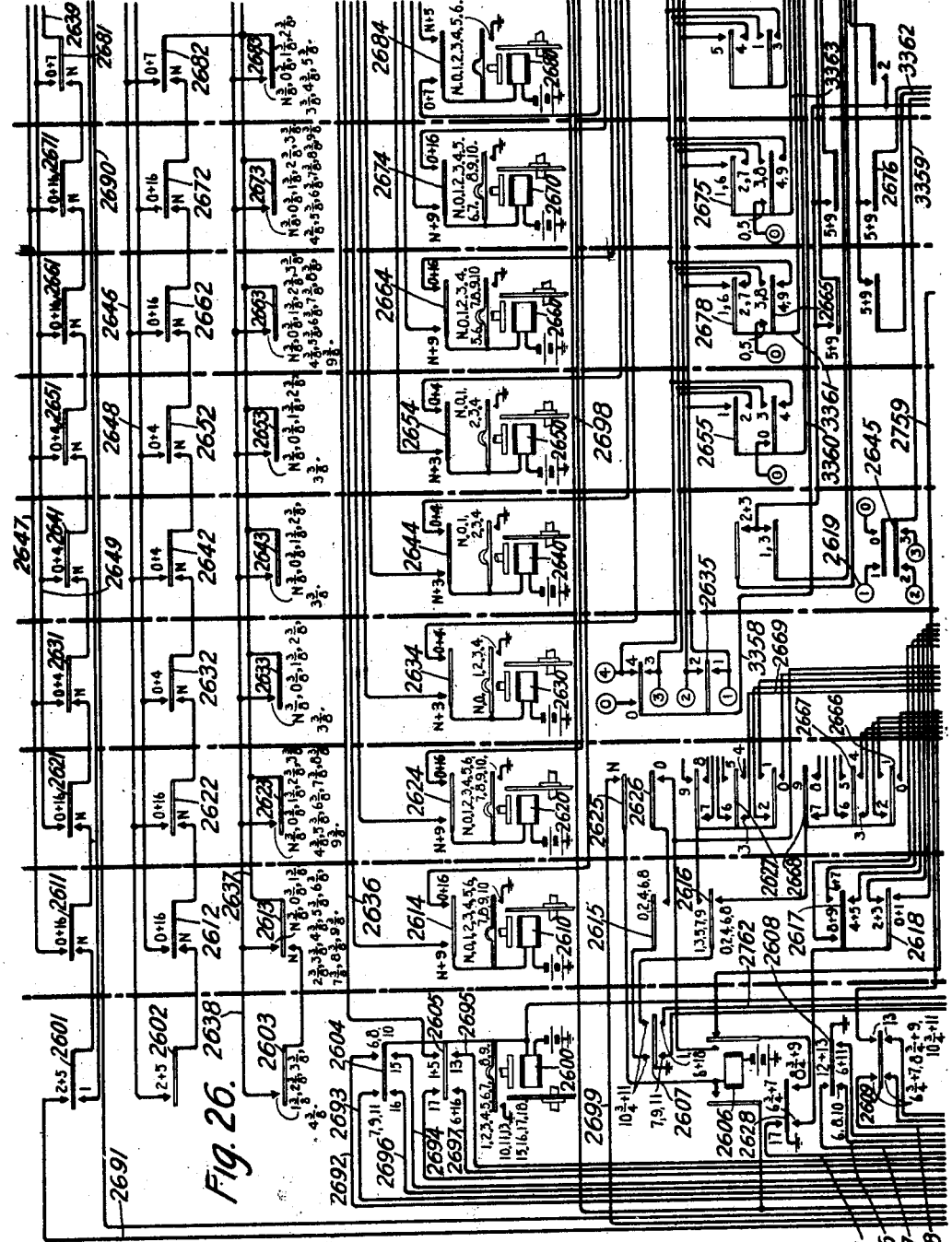

Fig. 26 shows a plurality of registers for receiving designations.

Figure 27:
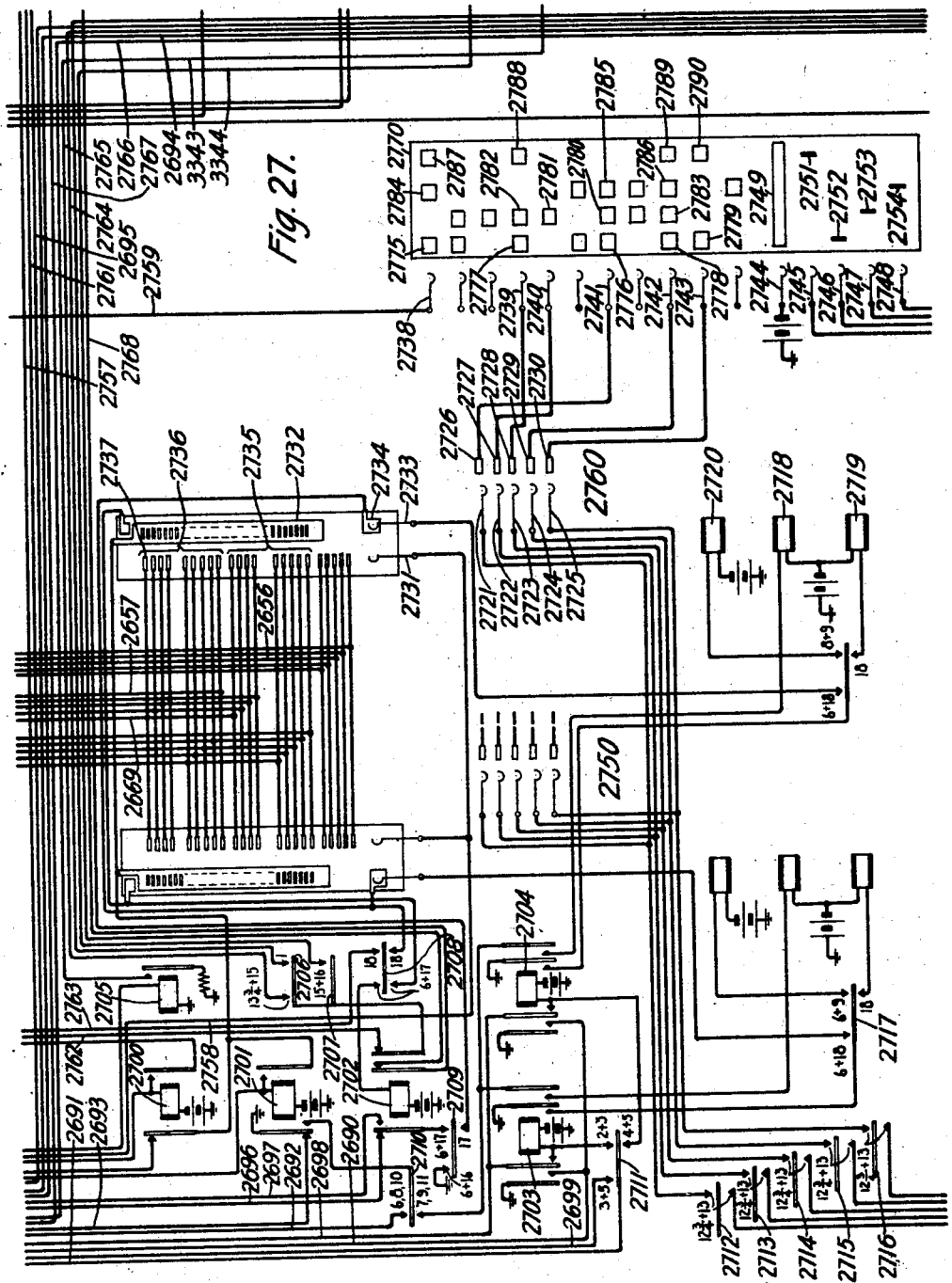

Fig. 27 shows translators and pulse machine drums.

Figure 28:
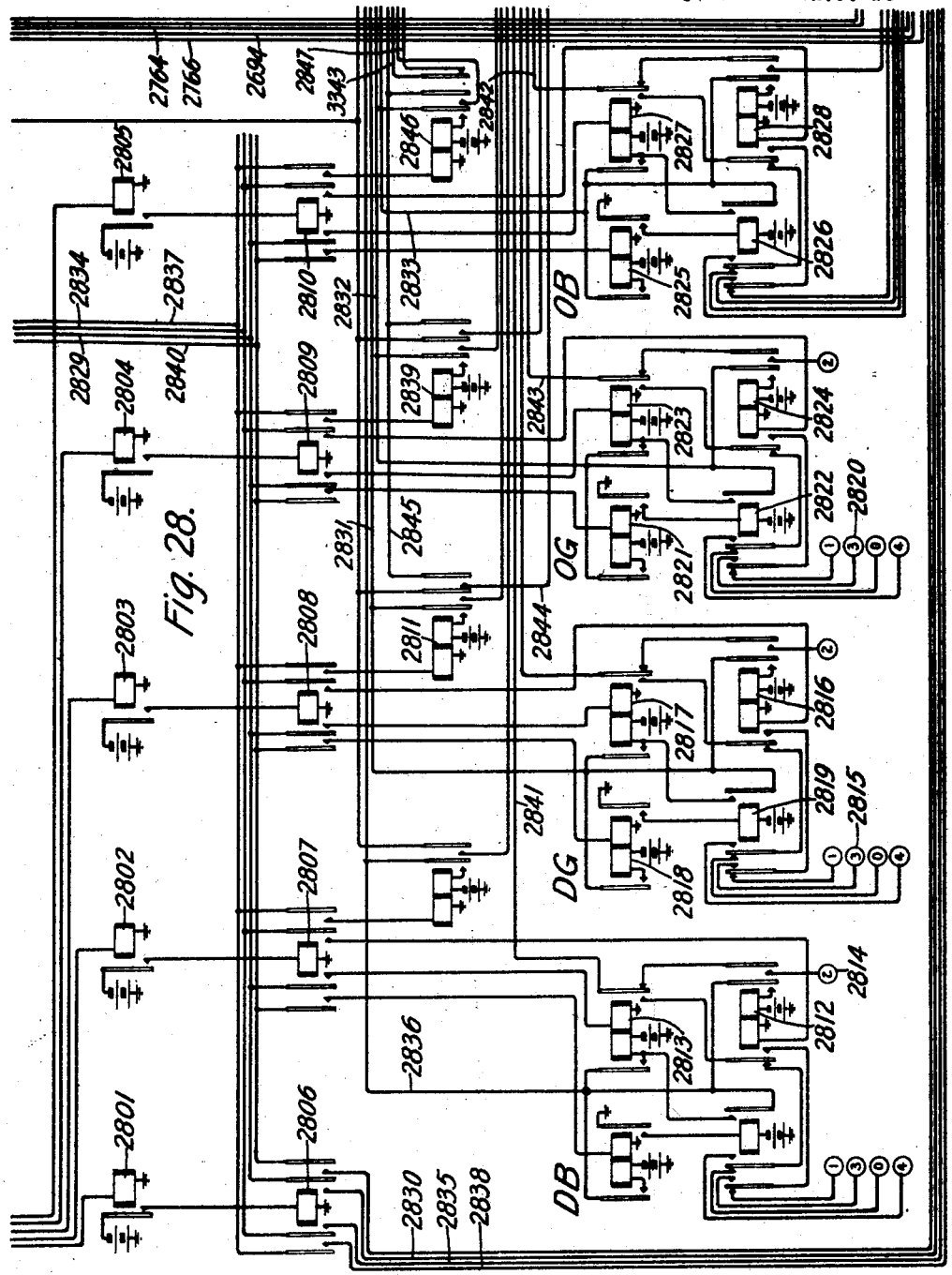

Fig. 28 shows a group of registers to be set under the control of the translators.

Figure 29:
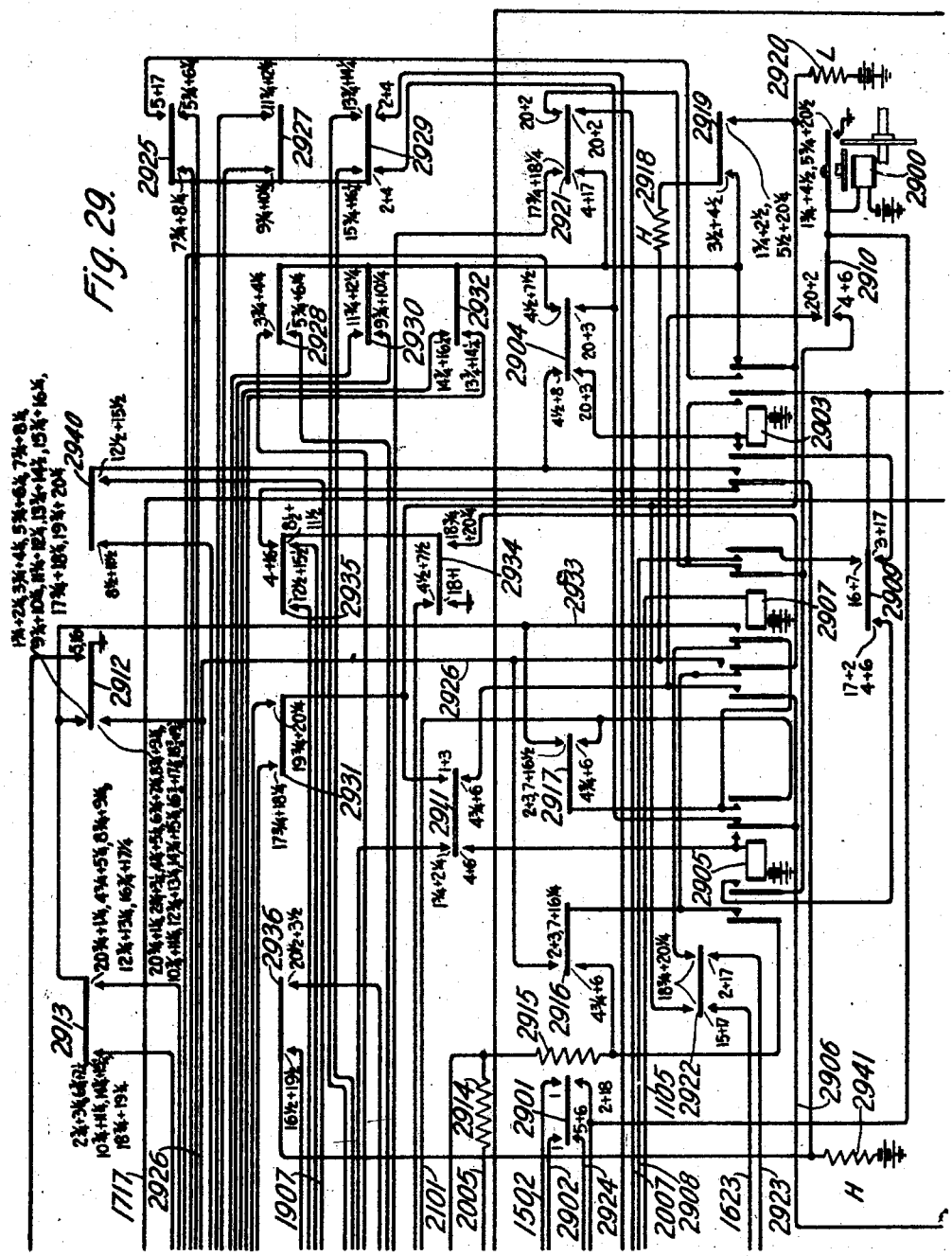

Fig. 29 shows a sequence switch for sending out relay call indicator call pulses to set the registers of the incoming from full mechanical sender.

Figure 30:
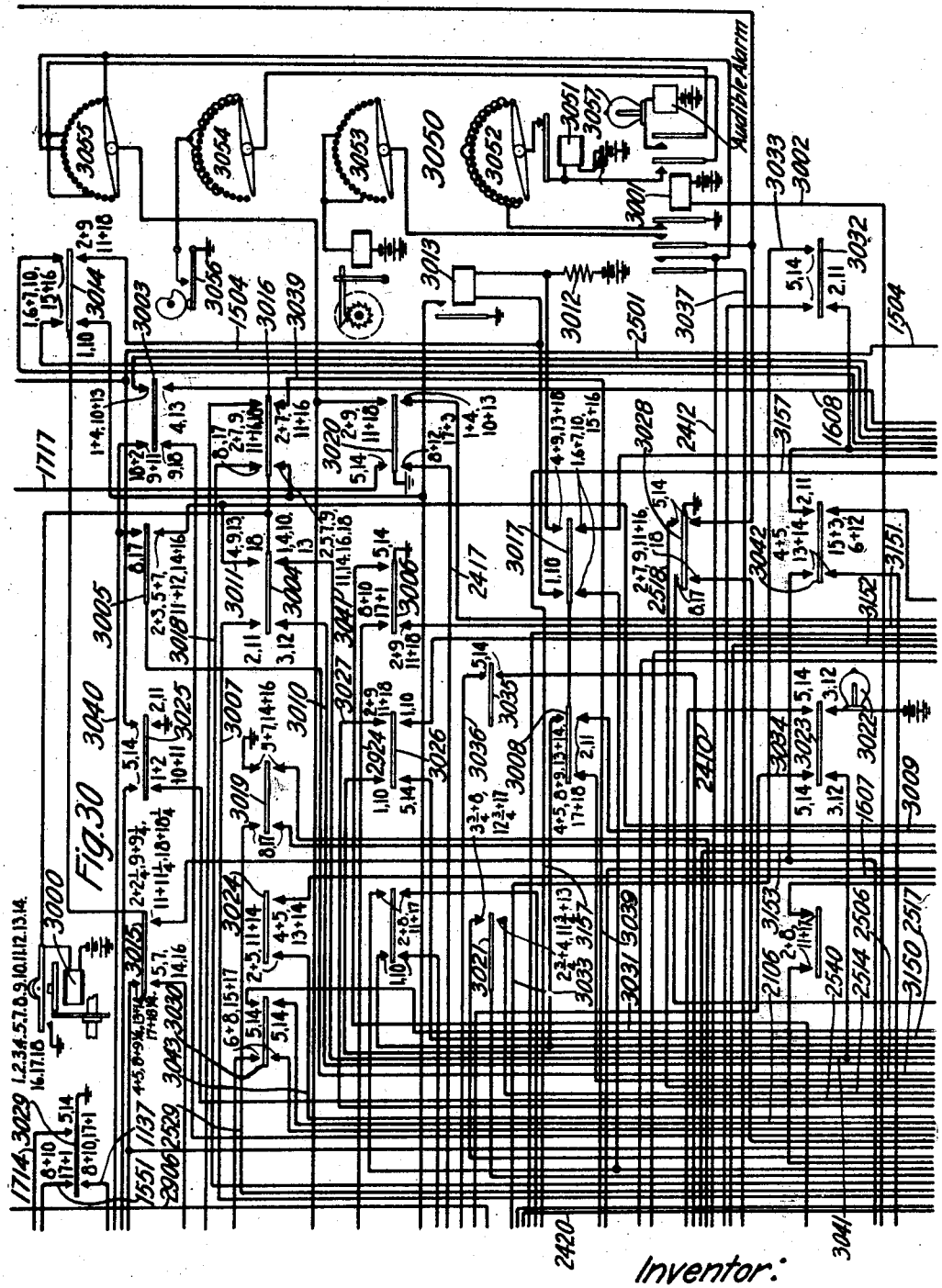

Fig. 30 shows a sequence switch for controlling the connection of the sender to the test set.

Figure 31:
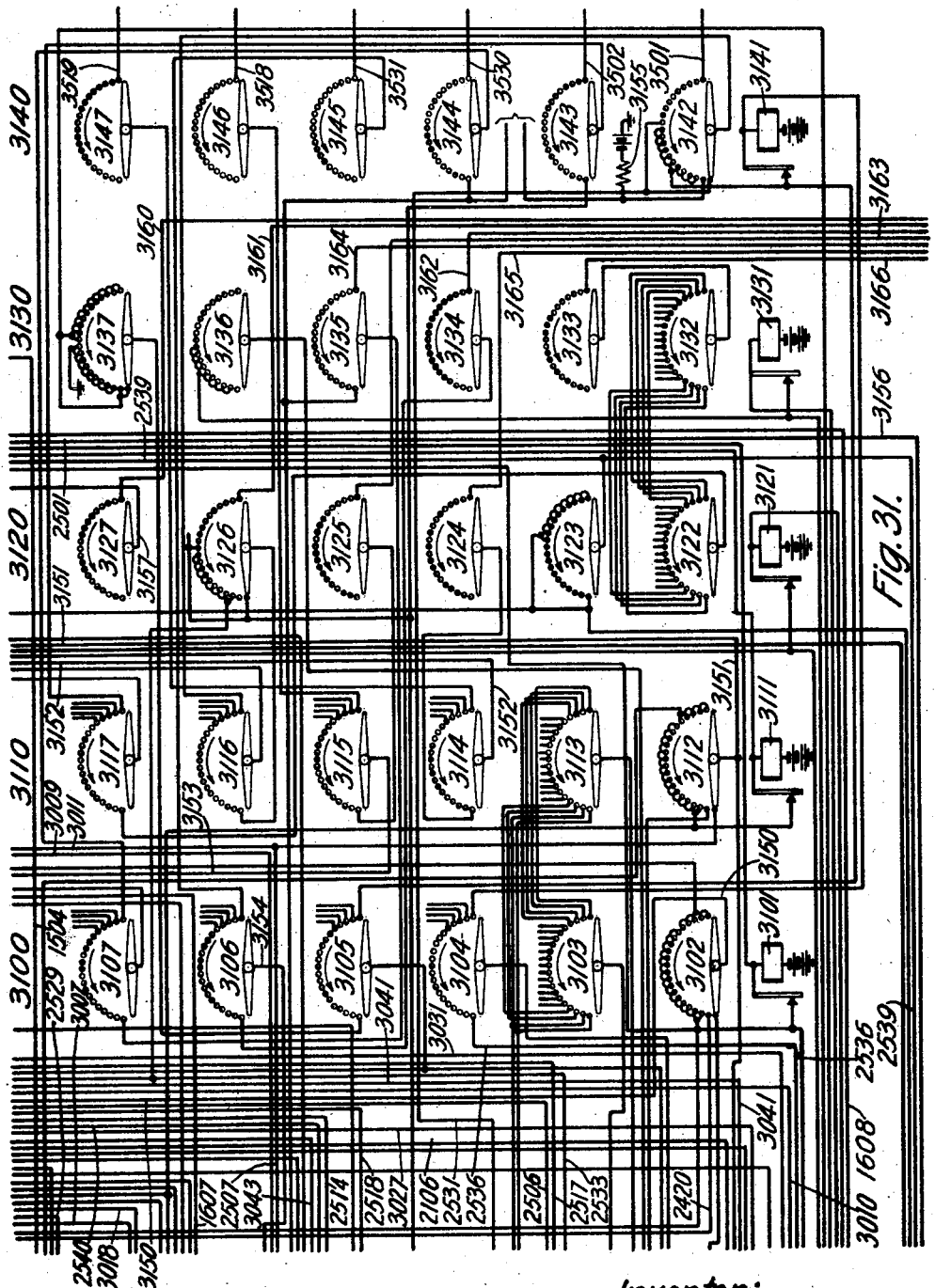

Fig. 31 shows a plurality of step-by-step switches for connecting the test set with any one of the senders.

Figure 32:
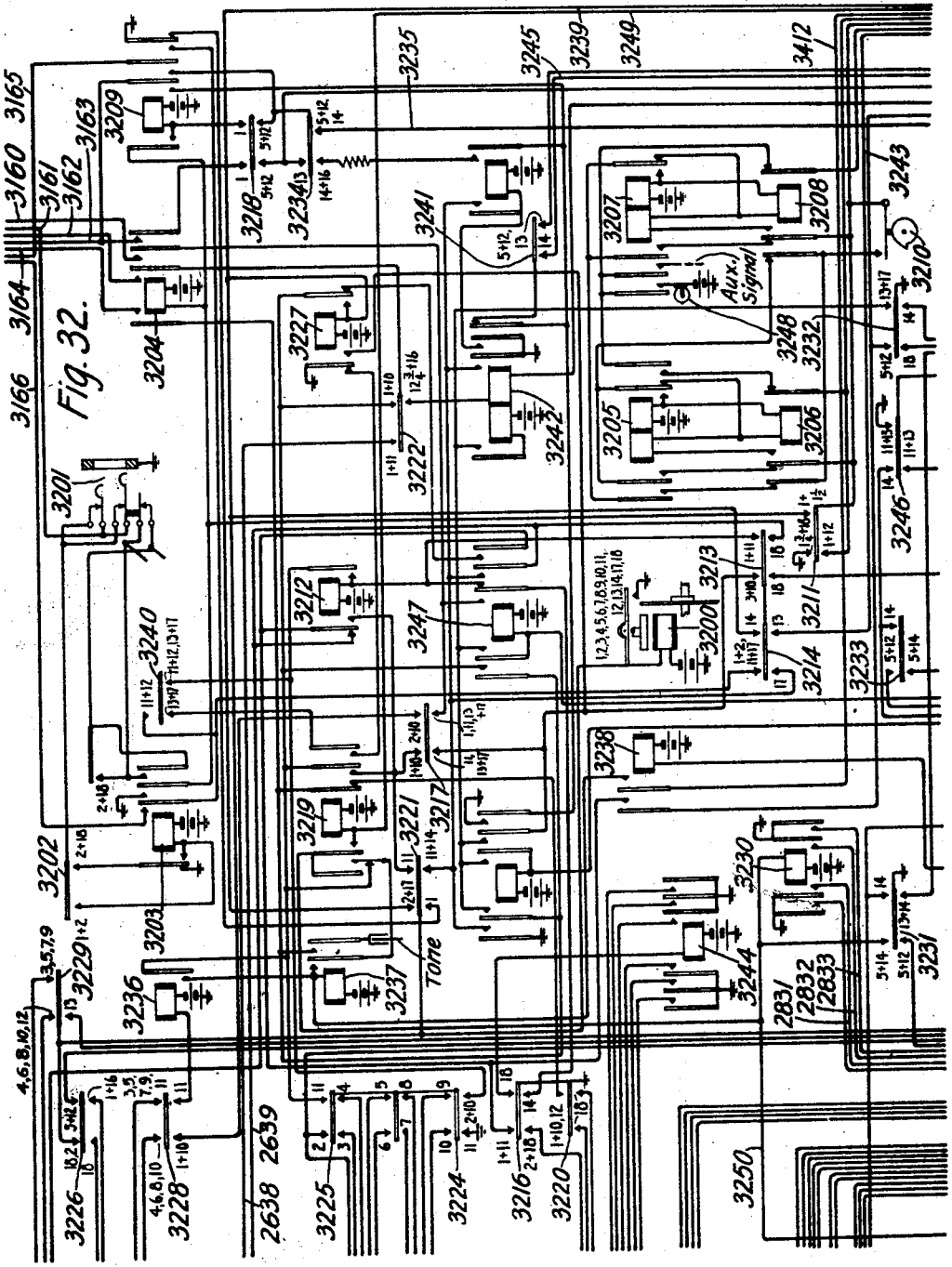

Fig. 32 shows a sequence switch and apparatus for controlling the setting of the registers of Fig. 26.

Figure 33:
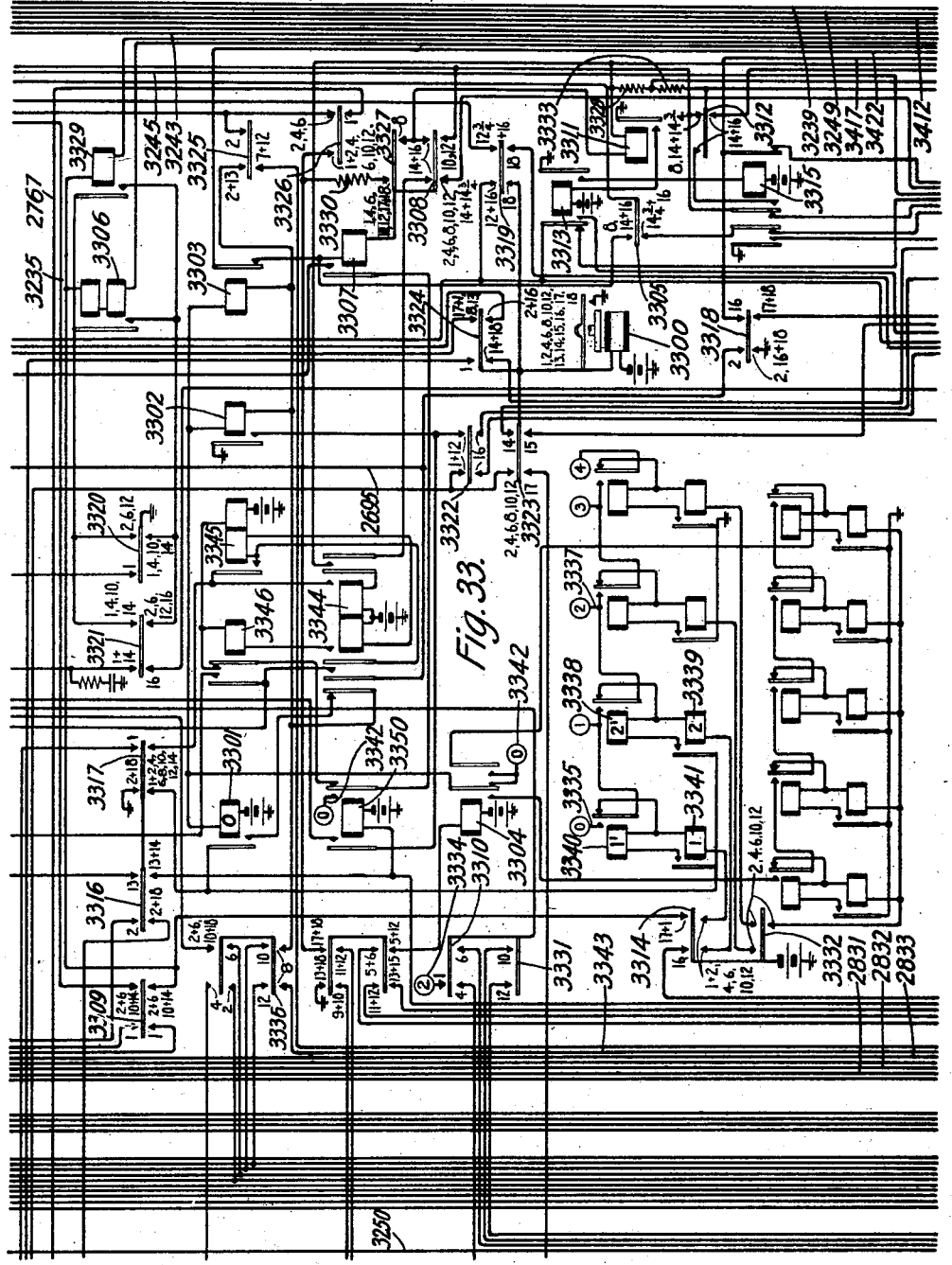

Fig. 33 shows a sequence switch and apparatus for controlling the operation of automatic switches in accordance with the setting of the registers.

Fig. 34 shows a class switch for regulating the action of the other apparatus, an impulse generating switch and an additional sequence switch to be used only in the case of particular designations.

Figure 35:
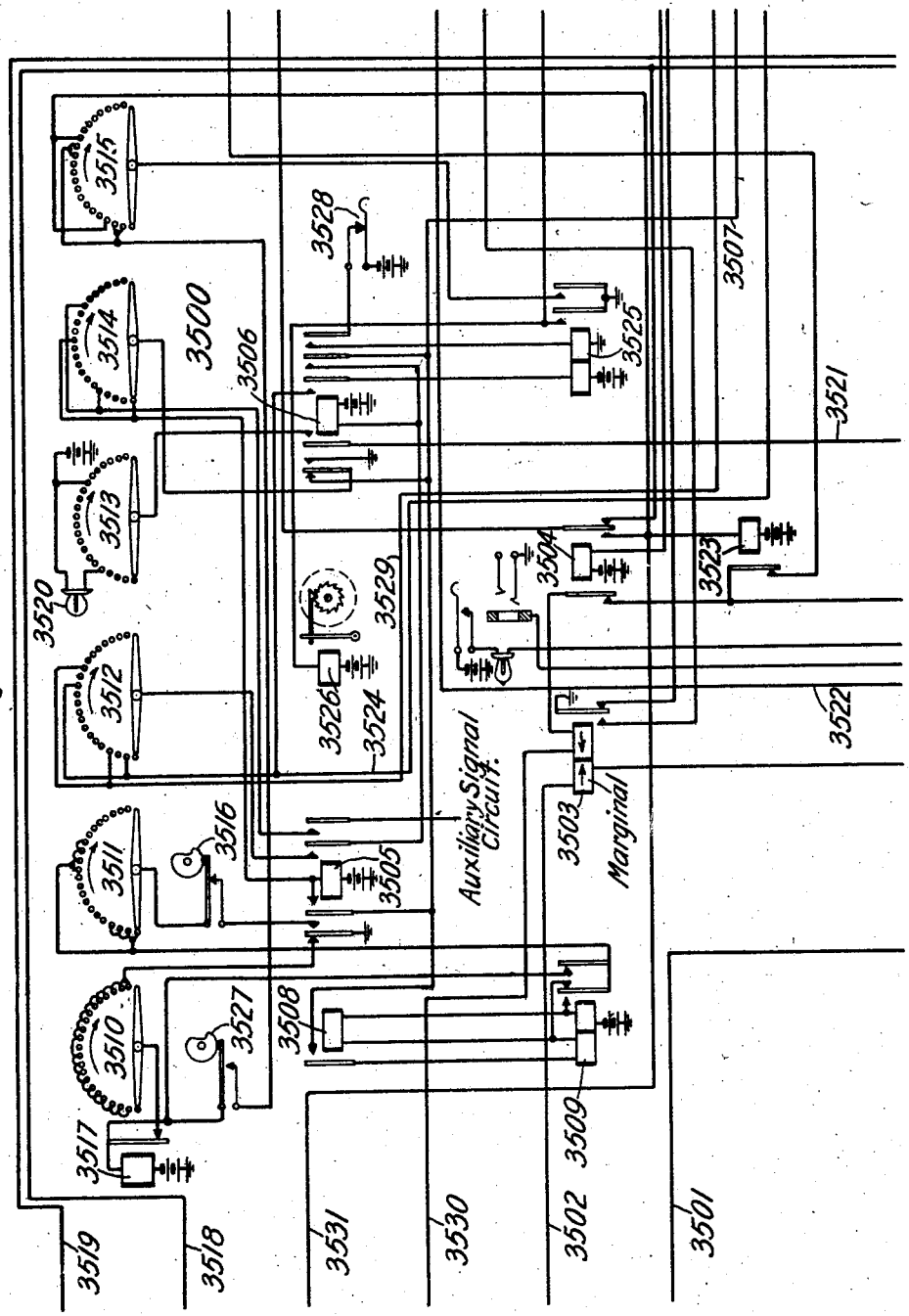

Fig. 35 shows a timing switch.

Fig. 36 shows a plurality of transfer relays for directing incoming pulses to the proper register relays.

Figure 37:
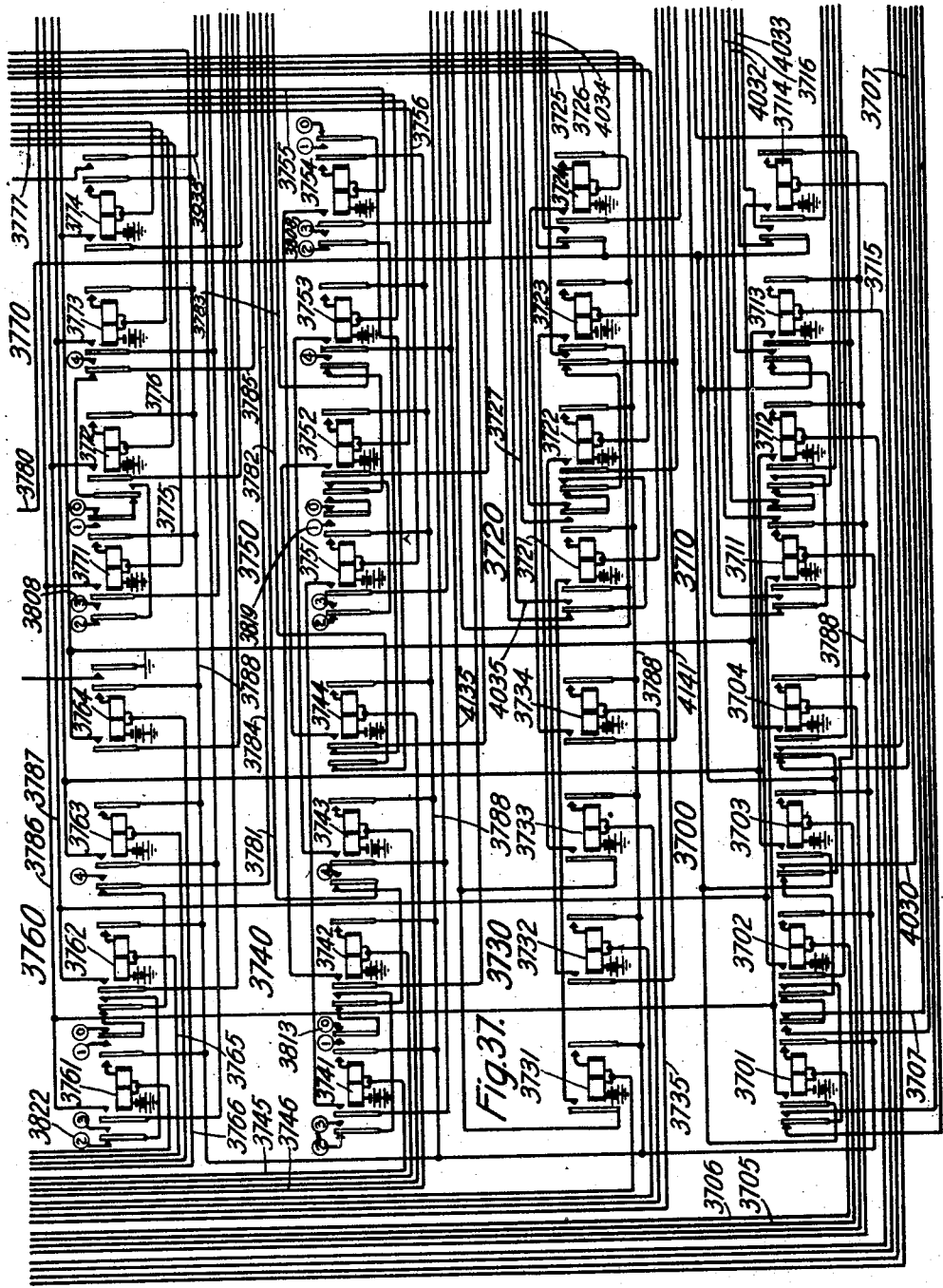

Fig. 37 shows a plurality of registers for recording incoming pulses.

Figure 38:
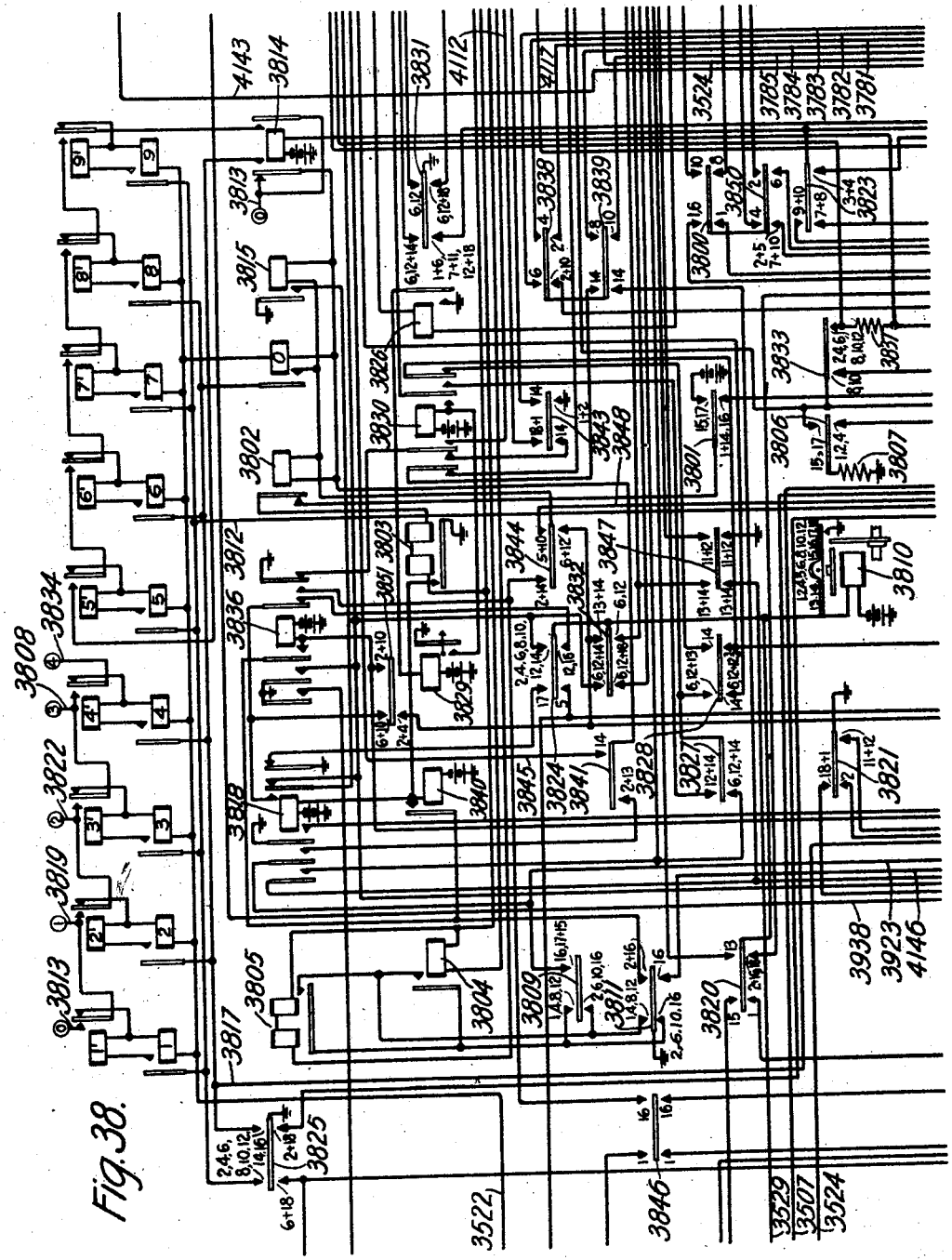

Fig. 38 shows a sequence switch and apparatus for controlling the operation of automatic switches.

Figure 39:
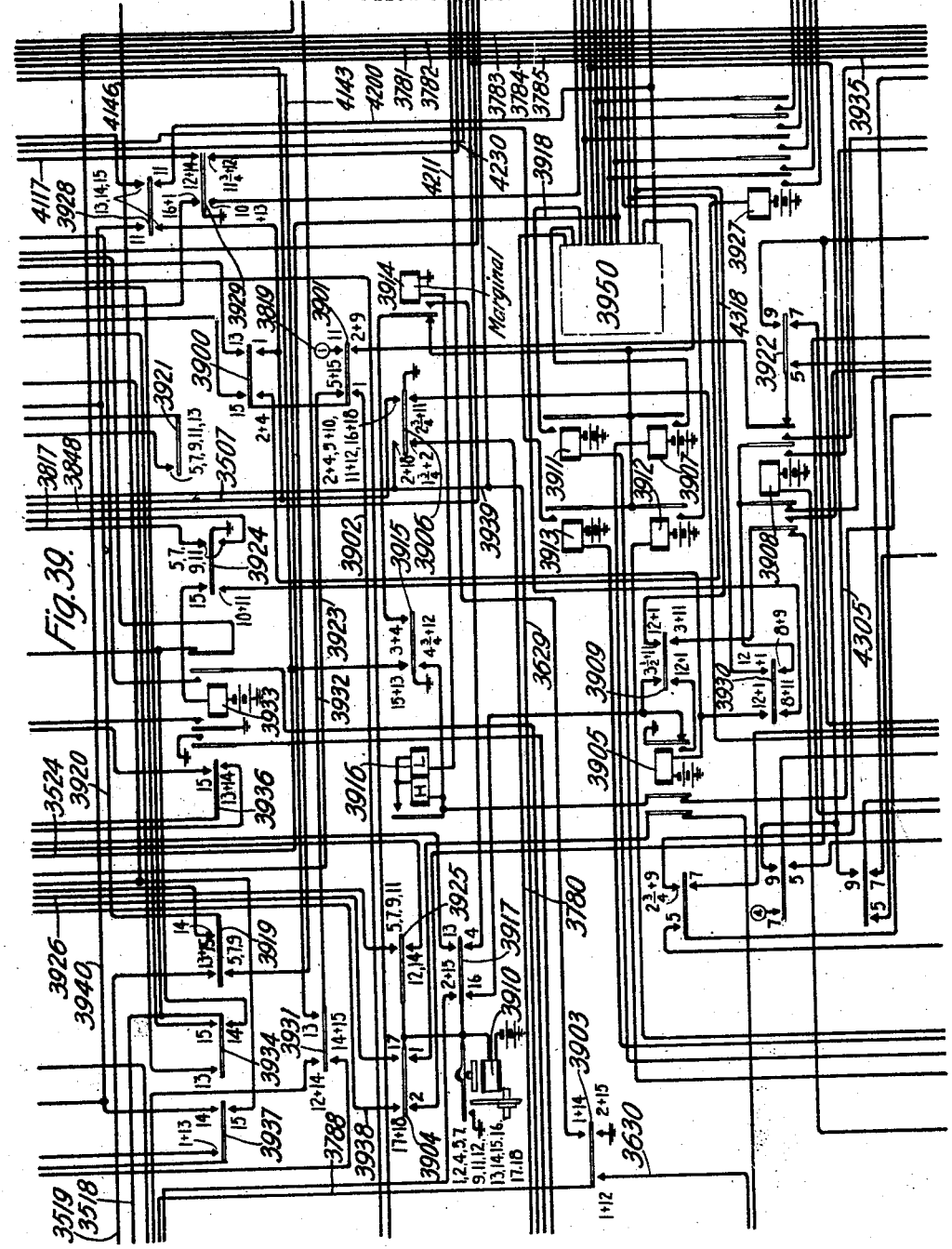
Figure 40:
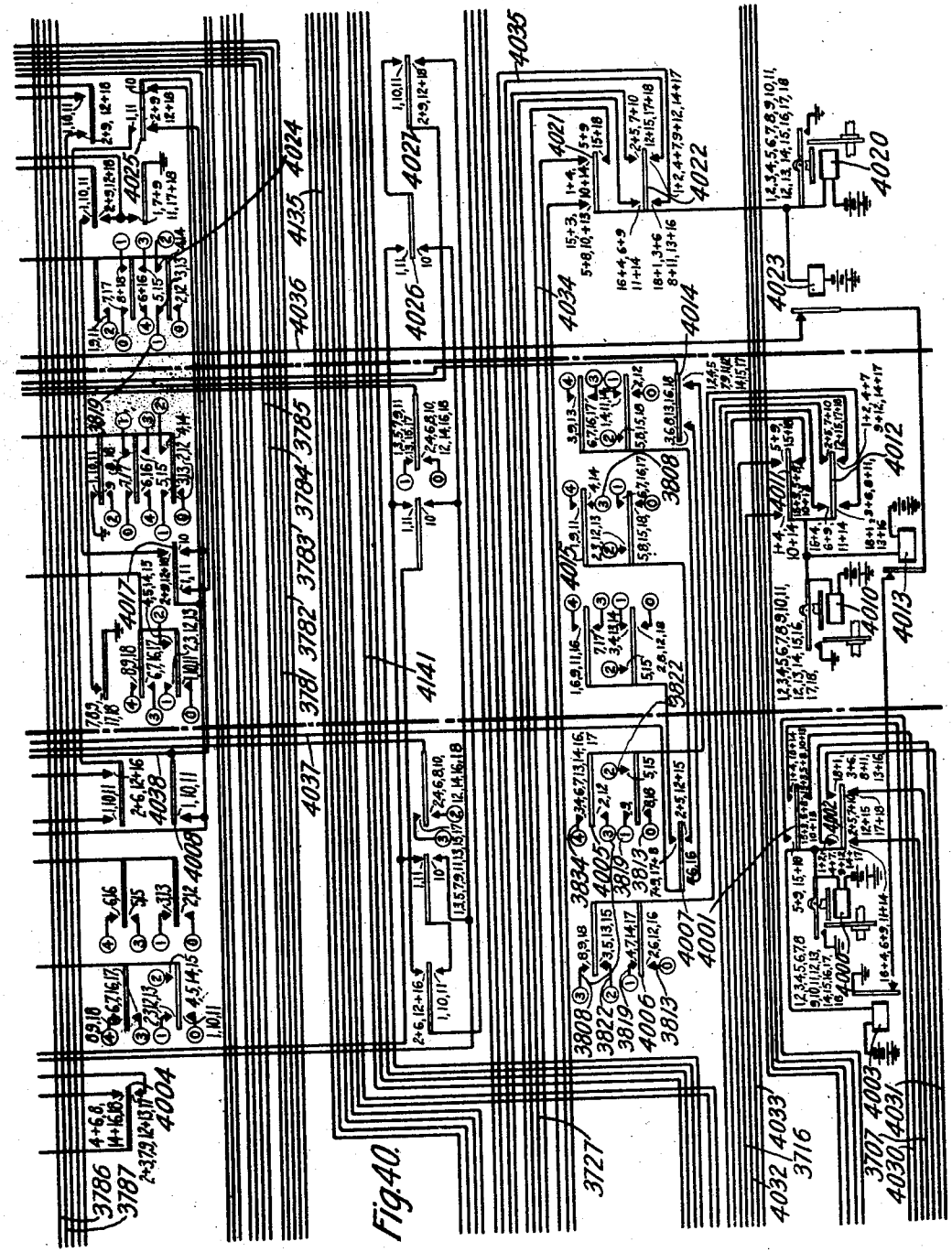

Fig. 39 shows a sequence switch and apparatus for controlling the setting of the registers of Fig. 40.

Fig. 40 shows a plurality of registers set from those of Fig. 37.

Figure 41:
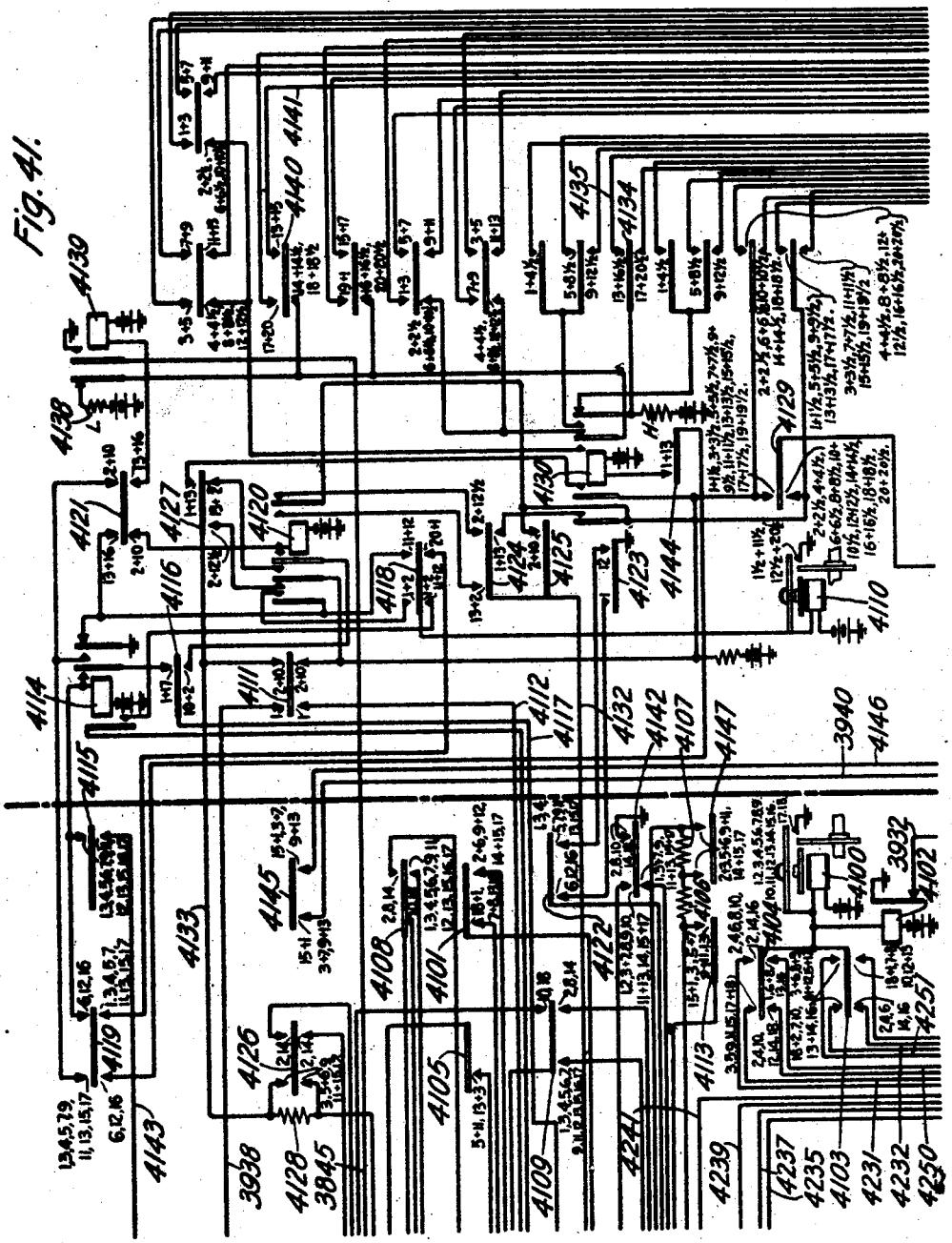

Fig. 41 shows an impulse generating switch for sending out relay call indicator pulses.

Figure 42:
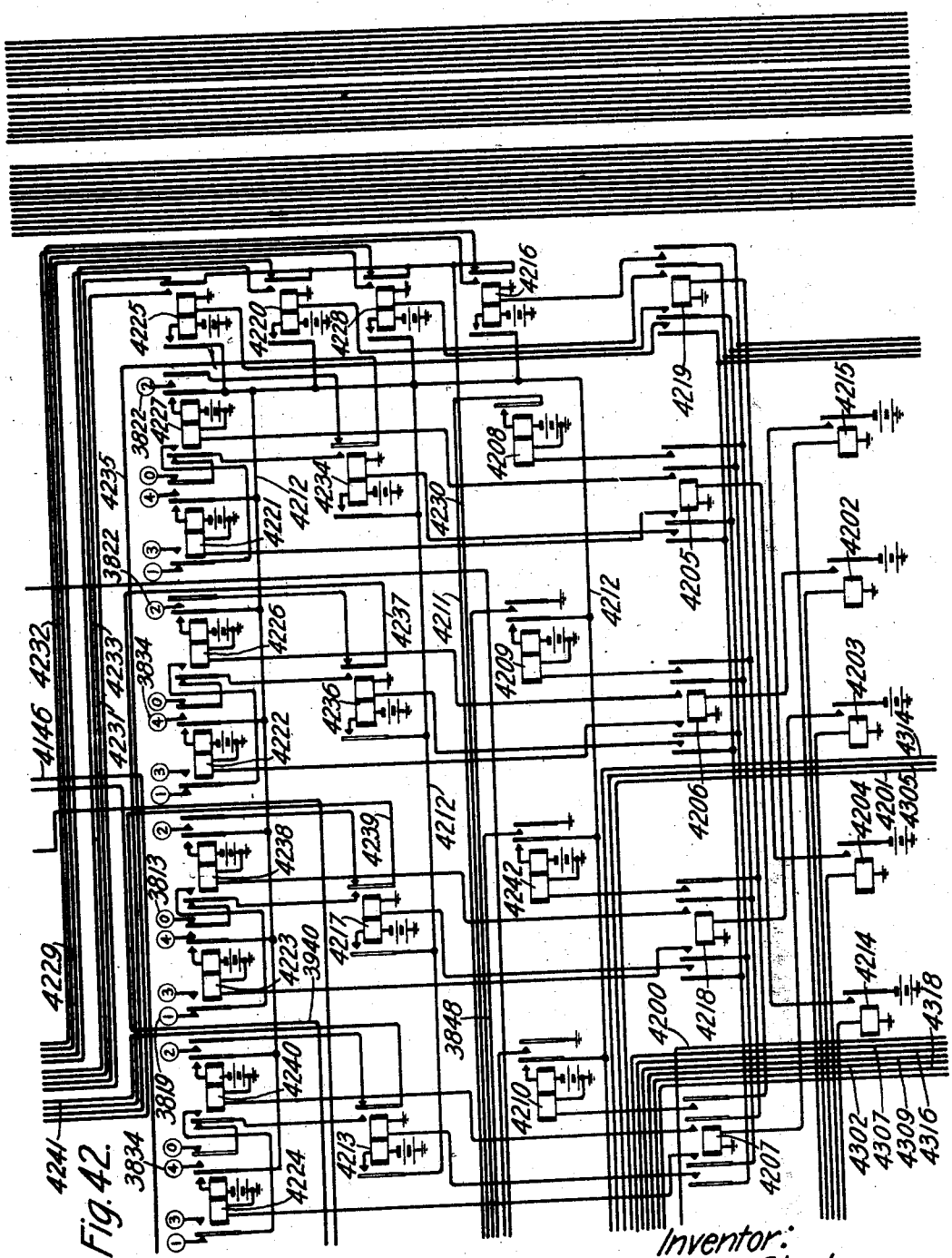

Fig. 42 shows a plurality of registers for controlling automatic selections.

Figure 43:
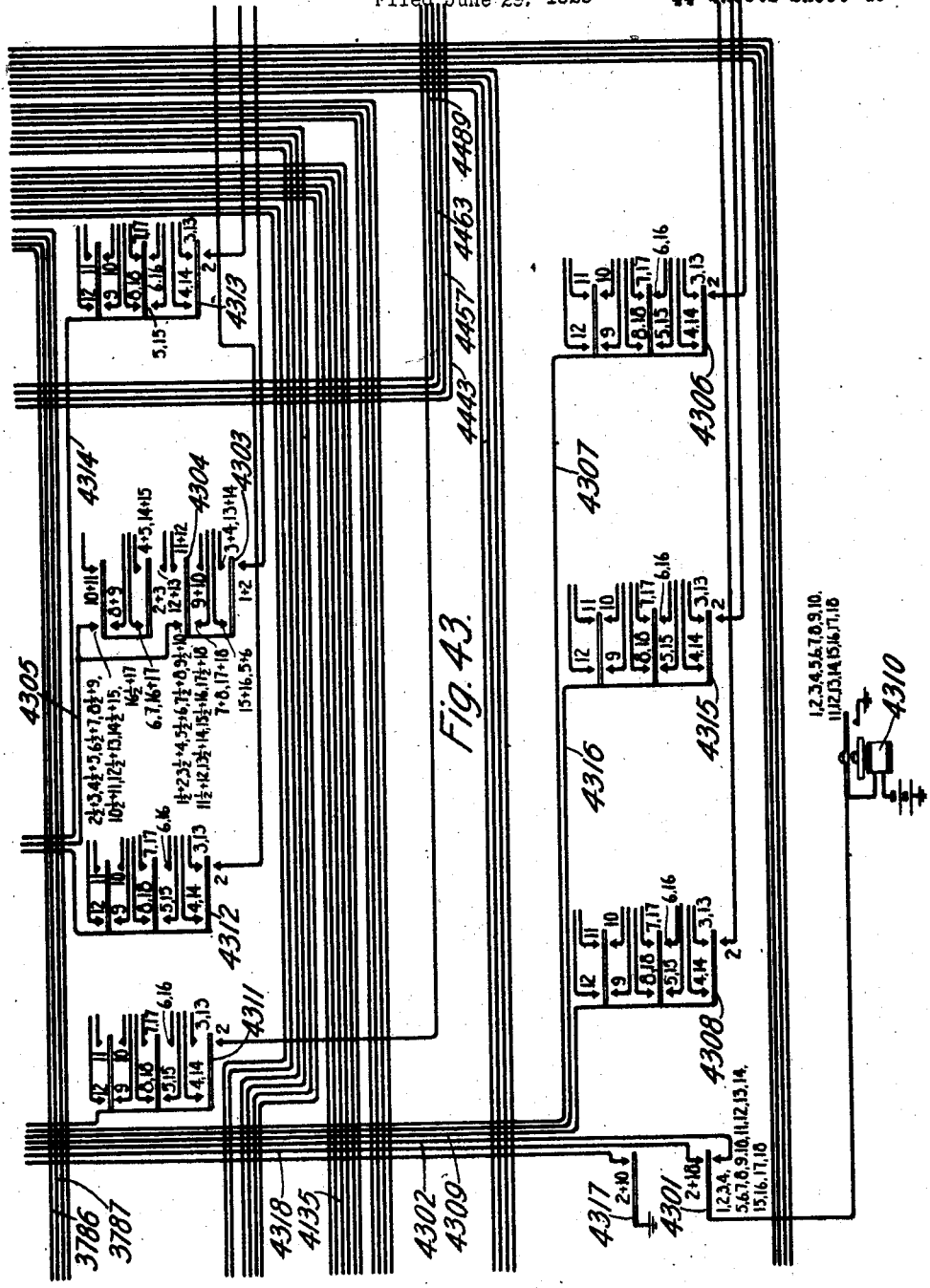

Fig. 43 shows a finder switch for finding an idle translator.

Figure 44:
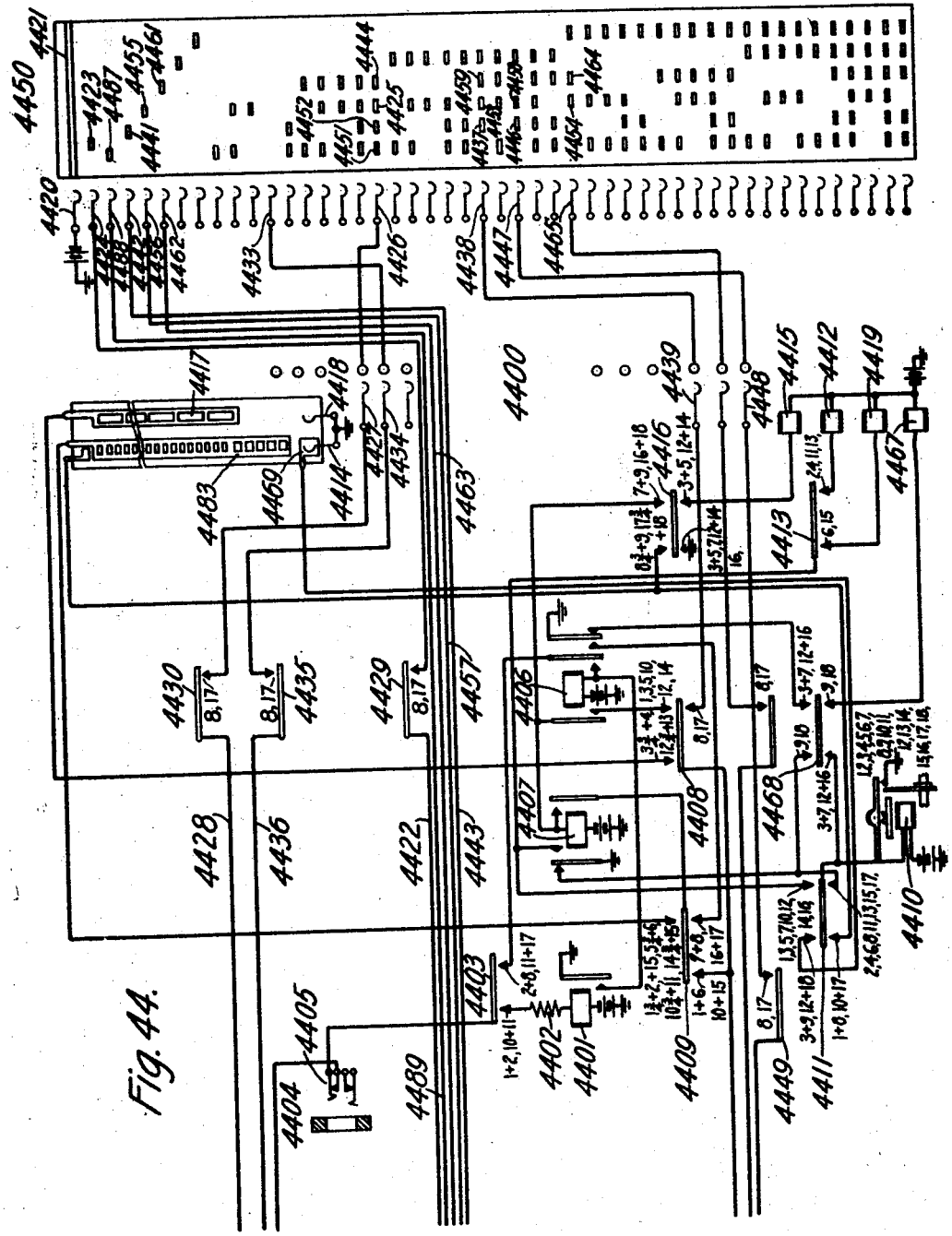

Fig. 44 shows a translator and pulse machine for translating designations.

The incoming from full mechanical sender, which will be hereinafter designated the FM sender, has been completely disclosed and described in the application of L. H. Johnson and T. H. Roberts, Serial No. 19,584, filed March 31, 1925. The incoming from semi-mechanical sender, hereinafter designated as the SM sender, is substantially the same as that described in U. S. Patent No. 1,439,735 to E. W. Hancock granted December 26, 1922.

The test set is in general similar to that disclosed in the patent to W. L. Dodge, No. 1,523,408 granted Jauary 20, 1925. Since the above enumerated disclosures and descriptions are complete in detail, the present description will be abbreviated in certain instances although the disclosure as shown in the drawings is substantially complete.

*Brief description—the operation of FM sender.*

As described in the above mentioned application of Johnson et al., an idle sender is characterized by battery connected to conductor 3501. When the hunting switch of the link circuit encounters the terminals of such an idle sender, this battery serves to operate a relay in such link circuit to bring the hunting switch to rest on the terminals of the sender. The district selector which has been connected with the sender by the link circuit now connects ground to conductor 3502 and thence through the left winding of relay 3503, outer left back contact of relay 3601 to the winding of relay 3602. Relay 3602 operates and locks to conductor 3502. It also causes the operation of relay 3601 which removes battery from conductor 3501 so that the sender is now busy. In addition, it connects ground over the right back contact of relay 3603, left contact of relay 3504, right winding of relay 3503 to conductor 3530 and thence to a relay in the district selector which operates and causes the district selector sequence switch to advance, extending conductors 3519 and 3518 over the incoming trunk to the distant sender.

The distant sender now transmits code pulses over a circuit which extends from conductor 3518, left contacts of cam 3800, inner left contact of relay 3604 through the windings of positive polarized relay 3607, negative polarized relay 3606, marginal relay 3605, right back contact of relay 3604, inner left back contact of relay 3603, to conductor 3519. Code pulses sent out by the distant sender are alternately positive or negative, the positive pulses being omitted and the negative pulses being made heavy in accordance with the code. The positive pulses cause the operation of relay 3607, all negative pulses cause the operation of relay 3606, and the heavy negative pulses cause the operation of relay 3605. Relays 3607 and 3605 in operating close circuits which cause the operation of register relays of Fig. 37. Relay 3606 in operating controls the relay combination 3608—3609 which in turn control relays 3610 to 3624 and 3604 to transfer the circuits controlled by relays 3605 and 3607 from register to register. When the tandem hundreds digit has been received, relays 3610 and 3611 are operated; when the tandem tens digit has been received, relays 3612 and 3613 have been operated and so on. Upon the completion of the stations digit, after which relays 3616 and 3617 are operated, a circuit is closed through the winding of sequence switch 3910, lower right contact of cam 3904, outer left contact of relay 3905, outer left front contact of relay 3616 to ground, advancing sequence switch 3910 to position 2. As soon as switch 3910 reaches position 1¾, circuits are completed from ground, over the lower left contact of cam 3906, over conductor 3780 through the registers 3700, 3710 and 3720 to sequence switch magnets 4000, 4010 and 4020 which serve to position these sequence switches in accordance with the operated relays of registers 3700, 3710 and 3720, respectively. Relays 4003, 4013 and 4023 operate in parallel with the corresponding sequence switch magnets. When these sequence switches have been positioned, the circuits of these relays are opened and they release, to complete a series circuit from ground over the back contact of relay 4003, back contact of relay 4013, back contact of relay 4023, conductor 4036, lower left contact of cam 3904, winding of sequence switch magnet 3910 advancing this sequence switch to position 4.

When switch 3910 reaches position 3½ a circuit is closed for operating one of the translator selecting relays 3907, 3911, 3912 or 3913. Assuming that relay 3907 has been operated (this relay and relay 3911 operate in connection with subscriber dialed codes, while relays 3912 and 3913 operate on operator dialed codes as described in the above identified application of L. H. Johnson et al.), a circuit is thereupon closed over the right contact of cam 3915, back contact of relay 3914, front contact of relay 3907, to the winding of a translator finder exactly like that shown in Fig. 43 and represented diagrammatically by the rectangle 3950. Since the operation of this finder is the same as that of switch 4310 the following description will proceed as if switch 4310 had been selected. The circuit shown in full is that employed in connection with the first test imposed by the test circuit which will be described later.

Magnet 4310 causes the rotation of the translator finder from position to position. When an idle translator has been found, which has been shown connected to the switch 4310 in position 2 therefor, a circuit is completed from battery through the winding of relay 4401, resistance 4402, cam 4403, contact 4405 of jack 4404, lower contact of cam 4303, upper left contact of cam 4304, conductor 4305, inner left contact of relay 3905, both windings of relay 3916, winding of relay 3914 to ground. Relay 3916 operates and closes a shunt around its high resistance winding permitting the operation of relay 3914. Relay 3914 opens the circuit of magnet 4310 so that switch 4310 is brought to rest engaging the idle translator shown in Fig. 44. The operation of relay 3914 also advances sequence switch 3910 to position 5. Relay 4401 also operates closing an obvious circuit for relay 4406 which operates in turn.

*Call to full mechanical office.*

With relay 4406 operated, a fundamental circuit is closed from battery, winding of relay 4407, left contact of relay 4406, upper left contact of cam 4408, lower contact of cam 4308, conductor 4309, conductor 3918, lower contact of cam 3919, conductor 3920, lower contact of cam 3801, back contact of relay 3802, winding of relay 3903, winding of relay 3804, or 3805, contact of cam 4101, contact of cam 3921, lower contact of cam 3806, resistance 3807 to ground. As set forth in the above identified application of Johnson et al., the particular stepping relay to be employed is determined by the setting of class sequence switch 4100. Since the class switch has not been positioned in accordance with the present call at this time, the relay used is that employed in controlling the selections of the previous call. For the purpose of this description we will assume that switch 4100 stands in position 2. Hence the circuit will be extended through relay 3805 and the right contact of cam 4101.

Relay 4407 operates in this circuit and advances sequence switch 4410 to position 2. It prepares the usual locking circuit for itself and also an intermittent holding circuit over its right front contact, upper contact of cam 4409, commutator strip 4483, brush 4414 to ground. The stepping relay 3805 closes a counting relay circuit from battery over the front contact of relay 3601, conductor 3522, through a counting relay, back contact of the corresponding prime counting relay over one of the conductors 3813, 3819, 3822, 3808, 3834 to correspondingly numbered contacts on cams of switch 4000, thence over the left contact of cam 3922, outer right back contact of relay 3908, lower right and upper left contacts of cam 3901, conductor 3923, upper contact of cam 3809, contact of relay 3805, upper left contact of cam 3811 to ground.

In the usual manner the pairs of counting relays are operated and locked as switch 4400 moves upward under the control of up-drive magnet 4412 in its brush selecting movement until the 0 counting relay has been operated and relays 3802 and 3815 operate in the locking circuit thereof. The operation of relay 3802 opens the fundamental circuit permitting relay 4407 to release and advance the translator sequence switch to position 3. Relay 3815 causes the advance of sequence switch 3910 to position 7. Similarly with switch 4410 in positions 3 and 4 and with switch 3910 in position 7 the translator 4400 makes group selections in accordance with the setting of register 4010, after which switch 4410 is advanced to position 5 and switch 3910 to position 9.

With switch 3910 in position 9 and switch 4410 in positions 5 and 6, terminal selection is made by translator 4400 under the control of slow speed up-drive magnet 4419, after which switch 3910 advances to position 11 and switch 4410 to position 7. With switch 4410 in position 7 a local circuit is provided for relay 4407 which advances sequence switch 4410 to position 8. With switch 4410 in position 8 the brushes of the translator, which have been extended to brushes engaging pulse drum 4450, are connected through to the registers of Fig. 42 as described in the application of Johnson et al.

The rotation of drum 4450 causes the segments thereof to make contact with the brushes and to therefore cause the operation of one or more of the relays 4214, 4204, 4203, 4202 and 4215. These relays in turn cause the operation of the corresponding relays of the group 4207, 4218, 4206, 4205 and 4219, whereupon circuits are completed over contacts of these last mentioned relays to the register relays which lock as soon as they are operated. A circuit is also closed from battery, through brush 4420, segment 4421, segment 4423, brush 4424, cam 4429, conductor 4422, lower contact of cam 4311, conductor 4200, lower right and upper left contacts of cam 3928 to the lower contact of cam 3801 and thence as traced over the fundamental circuit through relay 3805 to ground through resistance 3807. The operation of relay 3805 closes a circuit from battery through the No. 1 counting relay, back contact of the No. 1' counting relay, conductor 3819, (Figs. 38 and 39), upper contacts of cam 3901, upper contacts of cam 3809, front contact of relay 3805, upper left contact of cam 3811 to ground.

When brush 4424 leaves segment 4423 the No. 1' counting relay operates in the locking circuit of the No. 1 counting relay which extends through the front contact of the No. 1 counting relay, conductor 3812, lower right contact of cam 3924, to ground. When a complete revolution has been made and the brush 4424 again encounters segment 4423 the 0 counting relay is operated and when brush 4424 leaves segment 4423 relays 3802 and 3815 are operated in the usual manner advancing sequence switch 3910 to position 12, in which position switch 3910 remains for a number of subsequent operations.

In the meantime the code pulses have been received for the setting of the numerical registers 3740, 3750, 3760 and 3770 after which relay 3604 is operated closing a circuit from battery, through the winding of relay 3603, outer right front contact of relay 3604 to ground. Relay 3603 in operating opens the fundamental circuit and locks over its inner right front contact to ground at the contact of relay 3602. It also opens the circuit over conductor 3530 which causes the district selector relay to release and advance the district sequence switch to position for making selections.

When switch 3910 reaches position 11¾, circuits are completed from ground at the lower left contact of cam 3929, over conductor 4230, through contacts of the class register relays 4216, 4220, 4225 and 4228, contacts of sequence switch cams 4103 and 4104 to the winding of sequence switch magnet 4100 and relay 4102. These circuits position the class sequence switch 4100 in accordance with the class of call to be extended. When the switch comes to rest relay 4102 is released and a circuit is closed from ground over the back contact of relay 4102, conductor 3932, upper left contact of cam 3931, conductor 3628, outer right front contact of relay 3603, conductor 3627, lower left contact of cam 3820, winding of sequence switch magnet 3810 to battery, advancing the sequence switch to position 2. With sequence switch 3810 in position 2 a circuit is closed from battery, winding of magnet 3910, lower contact of cam 3925, lower left contact of cam 3821 to ground, advancing the switch 3910 to position 13.

With sequence switch 3810 in position 2, and sequence switch 3910 in position 13, the fundamental circuit is closed from battery in the district selector circuit over conductor 3519, upper left contact of cam 3919, conductor 3920, lower contact of cam 3801, back contact of relay 3802, winding of relay 3803, winding of relay 3805, (assuming that the extension of a full mechanical call is being considered, and that sequence switch 4100 is in position 2) right contact of cam 4101, contact of cam 3921, lower contact of cam 3806, resistance 3807 to ground. District brush selections are made in the manner set forth in the application of Johnson et al. above referred to. District group selections also take place in the usual manner with switch 3810 in position 4.

At the completion of trunk hunting by the district selector, direct ground is connected by means of the link circuit to conductor 3502, thus increasing the current through the left winding of relay 3503 sufficiently to cause that relay to operate. The operation of relay 3503 advances sequence switch 3810 to position 6, in which position ground is connected over the lower left contact of cam 3825, left contact of relay 3523, left back contact of relay 3504, right winding of relay 3503 to conductor 3530, advancing the district selector to permit subsequent selections. The district circuit now removes direct ground from conductor 3502 and relay 3503 releases.

With switch 3810 in position 6 and switch 3910 in position 13 a test is made of the office selector circuit. The fundamental circuit for testing extends from the office selector to conductor 3519 and as before to the winding of relay 3803, over the contact of cam 4105, through the winding of relay 3826, resistance 4106, contacts of cam 4147, lower contact of cam 3827, upper right and lower left contacts of cam 3828, back contact of relay 3933, lower right contact of cam 3850, upper left contact of cam 3800, to conductor 3518 and thence back to the office selector circuit. With the office selector normal, relay 3826 operates, in turn operating relays 3829 and 3930. The operation of relay 3830 advances sequence switch 3810 to position 8, in which position office brush selection is made in the usual manner.

The fundamental circuit for office selections extends as previously described to the winding of relay 3803 and thence through the winding of relay 3805, right contact of cam 4101, left contact of cam 3833, left contact of cam 3934, to conductor 3518 and thence to ground in the office circuit. Office group selections are made over this same fundamental circuit with switch 3810 in position 10. As switch 3810 passes through position 11 at the completion of office group selections, sequence switch 3910 is advanced to position 14. When switch 3910 reaches position 14 a second holding circuit for the district relay is completed over the lower contact of cam 3931, conductor 3932, to ground at the back contact of relay 4102 in substitute for the circuit over the lower left contact of cam 3825.

In position 12 of switch 3810, relay 3826 is again connected across the fundamental circuit, the circuit being identical with that previously traced except that it extends from the lower right contact of cam 3828 to the lower right contact of cam 3934 and conductor 3518. This circuit is for the purpose of testing the incoming selector at the wanted office and results in the operation of relays 3836, 3803 and 3830 as previously described if that selector is normal. The operation of relay 3830 causes the advance of sequence switch 3810 to position 1 as described in the application of Johnson et al. Sequence switch 3810 is advanced to position 2 of its second revolution over the same circuit as advanced it during its first revolution.

When switch 3810 reaches position 2 switch 3910 is advanced to position 15, in which position relay 3933 is operated. Incoming brush selection is made with switch 3810 in position 2, incoming group selection with switch 3810 in position 4, final brush selection in position 6, final tens selection in position 8 and final units selection in position 10, after which switch 3810 is advanced to position 12. After the completion of selections the incoming selector connects battery and ground to the fundamental circuit in the opposite direction to that employed for making selections. With switch 3910 in position 15 and switch 3810 in position 12 the fundamental circuit is the same as is used in making selections.

With current flowing in this reversed direction relay 3803 is operated, as well as relay 3805, in turn operating relays 3818 and 3840. The joint operation of relays 3805 and 3818 closes a circuit for operating the No. 0 counting relay. The closure of the fundamental circuit causes the incoming selector sequence switch to advance, opening the fundamental circuit and permitting the operation of relays 3802 and 3815 in the usual manner, to advance sequence switch 3810 to position 13. Sequence switch 3810 is advanced to position 15 by relay 3818, and to position 16 by relay 3503 which is deenergized at this time.

With switch 3810 in position 16 relay 3504 is operated opening the circuit over conductor 3530. This releases the district relay, advancing the district sequence switch to talking position. When this position is reached, ground is disconnected from conductor 3502 and relay 3602 releases, advancing switch 3910 to position 16. With switch 3910 in position 16, switch 3810 is advanced to position 17, releasing relays 3818 and 3840. The release of relay 3818 advances sequence switch 3810 to position 18, whereupon it is advanced to position 1 in the same circuit in which it advanced to position 17. Switch 3910 is advanced out of position 16 over a local circuit and then to position 1 when switches 4110 and 3810 reach normal.

The busy relay 3601 remains operated as long as either switch 3810 or 3910 is off normal. When these switches are restored relay 3601 releases again connecting battery to conductor 3501 to mark the sender as idle.

Call to manual office.

In the case of a call to a relay call indicator office the operation is the same through district and office selections. At the time of outgoing trunk test with sequence switch 3810 in position 12 and switch 3910 in position 14 the fundamental circuit is closed through relay 3826 in the manner described for a full mechanical call. Relay 3826 operates causing in turn the operation of relays 3829 and 3830. With sequence switch 4100 in a position corresponding to a relay call indicator call that is, an odd position, the holding circuit of relay 3830 is not maintained beyond position 12 but relay 3830 remains operated as long as relay 3826 is operated.

The operation of relay 3830 closes a circuit from battery through the winding of magnet 3810 lower right contact of cam 3832, left contact of cam 4109, front contact of relay 3830, back contact of relay 3836 to ground, advancing switch 3810 to position 13. Switch 3810 is advanced out of position 13 by means of a circuit over class cam 4122 and cam 4123 of the impulse sequence switch according to whether the call is to a manual office directly or to a second tandem office. With switch 3810 in position 14 relay 3826 remains bridged across the outgoing trunk until the distant operator or sender opens the circuit thereof. The release of relay 3826 permits the release of relays 3829 and 3830 so that an impulse circuit is prepared from conductor 3519, upper contacts of cam 3919, left contacts of cam 3839, outer left back contact of relay 3830 to conductor 4132; and from conductor 3518, lower right contact of cam 3934, outer right back contact of relay 3830, upper right and lower left contacts of cam 3828, through resistance 4128 or over the left cuttings of cam 4126 to conductor 4133. The response of the operator or sender at the distant office connects the control relays of the relay call indicator across the trunk, and the extension of the trunk conductors to conductors 4132 and 4133 by the release of relay 3830 permits the connection of ground and battery in varying combinations to complete the circuit in the manner described in detail in the above identified application of Johnson et al.

Sequence switch 4110 which generates the code impulses is started into operation by the release of relay 3830. In order to send out sufficient pulses it completes two revolutions. When switch 4110 passes through position 13 to 16 of its second revolution relay 4139 is operated and closes a circuit through the No. 0 counting relay and thence over the upper contact of cam 3841, conductor 3845 to ground at the front contact of relay 4139. The No. 0 counting relay operates and locks through the windings of relays 3802 and 3815 in parallel in the usual manner.

When switch 4110 leaves position 16 relays 3815 and 3802 operate in the locking circuit of the No. 0 counting relay and relay 3815 advances switch 3810 to position 15. The advance of switch 3810 out of position 14 opens the pulsing circuit. The further release of the sender is the same as described for a full mechanical call. A tandem relay call indicator call differs from a direct relay call indicator call only in that switch 4110 sends out pulses for the office code as well as the numerical designation of the wanted line.

In the case of a direct call indicator call, switch 4110 is advanced to position 12 before switch 3810 closes the pulsing circuit, whereas for a tandem call pulses are sent out beginning with position 1 of switch 4110.

Brief description—operation of the SM sender.

An idle SM sender is characterized by battery through the winding of relay 3203 connected by way of cam 3202 and jack 3201 to conductor 3161, whereas a busy sender is characterized by ground connected thereto by the associated district selector. When the sender has been selected ground is connected to conductor 3161 operating relay 3203, which prepares a locking circuit for itself over the right contact of cam 3202 to conductor 3161 which is completed as soon as sequence switch 3200 advances to position 2. The operation of relay 3203 also extends conductor 3166 over the inner right front contact of relay 3203, upper left contact of relay 3214, upper right contact of relay 3213, to the winding of relay 3212 closes an obvious circuit for relay 3204, and prepares a locking circuit for relay 3209.

It also connects ground to a circuit extending from battery through the right winding of relay 3205, winding of relay 3206, inner right back contact of relay 3205, outer left back contact of relay 3208, contact of interrupter 3210, right contact of cam 3211, to ground at the middle right contact of relay 3203. Relays 3205, 3206, 3207, and 3208 perform a cycle of operations under the control of interrupter 3210 to time the operation of the sender. If the sender operations are not completed in the length of time provided, lamp 3248 is lighted and an auxiliary signal sounded.

Ground from the district selector circuit connected to conductor 3166 causes the operation of relay 3212, which relay connects ground over the upper left contact of cam 3216, left front contact of relay 3212, upper left and lower right contacts of cam 3217, middle right contact of relay 3204 to conductor 3160, causing the district selector sequence switch to advance, whereupon the district relay locks over conductor 3164 left contact of relay 3204, right back contact of relay 3219, upper right contact of cam 3220 to ground. The district selector circuit also connects ground to conductor 3163 completing a circuit over the outer right contact of relay 3204, upper contacts of cam 3218, winding of relay 3209, to battery. Relay 3209 operates and locks to ground at the middle right front contact of relay 3203 and extends conductors 3165 and 3163 to the control of the sender sequence switch 3300. Relay 3209 also closes a circuit from battery through the winding of sequence switch magnet 3200, lower left contact of cam 3221, outer right front contact of relay 3209 to ground advancing sequence switch 3200 to position 2. With sequence switch 3200 in position 2 the circuit of relay 3212 is extended over its right front contact, lower right contact of cam 3224, upper left contact of cam 3225, conductor 2636, upper right contact of cam 2605, winding of sequence switch magnet 2600 to battery. Sequence switch 2600 is advanced from position to position under the control of the district selector relay as described in the above identified patent to E. W. Hancock.

As it passes through positions 1⅜, 2⅜, 3⅜ and 4⅜ a circuit is momentarily closed from ground at the upper left contact of cam 3216, left front contact of cam 3212, upper contacts of cam 3217, conductor 2638, upper contact of cam 2603, lower (normal) contact of cam 2613, conductor 2637, left contact of cam 3222, inner right contact of relay 3204 to conductor 3162 and the fundamental circuit which was established including the relay of the district selector and the stepping relay of the distant sender in the manner described in the above identified patent of E. W. Hancock.

This intermittent circuit shunts the stepping relay of the sender and causes the operation of counting relays for determining the position in which switch 2600 is to come to rest. When the distant sender has been satisfied the fundamental circuit will be opened and the circuit of switch 2600 opened, bringing that switch to rest. Relay 3212 will also be released. According to the position assumed by switch 2600 one of relays 2703 or 2704 is operated to select the corresponding translator 2750 or 2760 respectively. If switch 2600 is set in any one of the positions 3 to 5 a circuit is also closed from battery through the winding of relay 2606, normal contact of cam 2625, conductor 2699, left contact of cam 2711, conductor 2691, upper contact of cam 2601, normal contacts of cams 2611, 2621, 2631, ... 2681, conductor 2639, back contact of relay 3212, upper left contact of cam 3216 to ground. Relay 2606 operates and locks to conductor 2698 which is grounded at the lower left contact of cam 3216 as do relays 2703 or 2704. When either relay 2703 or 2704 operates a circuit is closed from ground at the front contact of one of these relays over conductor 2690, lower right and upper left contacts of cam 3226, winding of sequence switch 3200 to battery, advancing sequence switch 3200 to position 3.

When switch 3200 is in position 3, relay 3227 is substituted for the district selector relay and a circuit is completed from battery through the winding of relay 3227, lower left and upper right contacts of cam 3228, contact of cam 2602 and thence serially through the normal contacts of cams 2612, 2622, etc., to 2682, upper left contact of cam 3222, middle right contact of relay 3204, conductor 3162 and thence through the stepping relay of the distant sender to ground.

Relay 3227 operates and locks over its right contact and the upper right contact of cam 3222 to conductor 3162. The operation of relay 3227 closes a circuit from battery through the winding of relay 3212, upper contacts of cam 3213, left front contact of relay 3227 to ground. Relay 3212 operates and extends its operating ground over its right front contact, lower right contact of cam 3224, lower left contact of cam 3225, left contact of cam 2614, winding of tandem tens register sequence switch 2610. As sequence switch 2610 advances in this circuit an intermittent circuit is closed from battery through the winding of relay 3227 and its right front contact, upper contacts of cam 3222, conductor 2637, upper contact of cam 2613, conductor 2638, upper contact of cam 3217, left front contact of relay 3212, upper left contact of cam 3216, to ground. This circuit is closed as switch 2610 passes through positions N⅜, 1⅜, etc. and serves to shunt the stepping relay of the distant sender, while holding relay 3227 operated.

When the stepping relay of the distant sender has been shunted a sufficient number of times to satisfy the registration there, the circuit of relay 3227 will be opened at the distant sender and that relay will release permitting register 2610 to come to rest in a position corresponding to the setting of the tandem tens register at the distant sender. The release of relay 3227 permits the release of relay 3212. Sequence switch 3200 is advanced to position 4 in a circuit from battery through the winding of the magnet, upper right contact of cam 3229, conductor 2647, upper contact of cam 2611, normal contacts of cam 2621, 2631, etc., to conductor 2659, back contact of relay 3212, upper left contact of cam 3216 to ground. Tandem units register 2620 is set in a manner similar to register 2610 with sequence switch 3200 in position 4. Incoming brush register 2630, incoming group register 2640, final brush register 2650, final group register 2660, final units register 2670 and stations register 2680 are set under the control of the distant sender in subsequent positions of sequence switch 3200. At the completion of registration switch 3200 is in position 11.

In the meantime, when switch 3200 reaches position 5 a circuit is closed from battery through the winding of tandem hundreds register magnet 2600, upper right contact of cam 2605, conductor 2636, left contacts of cam 3309, right contacts of cam 3226, conductor 2690, front contact of relay 2703, or 2704 to ground, advancing switch 2600 to position 6. With sequence switch 2600 in position 6 relay 2701 is operated in a circuit extending to ground over the lower left contact of cam 2608. This relay locks over its right front contact, back contact of relay 2700, right contact of cam 2608 to ground. In operating it closes a circuit from battery through the winding of magnet 2600, upper left contact of cam 2604, conductor 2692, upper contact of cam 2710, to ground at the left front contact of relay 2701. With switch 2600 in position 7 the circuit of the updrive magnet of the selected translator is completed. Assuming that register 2600 was originally set in position 5, translator 2760 will have been selected and the circuit of updrive magnet 2718 will extend over the outer right contact of relay 2704, lower contact of cam 2710 to ground at the left front contact of relay 2701. The positioning of the translator and the operation of the register relays of Fig. 28 is substantially the same as that described in the above identified patent to E. W. Hancock.

When the setting of the registers of Fig. 28 is completed the translator is restored to normal and switch 2600 to position 1. Sequence switch 3300 is advanced to position 2 as switch 2600 passes through position 17. Relays 3401, 3402, 3403, 3404 are also set under the control of the translator and serve to establish the setting of class sequence switch 3400. This sequence switch is set in positions 13¾ to 15 of switch 2600 and its setting is necessary to advance of switch 2600 out of position 15. As in the case of the FM sender the setting of the class switch differentiates between the stepping relays to be used.

Sequence switch 3300 is advanced out of position 1 in a circuit through its winding, upper left contact of cam 3324, conductor 2761, upper left contact of cam 2628 to ground, with sequence switch 2600 in position 17. With sequence switch 3300 in position 2 a circuit is closed from battery through the 0 counting relay 3301, winding of relays 3302 and 3303 in parallel, upper contacts of cam 3325, upper left contact of cam 3232 to ground. Switch 3300 is advanced to position 4 through the operation of relay 3302.

With switch 3300 in position 4 and switch 3200 in position 11, a fundamental circuit is established from the tandem district selector relay over conductor 3165, middle left front contact of relay 3209, right contact of cam 3234, conductor 3235, right contacts of cam 3309, winding of stepping relay 3306 or 3329 depending upon the setting of class switch 3400, contact of cam 3421, conductor 3422, back contact of relay 3303, winding of relay 3307, left contact of cam 3327, resistance 3330, upper contacts of cam 3326, upper left contact 3232 to ground.

Assuming that switch 3400 is set in position 12 corresponding to a call to be completed mechanically, relay 3306 will be included in the above traced circuit. The operation of relay 3306 closes a circuit from ground at the lower contact of cam 3320, over the front contact of relay 3306, upper contacts of cam 3321, left contacts of cam 3233, over the lower left contact of cam 3310, inner right contact of relay 2702, lower contact of cam 3432, conductor 2841, and thence over contacts of relay 2813 and thence over contacts of the district brush register relays to the winding of the appropriate counting relay and over the contacts of cam 3314 or 3332 to battery. District brush selections take place in the manner described in the above mentioned patent to E. W. Hancock after which switch 3300 is advanced to position 6. District group selection is made with switch 3300 in position 6 after which switch 3300 advances to position 8.

With switch 3300 in position 8 office trunk test is made, the fundamental circuit extending from battery over conductor 3165, middle right contact of relay 3209, lower contacts of cam 3218, upper contact of cam 3305, winding of relay 3307, lower right contact of cam 3327, winding of relay 3311, resistances 3328 and 3333, upper right contact of cam 3312, right contact of cam 3241, right back contact of relay 3242, inner right contact of relay 3209, conductor 3163, and thence to ground at the office selector circuit. If the trunk is normal relay 3311 operates in turn operating relays 3313 and 3315. The operation of relay 3315 closes a circuit from battery through the winding of the 0 counting relay 3301, windings of relays 3302 and 3303 in parallel, lower contacts of cam 3336, conductor 3343, back contact of relay 2846, conductor 2847, front contact of relay 3315 to ground. Relays 3301, 3302 and 3303 operate and lock over the back contact of relay 3344, front contact of relay 3301, left contacts of cam 3317 to ground. The operation of relay 3302 advances sequence switch 3300 to position 10.

When switch 3300 leaves position 8, relays 3311, 3313, 3315, 3301, 3302 and 3303 release. Office brush selection takes place with switch 3300 in position 10, the fundamental circuit extending in this case from the winding of relay 3307, over the lower right contact of cam 3308, lower right contact of cam 3241, right back contact of relay 3241, inner right contact of relay 3209, conductor 3163 and thence to ground in the office selector circuit. Office brush selection takes place in the manner described in the Hancock patent, as does office group selection. With sequence switch 3300 in position 12, at the completion of office group selection, the operation of relay 3302 advances sequence switch 3300 to position 13. With sequence switch 3300 in position 13 relay 3350 is operated over the lower right contact of cam 3316 and the upper left contact of cam 3317 to ground. A circuit is also closed from battery through the winding of relay 3238, upper right contact of cam 3316, upper left contact of cam 3317 to ground.

With switch 3300 in position 13 and switch 3200 in position 11 a circuit is established over the outgoing trunk to the distant selected office which extends at the sender over conductor 3162, inner right front contact of relay 3204, upper left contact of cam 3222, conductor 2637, upper contact of cam 2682, conductor 2646, right contacts of cam 3228, winding of relay 3236 to battery. Relay 3236 operates and closes a circuit from battery through the winding of relay 3237, front contact of relay 3236, upper right contact of cam 3225, lower left contact of cam 3224 to ground. Relay 3237 operates and locks over the left normal contact of relay 3219, upper right contact of cam 3225, to ground at the lower left contact of cam 3225. Relay 3237 connects tone from its outer left contact, over the left contact of relay 3204 to conductor 3164 back to the originating office. A circuit is also closed from battery through the winding of relay 3219, conductor 3249, lower right contact of cam 3409, conductor 3412, inner left contact of relay 3238, inner front contact of relay 3237, left normal contact of relay 3219, upper right contact of cam 3225, lower left contact of cam 3224 to ground. Relay 3219 operates and closes a locking circuit for itself and a holding circuit for relay 3237 over its left contacts and the upper contact of cam 3231 to ground, before opening its energizing circuit and the former holding circuit for relay 3237.

The operation of relay 3219 closes a circuit through the winding of sequence switch 3200, upper right contact of cam 3221, middle right contact of relay 3219, upper right contact of cam 3225, lower left contact of cam 3224 to ground. Sequence switch 3200 advances to position 12 in this circuit. It is then advanced to position 13 in a circuit from battery, through the winding of magnet 3200, upper left contact of cam 3229, conductor 2649, upper contact of cam 2681, conductor 2639, back contact of relay 3212, outer contact of relay 3238, upper left contact of cam 3232 to ground. With switch 3200 in position 13 a circuit is closed from battery through the winding of magnet 3300, upper right contact of cam 3324, lower right contact of cam 3231 to ground, advancing switch 3300 to position 14. With switch 3200 in position 13 and switch 3300 in position 14 the outgoing trunk is tested and relay 3311 is connected across the outgoing trunk, the circuit in this case extending from conductor 3165, middle contact of relay 3209, upper left contact of cam 3234, upper contact of cam 3305, winding of relay 3307, upper right contact of cam 3308, winding of relay 3311, resistances 3328 and 3333, upper right contact of cam 3312, lower right contact of cam 3241, right back contact of relay 3242, inner right contact of relay 3209 to conductor 3163. Relay 3311 operates and causes the operation of relays 3313 and 3315 as before.

Relay 3315 in operating closes a shunt around the upper right contact of cam 3312 which holds relay 3311 operated through position 16. The operation of relay 3315 also closes a circuit from battery through the winding of magnet 3300, lower left contact of cam 3324, outer right contact of cam 3414, outer left contact of cam 3315 to ground, advancing switch 3300 to position 17. As soon as switch 3300 leaves position 16 relays 3311, 3313 and 3315 are released. Switch 3300 is advanced out of position 17 and into position 2 over the upper right contact of cam 3324, lower right contact of cam 3231 to ground.

As soon as switch 3300 reaches position 2 a circuit is closed from battery through switch 3200, lower contact of cam 3239, upper left contact of cam 3316, upper left contact of cam 3317 to ground, advancing switch 3200 to position 14. When switch 3200 reaches position 14 a circuit is completed from battery through the winding of relay 3212, right back contact of relay 3247, lower right contact of cam 3216 to ground. Relay 3212 operates and locks over its right contact, lower contacts of cam 3240, outer right front contact of relay 3219, left back contact of relay 3227 to ground.

With switch 3200 in position 14 and switch 3300 in positions 2, 4, 6, 8 and 10 incoming and final selections are made, after which switch 3300 is advanced to position 13. As before relays 3350 and 3238 are operated when the switch reaches position 13. The incoming selector connects battery and ground in the reversed direction to the fundamental circuit, which extends from conductor 3165 over the middle contact of relay 3209, lower right contact of cam 3234, left contacts of cam 3309, winding of relay 3306, right contact of cam 3421, conductor 3422, back contact of relay 3303, winding of relay 3307, lower left contact of cam 3308, resistance 3423, right contacts of cam 3418, conductor 3245, left contact of cam 3241, back contact of relay 3242, inner right contact of cam 3209, conductor 3263. Relays 3307 and 3306 operate in this circuit, the joint operation of these relays closing a circuit from battery, through the winding of relay 3301, back contact of relay 3304, conductor 3342, right front contact of relay 3350, front contact of relay 3307, upper left contact of cam 3246, upper right and lower left contacts of cam 3233, upper contacts of cam 3321, front contact of relay 3306, lower contact of cam 3320 to ground. Relay 3301 locks through the winding of relays 3302 and 3303, back contact of relay 3344, front contact of relay 3301, left contacts of cam 3317 to ground.

The completion of the test circuit just described causes the advance of the incoming selector to open the circuit and permit the release of relays 3306 and 3307 so that relays 3302 and 3303 are operated in the locking circuit of relay 3301. Relay 3302 closes a circuit from battery through the winding of relay 3247, left front contact of relay 3350, contact of relay 3302 to ground. Relay 3247 operates and locks over its inner left contact to ground at the upper right contact of cam 3232. It also connects ground to conductor 3160 over the middle contact of relay 3204, inner right contact of relay 3247, and the lower right contact of cam 3216, causing the advance of the district sequence switch to a position in which ground is connected to conductor 3166 which completes a circuit through the inner right contact of relay 3203, upper contacts of cam 3214, winding of relay 3227 to battery.

Relay 3227 operates, opening the locking circuit of relay 3212 and connecting its operating ground over its right front contact, outer left contact of relay 3247, left contact of relay 3204 to conductor 3164. This ground causes the advance of the district selector sequence switch, which causes the release of relay 3227 and connects ground over conductor 3164, left contact of relay 3204, outer left contact of relay 3247, right contact of relay 3227, outer right contact of relay 3247, back contact of relay 3212, middle right contact of relay 3247, lower right contact of cam 3221 winding of sequence switch magnet 3200 to ground. This circuit advances switch 3200 out of position 14 and it is continued to position 17 under the control of its master cam.

When switch 3200 reaches position 15 the locking circuit of relay 3219 is opened and that relay releases as does relay 3237. When switch 3200 arrives in position 17 the ground connected from the district to conductor 3164 is extended over the left contact of relay 3204, outer left contact of relay 3247, right back contact of relay 3227, outer right contact of relay 3247, back contact of relay 3212, middle right contact of relay 3247, left contacts of cam 3214, inner right contact of relay 3203 to conductor 3166. This ground causes the district to advance to talking position, whereupon the holding circuit of relay 3203 is opened and that relay releases, in turn releasing relays 3204 and 3209. The release of relay 3203 connects ground over the right contact of cam 3202 and jack 3201 to conductor 3161 holding the sender busy until released. The release of relay 3209 closes a circuit from battery through the winding of sequence switch magnet 3200, upper left contact of cam 3221, back contact of relay 3209 to ground which advances this switch to position 18.

With switch 3200 in position 18 a circuit is closed from battery through the winding of magnet 3300, lower right contact of cam 3224, lower left contact of cam 3232 to ground, advancing switch 3300 to position 17. Switch 3300 is then advanced to position 18 in a circuit over the lower left contact of cam 3323, conductor 3343, right contact of cam 2706, right back contact of relay 2072, conductor 2762, lower right contact of cam 2607 to ground. It is then advanced to position 1 in a circuit over the lower contacts of cam 3319, left contacts of cam 3462, right contact of cam 3431 to ground. With switch 3200 in position 18 an obvious circuit is closed for relay 3244 which connects ground over the right contacts of cams 2634, 2644, 2654, 2664, 2674 and the left contact of cam 2684, to the windings of the corresponding register magnets restoring these registers to normal. Circuits are also completed from ground over the lower contacts of cam 3220 to the left contact of cams 2614 and 2624, advancing switches 2610 and 2620 to normal. When all these switches have reached their normal position a circuit is closed from battery through the winding of magnet 3200, left contacts of cam 3226, over the normal contact of cams 2601, 2611, etc. to 2681, conductor 2639, lower contacts of cam 3213, upper left contact of cam 3320 to ground, advancing sequence switch 3200 to position 1, in which position ground is disconnected from conductor 3161, and relay 3203 connected therewith to mark the sender as ready for subsequent calls.

In the case of a relay call indicator call, the connection progresses as described as far as the trunk test which takes place with switch 3200 in position 13 and switch 3300 in position 14. If the trunk is normal relay 3311 operates in turn operating relays 3313 and 3315. With relay 3315 operated a circuit is completed from ground at its outer left contact, left contact of class cam 3414, upper right contact of cam 3323, winding of magnet 3300 to battery advancing the switch to position 15. The operation of relay 3315 also closes a circuit in shunt of the contact of cam 3312 as previously described to hold relay 3311 operated when switch 3300 leaves position 14¾. The advance of switch 3300 also causes the release of relay 3350. With switch 3300 in position 15 a circuit is closed from ground at the impulser cam 3461, left contact of cam 3415, lower right contact of cam 3323, to the winding of magnet 3300 advancing the sequence switch to position 16. The sender remains in this condition until the operator at the relay call indicator office depresses her assignment key, which opens the circuit of relay 3311 releasing that relay and in turn releasing relays 3313 and 3315.

The release of relay 3315 extends conductor 3165 over the middle contact of relay 3209, upper contact of cam 3234, lower contact of cam 3305, middle contact of relay 3315, contact of cam 3425, to the inner left back contact of relay 3463 from whence it is extended in the usual manner to battery and ground over contacts of cams of impulser sequence switch 3460. Conductor 3163 is extended over the inner contact of relay 3209, back contact of relay 3242, right contact of cam 3241, inner left back contact of relay 3315, contact of cam 3426 through resistance 3427, or in shunt through the cam 3428, to the outer left armature of relay 3463 and thence to battery and ground in the usual manner. The generation and transmission of relay call indicator pulses by means of a sequence switch such as sequence switch 3460 is well known and also is set forth in the above identified patent to E. W. Hancock and will not be described.

When the impulser sequence switch 3460 reaches position 18 after sending out the pulses, a circuit is closed from ground over the lower left and upper right contacts of cam 3318, conductor 3417, lower left contact of cam 3464, right alternate contact of relay 3463, (which operates when switch 3460 reaches position 16¾) upper contact of cam 3416, conductor 3243, lower right and upper left contact of cam 3214, inner right contact of relay 3203 to conductor 3166 advancing the district selector sequence switch to talking position.

The advance of the district selector causes the release of relays 3203, 3204 and 3209 as previously described. The release of relay 3209 advances sequence switch 3200 to position 18 in a circuit over the upper left contact of cam 3221 to ground at the back contact of relay 3209. With sequence switch 3200 in position 18, sequence switch 3300 is advanced to position 17 over the lower right contact of cam 3324, lower left contact of cam 3232 to ground.

The further release of the sender is the same as described except that the impulser sequence switch 3460 stops in position 18 and is advanced out of that position to position 1 by means of a circuit over the right contact of cam 3465, upper contacts of cam 3433, and the lower contacts of cam 3318 to ground.

Description of the test circuit.

*Preparation of circuit for test.*—The test circuit is connected with the senders by means of step-by-step switches as shown in Fig. 31. Switch 3140 is one of a plurality of similar switches used for selecting FM senders. Switches 3120 and 3130 are both employed in the selection of SM senders. Both groups of stepping switches are under the control of master switches 3100 and 3110 which direct conductors of the test circuit to the proper selector switch. Only a small number of SM senders are provided and the connections have been shown as though only switches 3120 and 3130 were employed, although it is obvious that more switches and more senders can be tested with the present arrangement.

As in the case of the U. S. Patent No. 1,523,408, to William L. Dodge granted January 20, 1925, it is possible with this arrangement to give each sender a complete test, including nine different types of calls which must be handled by the sender, or to make such a test on any one of the senders. It is likewise arranged to make a single test of each sender or to repeat a single test on a given sender. However, since the particular features of the invention will be sufficiently pointed out if only a few of the tests are described, certain tests will be omitted in the following description. The test which would be most generally used in practice would be a multi-test of the senders and a portion of this type of test will be described in detail.

Assuming that all the apparatus is normal and the test is to be started, multi-test key 2401 and start key 2400 will be operated. The operation of these keys closes a circuit from battery through the winding of relay 3001, conductor 3002, inner upper normal contact of control advance key 2402, conductor 2412, normal contact of brush 3055 of timing switch 3050, lowermost left operated contact of start key 2400 to ground. Relay 3001 operates and locks over conductor 3002, contact of key 2402, conductor 2412, outer left contact of relay 3001, conductor 3037, right back contact of relay 2516, conductor 2527, normally closed time alarm key 2413, conductor 2414, right contact of cam 1547, conductor 1548, lowermost left operated contact of start key 2400.

Relay 3001 closes a circuit from battery through the winding of stepping magnet 3051, inner right contact of relay 3001, brush 3054 and its strapped bank terminals to the contact of interrupter 3056. When interrupter 3056 closes its contact it causes the operation of magnet 3051 and the advance of the timing switch.

The operation of key 2400 also closes a circuit in the nature of a check of the normal condition of the testing apparatus. This circuit extends from battery through the right winding of relay 2500, conductor 2501, upper contacts of cam 3003, conductor 3040, inner lower operated contact of start key 2400, conductor 2403, inner right back contact of relay 1600, upper contacts of cam 1101, lower contacts of cam 1501, conductor 1502, upper contacts of cam 2901, conductor 2902, upper contact of cam 1701 to ground. It will be noted that this circuit is completed only when sequence switches 1100, 1500, 2900, and 1700 are in position 1. It will also appear later that it is only completed when switch 2000 is in position 1 since relay 1600 is operated as soon as that switch reaches position 2. Ground connected in this manner to conductor 3040 will be identified from now on as the normal ground.

Relay 2500 operates and locks over its left front contact, right back contact of relay 2511, contact of relay 2512, left back contact of relay 2503, lower right contact of cam 3020 to ground. The operation of relay 2500 closes a circuit from battery through the winding of sequence switch magnet 3000, lower right contact of cam 3004, conductor 3041, right front contact of relay 2500, left back contact of relay 2502 to ground, advancing sequence switch 3000 to position 2. With sequence switch 3000 in position 2 a circuit is closed from battery through the winding of relay 2503, normal contact of brush 3102, conductor 3150, lower contact of cam 3005, conductor 3011, normal contact of brush 3112, conductor 3151, lower contact of cam 3006 to ground. The operation of relay 2503 opens the locking circuit of relay 2500 and that relay releases. It also closes an obvious circuit for relay 2504 which relay operates and locks over its left front contact to grounded conductor 3151.

Relay 2504 closes an obvious circuit for relay 2505, which relay operates and completes a circuit from battery through the winding of magnet 3000, upper left contact of cam 3004, conductor 3007, front contact of relay 2505, conductor 2506, lower contacts of cam 3008, conductor 3009, inner right contact of relay 2503, conductor 2507, normal contact of brush 3112, to grounded conductor 3151, advancing sequence switch 3000 to position 3.

Sequence switch 3000 is then immediately advanced to position 4 in a circuit through the winding of that magnet, lower left contact of cam 3004, conductor 3010, right back contact of relay 2500, left back contact of relay 2502 to ground. When sequence switch 3000 leaves position 2 the circuit of relay 2503 is opened and that relay releases closing a circuit from battery through the winding of magnet 3000, upper right contact of cam 3004, conductor 3011, brush 3112 to grounded conductor 3151. Sequence switch 3000 is advanced to position 5.

With switch 3000 in position 5 a circuit is closed from battery through resistance 3012, winding of relay 3013, lower right contact of cam 3014, lower left contact of cam 3015, upper right operated contact of key 2400, inner right front contact of relay 2504 to ground. Relay 3013 operates in this circuit and closes a circuit from battery through the winding of magnet 3000, lower left contact of cam 3016, front contact of relay 3013 to ground, advancing switch 3000 to position 7. As switch 3000 passes through position 6 relay 3013 releases.

The following circuits are also prepared in position 6: from battery, resistance 3012, winding of relay 3013, lower right contact of cam 3014; battery, through the winding of stepping magnet 3101, upper right contact of cam 3014; battery, through the winding of stepping magnet 3111 to the upper right contact of cam 3014, battery through resistance 3012, right contacts of cam 3017, to the back contact of magnet 3101 and thence to the upper left contact of cam 3014; battery through resistance 3012, upper right and lower left contacts of cam 3017, back contact of magnet 3111 to the upper right contact of cam 3014. When switch 3000 reaches position 7 these circuits are extended over the lower left contact of cam 3015, outer upper right operated contact of key 2400, inner right front contact of relay 2504 to ground. The stepping magnets 3101 and 3111 operate in this circuit but, due to the last two circuits traced which are in shunt of the winding of relay 3013, that relay does not operate until both magnets 3101 and 3111 have completely attracted their armatures to break their back contacts. When these shunt circuits are opened relay 3013 operates and closes the previously traced circuit for advancing switch 3000 to position 8. The circuits of magnets 3101 and 3111 are opened when switch 3000 leaves position 7 and these magents release to advance the brush sets of master selectors 3100 and 3110 to their No. 1 terminals which are connected with the first of the FM sender selector switches 3140.

With switch 3000 in position 8 a circuit is prepared from battery, through resistance 3012, winding of relay 3013, lower right contact of cam 3014 to cam 3015. A circuit is also prepared from battery through the winding of stepping magnet 3141, No. 1 terminal of brush 3104 of master switch 3100, outer upper left operated contact of start key 2400, upper contact of cam 3015. A short circuit around the winding of relay 3013 is also prepared from battery, resistance 3012, upper right contact of cam 3017, upper contact of cam 3008, brush 3105, back contact of magnet 3141 and thence over the circuit traced for magnet 3141, to the upper contact of cam 3015. Switch 3000 is advanced out of position 8 over a circuit through its winding, upper left contact of cam 3016, conductor 3018, outer right back contact of relay 2508, conductor 2529, left contacts of cam 3019, strapped contacts of bank of brush 3102, conductor 3150, upper contact of cam 3005, to the normal ground on conductor 3040. Magnet 3141 operates opening the shunt around relay 3013 and permitting that relay to operate. As before the operation of relay 3013 causes the advance of sequence switch 3000, this time to position 10.

When switch 3000 leaves position 9 the circuit of magnet 3141 is opened and that magnet releases advancing its brush set to the first sender. Relay 3013 also releases. Position 10 is a second normal position for switch 3000 and it is advanced out of that position due to the operation of relay 2500 in the same circuit from normal ground on conductor 3040 as it was originally advanced from position 1.

Switch 3000 is now advanced out of position 11 in a circuit over the upper left contact of cam 3004, conductor 3007, inner right back contact of relay 2508, contact of brush 3112, conductor 3151 to ground at the lower left contact of cam 3006. Since switch 3102 is stepped off normal no circuit was completed for relay 2503 in position 11 and relay 2500 remains locked through position 13 of switch 3000.

*Testing selected sender to determine if it is busy or idle.*—A circuit is now prepared for testing whether or not the sender is busy and to make it busy if it is idle. A circuit is prepared from ground through the winding of relay 2512, both windings of relay 2513, left back contact of relay 2511, conductor 2514, lower contact of cam 3021, outer left back contact of relay 2519, lowermost left normal contact of particular circuit key 2404, brush 3116 and its corresponding terminal, brush 3142 and its corresponding terminal to conductor 3501. It will be remembered that an idle sender is characterized by battery through resistance 3600 connected to conductor 3501 and a busy sender by absence of such battery potential.

Assuming that the sender shown in Figs. 35 to 43 is the selected sender and is idle, the above traced circuit will be extended through resistance 3600, back contact of relay 3601 to battery. The current in this circuit causes the operation of relay 2513 which immediately short-circuits its high resistance winding to cause the operation of relay 2512. Relay 2512 opens the locking circuit of relay 2500 and that relay releases, closing a circuit through the winding of sequence switch magnet 3000, lower left contact of cam 3004, conductor 3010, right back contact of relay 2500, left back contact of relay 2502 to ground, advancing switch 3000 to position 13.

If a busy sender is encountered this circuit is not completed and relay 2500 remains operated. As long as switch 3000 remains in position 12 and relay 2500 is operated a circuit is completed from battery through lamp 3022, lower contacts of cam 3023, conductor 3041, right front contact of relay 2500, left back contact of relay 2502 to ground, indicating that the sender is busy and the test circuit is awaiting its release.

With switch 3000 in position 13, and the sender idle ground is connected from the right back contact of relay 1601 through resistances 1602, 1603 and 1604, over the back contact of either relay 1605 or 1606, left back contact of relay 1600, conductor 1607, lower contacts of cam 3024, conductor 3043, inner left back contact of relay 2519, inner lower left normal contact of key 2404, brush 3117 and its corresponding contact, brush 3143, conductor 3502, left winding of relay 3503, outer left contact of relay 3601, winding of relay 3602 to battery. Relay 3602 operates and locks independent of the contact of relay 3601. It also causes the operation of relay 3601 to remove battery from conductor 3501 and mark the sender busy to link circuits. As described in the operation of the FM sender relay 3602 connects ground to conductor 3530 which is extended over brush 3144, brush 3107, upper right normal contact of key 2404, conductor 2405, outer right back contact of relay 1600, conductor 1608, right contacts of cam 3003, conductor 2501, right winding of relay 2500 to battery. Relay 2500 operates and advances switch 3000 to position 14, in which position the sequence switch 3000 remains throughout the test of the sender. When switch 3000 leaves position 13 relays 2512, 2513 and 2500 release.

With switch 3000 in position 14 a circuit is completed from battery through the winding of number sequence switch 1700, upper right contact of cam 1702, inner left back contact of relay 1703, conductor 1704, inner lower left operated contact of multi-test key 2401, conductor 2406, right contacts of cam 1503, conductor 1504, upper contacts of cam 3025, inner upper left operated contact of switch 2400, right back contact of relay 2515, inner left back contact of relay 2504, conductor 3151, lower contact of cam 3006 to ground. This advances sequence switch 1700 to position 2, in which position a circuit is completed from battery through the winding of relay 1703, left contact of cam 1705, conductor 1706, inner left back contact of relay 2516, conductor 2517, lower left and upper right contacts of cam 3026, conductor 3027, upper right contact of cam 1505 to ground. Relay 1703 operates and locks over its inner right front contact and the upper right contact of cam 1705 to the above traced energizing circuit.

*Test of sender for call to operator's desk.*

*Setting registers of test circuit.*—With switch 1700 in position 2 the registers are set to control the first test call which is that to an operator's desk. A circuit is completed from battery, through the winding of relay 1201, upper left contact of cam 1709, conductor 1710, outer left back contact of relay 2505, conductor 2518, upper right contact of cam 3028 to ground. Another circuit is closed from battery through the winding of relay 1200, contacts of cam 1707, conductor 1708, left normal contact of particular number key 2407, conductor 2408, inner left front contact of relay 1703 to conductor 1704 and thence to ground at cam 3006 as described for the operating circuit of switch 1700. Relays 1200 and 1201 provide operating ground for the register switches.

Class switch 500 is set in position 1 by means of a circuit through the winding of that sequence switch, lower left contact of cam 501, conductor 502, left contacts of cam 1711 to ground at the inner right contact of relay 1200. District brush register 300 is set in position 5 by means of a circuit through the winding of that sequence switch, upper right contact of cam 301, conductor 302, outer left back contact of relay 1202, outer left front contact of relay 1201 to ground. District group register 310 is set in position 5 by means of a circuit through its winding, upper right contact of cam 311, conductor 312, inner left back contact of relay 1203, outer right front contact of relay 1201 to ground. Office brush register 320 is set in position 6 (skip office position) by means of a circuit through that magnet, upper left contact of cam 321, conductor 322, right back contact of relay 1204, inner right front contact of relay 1201 to ground. Office register 330 is not set since the office selections are to be skipped. Compensating resistance switch 900 is set in position 5 in a circuit extending from battery, through magnet 900, upper right contact of cam 901, conductor 902, middle left front contact of relay 1201 to ground.

Tandem hundreds register 1400 is set in position 1 in a circuit extending from battery, winding of the sequence switch magnet, lower left contact of cam 1401, conductor 1402, inner left back contact of relay 1205, upper right contact of cam 1712, upper right contact of cam 1713, conductor 1714, upper right contact of cam 3029 to ground. Tandem tens register 1450 is set in position 1 due to a circuit through the winding of that magnet, lower left contact of cam 1451, conductor 1452, outer right back contact of relay 1206, lower left contact of cam 1715, upper right contact of cam 1716, conductor 1717, upper left contact of cam 3020 to ground. Tandem units register 1900 is set in position 2 due to a circuit through the winding of the magnet, lower right contact of cam 1901, conductor 1902, outer left back contact of relay 1207, lower left contact of cam 1718, lower right contact of cam 1719, conductor 1720, upper right contact of cam 3006 to ground. No circuits are provided for setting the numerical registers since this call is one which does not require a numerical setting. A relay is provided with each of these registers and the energizing circuit for the register magnet is transferred to this relay when the switch comes into the desired position. Therefore when all of these registers have been positioned a circuit is completed from ground at the front contact of relay 503, over the front contacts of relays 303, 313, 323, contact of cam 378, front contacts of relays 903, 1403, 1453 and 1903 thence over conductor 1905, lower left contact of cam 1702, winding of sequence switch magnet 1700 to battery.

Sequence switch 1700 is advanced to position 3 in this circuit, releasing relays 1200 and 1201 which in turn release the register relays 303 etc. which were operated over the front contacts thereof. Likewise in passing from position 2 to position 3 the circuits completed over the cams of switch 1700 are opened and the remaining register relays released. Relay 1703 being operated at this time the circuit for advancing sequence switch 1700 out of position 3 is opened at the inner left armature of that relay.

When sequence switch 3000 advances to position 14 as previously described, the circuit for relay 2500 is opened at cam 3003 and a circuit is closed from ground connected to conductor 3530 by the sender as described over brush 3144, brush 3107, upper right normal contact of key 2404, conductor 2405, left back contact of relay 2520, conductor 3031, right contacts of cam 3030 conductor 2106, right back contact of relay 2107, conductor 2002, left contact of cam 2001, conductor 1609, left contact of relay 1601, conductor 1103, winding of relay 1102 to battery. Relay 1102 operates and closes an obvious circuit for relay 1104 which also operates. A parallel path from battery through resistance 2409, middle right operated contact of key 2400, conductor 1610, to the left contact of relay 1601, aids in supplying the correct amount of current to the right winding of relay 3503.

With sequence switch 1700 in position 3, a circuit is closed from battery, through the winding of relay 2903, lower contacts of cam 2904, right back contact of relay 2905, conductor 2906, right back contact of relay 1611, conductor 1612, inner left back contact of relay 2521, conductor 2522, right contacts of cam 1718, inner left front contact of relay 1703, conductor 1704, and thence as previously traced to ground at the lower left contact of cam 3006. Relay 2903 operates and closes a locking circuit for itself over its inner left contact, lower right contact of cam 2909, upper contacts of cam 3025, inner upper left operated contact of key 2400, right back contact of relay 2515, inner left contact of relay 2504, conductor 3151 to ground at the lower left contact of cam 3006. This locking circuit becomes effective when sequence switch 2900 reaches position 3. It also closes a circuit from battery, through the winding of relay 2907, conductor 2908, outer left front contact of relay 1104, conductor 1105, inner right front contact of relay 2903, upper contacts of cam 3025 and thence as traced for the locking circuit of relay 2903 to ground at the lower left contact of cam 3006. Relay 2907 in operating closes a locking circuit for itself extending over conductor 2908, contact of relay 1104, conductor 1105, outer right front contact of relay 2907, upper right contact of cam 2909, upper contacts of cam 3025 and thence to ground as just traced. The operation of relay 2907 closes a circuit from battery through the winding of sequence switch magnet 2900, upper contact of cam 2910, outer left front contact of relay 2907 to conductor 2906 and thence over the operating circuit of relay 2903 to ground.

*Transfer of registrations from test circuit to sender.*—Switch 2900 serves to send out relay call indicator pulses in much the same manner as the impulser switch of the sender. However the switch comes to rest in position 5 and is driven out of that position by the operation of relay 2905. Relay 2905 is operated when switch 2900 reaches position 4¾ over a circuit extending over the lower contacts of cam 2911, outer left front contact of relay 2907 and thence over the energizing circuit of relay 2903 to ground. As soon as relay 2905 operates a circuit is closed from battery, winding of magnet 2900 over the lower contact of cam 2910, the inner left front contact of relay 2905, left contact of cam 2909, upper contacts of cam 3025 and thence as traced to ground. Relay 2905 in operating closes a locking circuit for itself over its inner right front contact and grounded conductor 2906.

The impulse circuit may be traced from conductor 2101 in Fig. 29, inner back contact of relay 2100, right contacts of cam 2003, conductor 3033, upper contacts of cam 3032, inner upper left normal contact of switch 2404, conductor 3152, brush 3114, brush 3147, conductor 3519, inner left back contact of relay 3603, right back contact of relay 3604, winding of marginal relay 3605, negatively polarized relay 3606, positively polarized relay 3607, inner left back contact of relay 3604, left contacts of cam 3800, conductor 3518, brush 3146, brush 3115, conductor 3153, lowermost left normal contact of key 2404, upper contacts of cam 3023, conductor 3034, lower right contact of cam 2004, conductor 2005, resistances 2914 and 2915. Ring conductor 2005 is extended to feed conductor 2926 over the lower contact of cam 2916, and the middle left contact of relay 2907 in positions 4¾+6 of the first revolution of switch 2900.

From position 5 of the first revolution through position 7 of the second revolution, conductor 2005 extends over the outer left front contact of relay 2905, middle left front contact of relay 2907 to conductor 2926 and in positions 7+16¾ of the second revolution it extends over the outer left front contact of relay 2905, upper contact of cam 2916 to conductor 2926. Conductor 2926 is connected to ground as switch 2900 passes its odd positions at the lower contact of cam 2912. It is connected to battery through high resistance 2918, right contact of cam 2919 and low resistance 2920 in positions 1¾+2½, 5½+20¼ of both revolutions and over the right back contact of relay 2903 in position 3½+4½ of the second revolution. Conductor 2926 is extended through one of the registers of Figs. 14, 19 and 23 and a contact of cam 2925, 2927 and 2929 according to the position of switch 2900 and thence over the outer right front contact of relay 2903, low resistance 2920 to battery, as long as relay 2903 is operated, provided the setting of these registers is such as to complete the circuit. Other registers are connected to battery through low resistance 2920 through cams 2911, 2928, 2930, 2921, 2931 and 2932.

Tip conductor 2101 is extended to feed conductor 2933 in positions 4¾+6 of the first revolution over the lower contact of cam 2917 and the inner left front contact of relay 2907. In position 5 of the first revolution through position 7 of the second revolution, it is extended over the outer right front contact of relay 2505 and the inner left front contact of relay 2907 to conductor 2933, and in positions 7+16½ of the second revolution over the outer right front contact of relay 2905, and the upper contact of cam 2917 to conductor 2933. Conductor 2933 is connected to ground at the upper contact of cam 2912 as switch 2900 passes through its even positions, and is extended over the contacts of cam 2913, contacts of the registers of Figs. 14, 19 and 23 and contacts of cams 2904, and 2940 and the front contact of relay 2903; cams 2934, and 2935, and the back contact of relay 2903; or cam 2936 to high resistance 2941 and battery.

Tandems hundreds pulses are sent out in positions 4¾ to 8¼, tandem tens in positions 8¾ to 12¼, tandem units in positions 12¾ to 16¼, stations in positions 16¾ to 20¼, thousands in positions 20¾ to 4¼ of the second revolution, hundreds in positions 4¾ to 8¼, tens in positions 8¾ to 12¼ and units in positions 12¾ to 16¼. When switch 2900 leaves position 17 of its first revolution relay 2903 is released. When it leaves position 7 of its second revolution relay 2907 is released. When it leaves position 16½ the impulse circuits are opened at all points and no more pulses are sent out. It will be noted that the pulses sent out under the present circumstances for stations, thousands, hundreds, tens and units digits will be those for digits corresponding to the last setting of the registers 1930, 1960, 2300, 2330 and 2360 but since both the sender and test circuit disregard these digits it is immaterial.

Since register 1400 is in position 1, 1450 in position 1 and 1900 in position 2 the following pulses will have been sent out in position 4¾+16¼ of the first revolution of switch 2900:

```
 4¾+  5¼—none
 5¾+  6¼—light negative
 6¾+  7¼—none
 7¾+  8¼—light negative
 8¾+  9¼—none
 9¾+10¼—light negative
10¾+11¼—none
11¾+12¼—light negative
12¾+13¼—positive
13¾+14¼—light negative
14¾+15¼—none
15¾+16¼—light negative
```

In the well known manner the light negative pulses cause the operation of relay 3606, the cycle of operations of relays 3608 and 3609, and in turn the operation of relays 3610, 3611, 3612, 3613, 3614 and 3615. The positive pulse which is received at the beginning of the third digit will cause the operation of relay 3607 to close a circuit from ground at the inner left front contact of relay 3602, over conductor 3788, left contact of cam 3903, conductor 3630, front contact of relay 3607, back contact of relay 3608, conductor 3632, left front contact of relay 3610, left front contact of relay 3612, left back contact of relay 3614, winding of relay 3721 to battery. Relay 3721 operates and locks to an extension of grounded conductor 3788.

In responding to the stations pulses, relays 3616 and 3617 will be operated and a circuit completed as previously described to advance switch 3910 to position 2. With relay 3821 operated, as soon as switch 3910 reaches position 1¾ connecting ground to conductor 3780, this ground is extended over the left back contact of relay 3704, to conductor 4030, and over the left back contact of relay 3703, left back contact of relay 3702, right back contact of relay 3701 to conductor 3707. Conductor 4030 is connected over the upper left contact of cam 4001 and conductor 3707 over the lower left contact of cam 4002 to the winding of register magnet 4000. Due to these circuits switch 4000 is moved to position 1 or position 10.

Similarly grounded conductor 3780 is connected over the left back contact of relay 3714 to conductor 4033 and over the left back contact of relay 3713, left back contact of relay 3712, right back contact of relay 3711 to conductor 3716. Conductor 4033 is connected over the upper right contact of cam 4011 and conductor 3716 over the upper left contact of cam 4012 to the winding of register magnet 4010. The completion of these circuits moves register 4010 into position 10.

Conductor 3780 is also extended over the left back contact of relay 3724, to conductor 4034 and over the left back contact of relay 3723, left back contact of relay 3722, right front contact of relay 3721, to conductor 3727. Conductor 4034 is connected to the winding of switch 4020 over the lower contact of cam 4021, and conductor 3727 is connected to the winding of that magnet over the upper right contact of cam 4022. The completion of these circuits brings switch 4020 to position 1 or position 11. Relays 4003, 4013 and 4023 are operated in parallel with switches 4000, 4010 and 4020 respectively, and when these switches come to rest the corresponding relays release, closing a circuit from ground over the back contact of relays 4003, 4013 and 4023 and thence over the lower left contact of cam 3904 to the winding of sequence switch magnet 3910 advancing that sequence switch to position 4.

With switch 4000 in position 10, when switch 3910 reaches position 2¾ a circuit is closed from battery through the winding of relay 3908, contact of cam 4008, lower right contact of cam 3906 to ground. With relay 3908 operated, as soon as sequence switch 3910 reaches position 3½ a circuit is closed from battery through the winding of relay 3912, upper contact of cam 4026, upper contact of cam 4027, left front contact of relay 3908, lower left and upper right contacts of cam 3909 to the ground at the back contact of relay 3905. The operation of relay 3912 initiates the selection and the operation of a translator adapted to translate office codes for desk calls and the setting of the registers of Fig. 42. Without tracing this operation in detail it will be stated that the following relays are operated:

District brush relays—4221, 4234
District group relays—4222, 4236
Office brush relays—4238, 4217, 4242
Office group relays—none
Class register relays—4220, 4228

For a complete description of the operation of the translator finder and translator reference may be had to the previously identified application of L. H. Johnson et al.

At the completion of the setting of the registers of Fig. 42, switch 3910 is advanced to position 12 as described. With switch 3910 in position 12 the operation of relays 4220 and 4228 closes circuits from the winding of class sequence switch 4100 over the upper left contact of cam 4104, conductor 4231, back contact of relay 4225, conductor 4230, lower right contact of cam 3929 to ground; over the lower right contact of cam 4104, conductor 4250, right front contact of relay 4220 to grounded conductor 4230; over the upper right contact of cam 4103, conductor 4251, right front contact of relay 4228, to grounded conductor 4230; and the lower left contact of cam 4103, conductor 4232, right back contact of relay 4216, to grounded conductor 4230. These circuits cause switch 4110 to move to position 10. Relay 4102 is operated in parallel with magnet 4100 and when it closes its back contact after magnet 4100 comes to rest it completes a circuit for advancing switch 3810 to position 2. As soon as switch 3810 reaches position 2 switch 3910 is advanced to position 13. With switch 3910 in position 13 and switch 3810 in position 2 the fundamental circuit is closed in the sender for making district brush selection in the manner previously described.

When the last pulse of the units digit is received by the sender, relay 3604 operates in the locking circuit of relay 3624 and closes an obvious circuit for relay 3603. The operation of relay 3603 disconnects ground from conductor 3530 permitting the release of relay 1102 and the consequent release of relay 1104. When switch 2900 completes its second revolution and again arrives in position 1 a circuit is completed from battery through the winding of sequence switch magnet 1500, upper left contact of cam 1506, conductor 1507, outer right back contact of relay 1104, conductor 1106, right contacts of cam 2006, conductor 2007, right contacts of cam 2921, inner right back contact of relay 2907, inner left front contact of relay 2905, left contact of cam 2909, upper contacts of cam 3025, inner upper left operated contact of key 2400, right back contact of relay 2515, inner left back contact of relay 2504, conductor 3151 to ground at the lower contact of cam 3006. Sequence switch 1500 is advanced to position 2 in this circuit, opening at cam 1505 the locking circuit of relay 1703, putting the number switch in readiness for controlling the next test call.

*Checking operation of sender for district brush selection.*—When switch 1500 arrives in position 2 a circuit is closed from battery through the lamp 2394, conductor 2384, right contact of cam 305 of district brush register 300, conductor 306, district brush lamp 1520, upper left contact of cam 1514 to ground. Lamps 2390 to 2399 indicate the position of the register in use and lamps 1520 to 1528 indicate the selection being checked.

With switch 1500 in position 2 a fundamental circuit is established for controlling district brush selections. This circuit extends from battery, winding of relay 1000, right back contact of relay 1001, back contact of relay 400, right back contact of relay 1002, right contact of key 1003, conductor 1004, upper left and lower right contact of cam 2008, conductor 2009, back contact of relay 505, conductor 506, lower contact of cam 1508, conductor 1509, conductor 2101, inner back contact of relay 2100, right contacts of cam 2003, conductor 3033, upper contacts of cam 3032, inner upper left normal contact of key 2404, conductor 3152, brush 3114, brush 3147, conductor 3519, upper left contact of cam 3919, conductor 3920, lower contact of cam 3801, back contact of relay 3802, winding of relay 3803, winding of relay 3805, right contact of cam 4101, contact of cam 3921, lower contact of cam 3806, resistance 3807 to ground. Stepping relay 3805 operates in this circuit and closes a counting relay circuit from battery, left front contact of relay 3601, conductor 3522, winding of the No. 4 counting relay, back contact of the No. 4' counting relay, conductor 3834, Figs. 38 and 42, right front contact of relay 4221, left back contact of relay 4227, right front contact of relay 4234, conductor 4235, upper left and lower right contacts of cam 3850, upper right contact of cam 3900, upper left contact of cam 3901, conductor 3923, upper right and lower left contacts of cam 3809, front contact of relay 3805, lower left contact of cam 3811 to ground.

Relay 1000 also operates and closes a circuit through the winding of relay 1613, outer right back contact or relay 1614, conductor 1615, left front contact of relay 1000 to ground. Relay 1005 is operated in a circuit from battery, upper right contact of cam 1510, lower right contact of cam 1107, winding of relay 1005, right contacts of cam 1108, lower contact of cam 507, back contact of relay 1109, right back contact of relay 1102, left contact of key 1103, lower left contact of cam 1110, lower right contact of cam 1511 to ground. This circuit is completed as soon as switch 1500 reaches position 2. Hence the operation of relay 1613 closes a circuit from battery, right winding of relay 1002, right contact of relay 1005, inner left front contact of relay 1613, normal contact of key 1006 to ground. The operation of relay 1002 opens the energizing circuit of relay 1005 but that relay has already closed a locking circuit for itself to ground at its outer right contact and remains operated.

With relays 1002 and 1613 operated, a circuit is prepared from battery, upper right contact of cam 1510, lower right contact of cam 1107, winding of relay 1112, back contact of relay 1111, right front contact of relay 1002, outer left front contact of relay 1613, back contacts of relay 1008, interrupter 1007 to ground. When interrupter 1007 closes its contacts, relay 1112 operates and closes a locking circuit for itself through the winding of relay 1111 to ground at its front contact. When the interrupter opens its contact relay 1111 operates in the locking circuit of relay 1112. At the next closure of the interrupter contacts ground is extended over the front contact of relay 1111 to the winding of relay 1109 and thence the circuit extends to battery over the lower right contact of cam 1107. Relay 1109 operates and closes a locking circuit for itself through the winding of relay 1008, front contact of relay 1109, outer right contact of relay 1005 to ground. When the interrupter opens its contact relay 1008 operates in the locking circuit of relay 1109 and connects the interrupter leads to the fundamental circuit and the circuit of relay 2104, which will be described later to control the counting relays of the test circuit.

Relay 1005 in operating closes a circuit from battery, as previously traced, through its winding, inner left front contact of relay 1005, resistance 2103, winding of relay 2104, lower left contact of cam 2010 to ground. Relay 2104 operates in this circuit and closes a circuit from ground at the back contact of relay 1009, conductor 2105, contact of relay 2104, left contacts of cam 2011, conductor 403, back contact of counting relay 402, winding of counting relay 401, conductor 1115, left contact of cam 1114, conductor 1513, right contact of cam 1512, to battery. Relay 401 operates in this circuit and closes the usual locking circuit for itself through the winding of relay 402, which circuit is completed when relay 1108 operates as above described. However relay 402 does not operate in this circuit as long as relay 2104 remains operated. The operation of relay 1008 connects the upper contact of interrupter 1007 over the right front contact of relay 1008, front contact of relay 1000, conductor 1116, to conductor 2009, which is a part of the operating circuit of relay 1000. Hence when interrupter 1007 closes its upper contact it closes a holding circuit for relay 1000 and a shunt circuit for the stepping relay of the sender in a manner to simulate the commutator of the selector switch. The operation of relay 1008 also prepares a circuit from the lower contact of interrupter 1007, over the inner left front contact of relay 1008, lower contact of cam 507, right contacts of cam 1108, to the winding of relay 1105. This circuit serves to hold relay 1005 operated and to shunt the stepping relay 2104. Consequently each time that interrupter 1007 closes its contacts a pair of counting relays are locked, both at the sender and at the test circuit, the release of the two stepping relays being simultaneous.

Since the No. 4 counting relay was the relay initially operated in the sender it will be necessary to shunt the stepping magnet five times to operate relays 3802 and 3815 in the locking circuit of the No. 0 counting relay. Consequently at that time, relays 401 to 410 of the test circuit will have been operated and locked. The operation of relay 3802 opens the fundamental circuit at the sender to permit the releases of relay 1000. Relay 3815 advances sequence switch 3810 to position 4 in the usual manner. As soon as interrupter 1007 opens its contact following the opening of the fundamental circuit at the sender, relay 1000 releases, in turn releasing relay 1613. With relay 1000 released and relay 1005 operated, a circuit is closed from battery, upper right contact of cam 1510, right contact of cam 1107, winding of relay 1009, outer left contact of relay 1005, left back contact of relay 1010, back contact of relay 1000, right front contact of relay 1008, contact of interrupter 1007 to ground.

The next make and brake of the contact of interrupter 1007 causes the operation and locking of relays 1009 and 1010. The circuit for relays 1005 and 2104 being still maintained, the closure of interrupter 1007 which operates relays 1009 and 1010 also causes the operation of counting relays 411 and 412. The operation of relay 1009 opens the circuit controlled by relay 2104 preventing the operation of any further of the counting relays.

The release of relay 1613 following the opening of the fundamental circuit closes a circuit from battery, through the winding of relay 1616, left back contact of relay 1617, middle right contact of relay 1613, lower right contact of cam 1515, lower left contact of cam 1516, conductor 1517, upper contact of cam 307, back contact of relay 413, inner left back contact of relay 426, front contact of relay 411, outer right contact of relay 406, front contact of relay 409, inner right back contact of relay 426, front contact of relay 407, outer right back contact of relay 427, front contact of relay 405, left back contact of relay 428, front contact of relay 403, to ground. Relay 1616 operates in this circuit and closes a circuit from battery through the winding of sequence switch magnet 1500, lower right contact of cam 1518, right contact of relay 1617, left front contact of relay 1616, upper contact of cam 1511 to ground.

Relay 1616 also closes a locking circuit for itself through the winding of relay 1617, right contact of relay 1616, conductor 1618 to ground at the front contact of relay 403. When sequence switch 1500 leaves position 2, relay 1617 operates in this locking circuit, opening the energizing circuit of relay 1616 in a second place as well as the circuit for advancing sequence switch 1500 so that sequence switch 1500 comes to rest in position 3. When switch 1500 leaves position 2½ battery is disconnected from the counting relays and these relays release. Battery is also temporarily removed from the windings of relays 1005, 1009, 1010, 1109, 1112 and 1111 and 1008 so that all these relays also release.

When switch 1500 reaches position 3 a circuit is completed from battery, winding of sequence switch magnet 1100, lower right contact of cam 1117, conductor 1118, upper left contact of cam 1529, conductor 1530, back contact of relay 1616, which is released as soon as relay 403 releases, upper contact of cam 1511 to ground. Switch 1100 is advanced to position 2 in this circuit. When switch 1100 leaves position 1 the locking circuit of relay 1002 is opened and that relay releases, permitting the reestablishment of the fundamental circuit.

If the sender does not require the correct number of pulses to satisfy it, the circuit traced for relay 1616 is not completed and the sequence switches 1500 and 1100 are not advanced to position for the next selection. The circuit remains in the earlier positions until the timing switch 3050 advances to position 9, and lamp 3057 is lighted in a circuit from battery through an audible signal at the alarm circuit and lamp 3057, outer right contact of relay 3001, No. 9 terminal of brush 3055 to ground at the upper right contact of cam 3020. The extension of this circuit through the alarm circuit causes the operation of the audible signal, which attracts the attention of the attendant. The attendant operating key 1006 closes a circuit from ground at the outer right back contact of relay 428, left back contact of relay 1613, operated contact of key 1006, winding of relay 1021, to battery. Relay 1021 in operating closes an obvious circuit for relay 1022. The operation of these two relays connects battery to one side of lamps 1030 to 1040. The circuits of these lamps are extended to the back contacts of relays 405, 407, 409, etc., to 423. The circuit of that lamp is completed which is extended to the back contact of the first non-operated counting relay, indicating the number of pulses which were required to satisfy the sender. The attendant may now operate control advance key 2402, operating relay 2520, and advance the test circuit to the next sender or may operate key 2402 and repeat key 2415 and restore key 2402 with the result that relays 2520 and 2506 will be operated and the test circuit will be restored to normal and a new test made of the same sender.

*Checking sender for district group selection.*—With switch 1500 in position 3 and switch 1100 in position 2 as described, the sender is tested for district group selection in the manner described for district brush selection. Assuming that the sender operates correctly in this test, switch 1500 will be advanced to position 4 as previously described. Following district group selection the sender sequence switch 3810 is advanced to position 5. The circuit previously traced through the left winding of relay 3503, which is also the holding circuit of relay 3602, contains sufficient resistance to prevent the operation of relay 3503 if that relay is properly adjusted. If the relay is out of adjustment it will have operated at this time and a circuit will be ready for advancing switch 3810 to position 6 in which position ground is connected over the lower left contact of cam 3825, back contact of relay 3523, left contact of cam 3504, right winding of relay 3503 to conductor 3530. Ground over conductor 3530 is extended over brush 3144, brush 3107, upper right normal contact of key 2404, conductor 2405, left back contact of relay 2520, conductor 3031, right contacts of cam 3030, conductor 2106, right back contact of relay 2107, conductor 2002, left contact of cam 2001, conductor 1609, left contact of relay 1601, conductor 1103, winding of relay 1102 to battery. Relay 1102 in operating closes an obvious circuit for operating relay 1104. Relay 1102 also closes a circuit from battery over the right contact of cam 1512, conductor 1513, winding of relay 1011, right contacts of cam 1119, front contact of relay 1102 to ground. Relay 1011 operates in this circuit and locks over its inner left contact. It also closes a circuit for lighting lamp 1012 indicating that the sender relay 3503 operated prematurely. It also opens the circuit for advancing sequence switch 1100 to position 3 and hence prevents the continuation of the test and permits the sounding of an alarm to inform the attendant.

Assuming, however, that relay 3503 does not operate, sequence switch 3810 remains in position 5 and the circuit of relay 1102 is not completed at this time. A circuit is prepared as soon as switch 1500 reaches position 4 from battery through the winding of relay 340, upper contact of interrupter 341, conductor 342, outer left back contact of relay 2521, conductor 2523, right contacts of cam 1531, conductor 1530, back contact of relay 1616, upper contact of cam 1511 to ground. When interrupter 341 closes its upper contact, relay 340 operates and locks to conductor 342 independent of the interrupter. Relay 340 also closes a circuit from battery through the winding of relay 343, right contact of relay 340, lower contact of interrupter 341, to conductor 342. When interrupter 341 closes its lower contact this circuit is completed and relay 343 operates and locks to conductor 342. The operation of relay 343 closes a circuit from battery through the winding of sequence switch magnet 1100, upper right contact of cam 1117, right back contact of relay 1011, right back contact of relay 429, front contact of relay 343 to ground, advancing sequence switch 1100 to position 3. With switch 1100 in positions 3 to 18 a shunt is closed around resistances 1602 and 1603 at the lower contacts of cam 1101 thus increasing the current flow in the circuit of relay 3503 sufficiently to cause that relay to operate. The operation of relay 3503 advances switch 3810 to position 6, in which position the circuit of relay 1102 is closed as previously described.

As soon as switch 1100 has left position 2 the circuit of relay 1011 cannot be completed. Relay 1102 causes in turn the operation of relay 1104 which closes a circuit from battery through the winding of sequence switch magnet 1100, lower left contact of cam 1117, right front contact of relay 1104 to ground, advancing switch 1100 to position 4. The circuit of relay 1102 which extends through the right winding of relay 3503 is differential to that operating relay 3503 and relay 3503 releases.

Since relay 4242 is operated, as soon as sequence switch 3844 moves into position 5 a circuit is closed from battery through the winding of the No. 0 counting relay and the windings of relays 3802 and 3815 in parallel, upper right contact of cam 3844, conductor 3848, outer front contact of relay 4242 to ground. Relay 3815 operates, and, as soon as switch 3810 is advanced to position 6, closes a circuit for advancing it to position 8. The circuit of relay 3815 is maintained through position 10 so that switch 3810 is advanced successively out of position 8 and position 10 to position 12, in which position relay 3815 is released. With switch 3810 in position 12, switch 3910 is advanced to position 14. With switch 3810 in position 12 relay 3826 is connected across the tip and ring conductors of the fundamental circuit extending from conductor 3519, upper left contact of cam 3919, lower contact of cam 3801, back contact of relay 3802, winding of relay 3803, contact of cam 4105, winding of relay 3826, contact of cam 4113, upper contact of cam 3827, upper right and lower left contacts of cam 3825, lower contact of cam 3934 to conductor 3518.

Since register 320 was set in position 6, which is the position corresponding to skip office, a second locking circuit is provided for relay 1002 extending through its left winding and left front contact, upper contact of cam 1120, conductor 1121, left contacts of cam 325 to ground. This circuit is maintained through position 7 of switch 1100 and prevents the reclosure of the fundamental circuit while switch 1100 is advancing to position 8. Ground over the lower left contact of cam 1125, holds this relay operated from position 7¾ to 10, and ground over the upper left contact of cam 1125 and the upper left contact of cam 515, holds it operated through position 13 of switch 1100. Relay 1002 is held operated from position 7 to 7¾ over its original locking circuit.

With register 320 in position 6 and switch 1500 in position 4 a circuit is closed from battery, through the winding of relay 1616, left contact of relay 1617, middle right contact of relay 1613, lower right contact of cam 1515, lower left contact of cam 1532, conductor 1533, inner left contact of relay 1104, contact of cam 326, left back contact of relay 1011 to ground. Relay 1616 operates and closes the previously traced circuit which serves in this case to advance switch 1500 from position 4 to position 5. When switch 1500 leaves position 4 the circuit of relay 1616 is opened but is immediately reclosed over the lower right contact of cam 1532, to ground at the upper left contact of cam 325, to advance switch 1500 to position 6. In positions 6 and 7 direct ground at the upper contacts of cam 1532 causes the operation of relay 1616 and the advance of switch 1500 out of positions 6 and 7 to position 8. With switch 1500 in position 8 the circuit of relay 3826 which was just traced through the sender is extended from conductor 3519 over brush 3147, brush 3114, conductor 3152, inner upper left normal contact of key 2404, upper contacts of cam 3032, conductor 3033, right contacts of cam 2003, inner left contact of cam 2100, conductors 2101 and 1509, upper contacts of cam 1508, conductor 1563, outer back contact of relay 200, conductor 201, winding of relay 430, upper contacts of cam 508 to battery; and from conductor 3518, brush 3146, brush 3115, conductor 3153, lowermost left contact of key 2404, upper contacts of cam 3023, conductor 3034, lower right contact of cam 2005, conductor 2012, resistances 905, 906, 907 and 908, upper contact of cam 909, conductor 910, upper contact of cam 1534, conductor 1535, inner back contact of relay 200, conductor 202, left back contact of relay 1011 to ground.

Relay 3826 operates in this circuit in turn operating relays 3829 and 3830. The operation of relay 3830 maintains the circuit of relay 3826 through position 14 of switch 3810, and closes a circuit for advancing switch 3810 from position 12 to position 15, which may be traced from battery, winding of magnet 3810, upper left contact of cam 3832, upper contact of cam 4109, left front contact of relay 3830, outer right back contact of relay 3836 to ground.

When switch 3810 reaches position 15 relay 3826 releases, in turn releasing relays 3829 and 3830. With relay 3503 released in the differential circuit previously described, a circuit is now closed from battery, winding of sequence switch 3810, upper left contact of cam 3820 to ground at the back contact of relay 3503, advancing that switch to position 16. With switch 3810 in position 16 relay 3504 is operated in a circuit which extends in this case over the upper right contact of cam 3937, conductor 3940, contacts of cam 4145, conductor 4146, lower right contact of cam 3811 to ground, and opens the circuit of relay 1102.

Relay 430 also operates in the circuit traced for relay 3826 and closes an obvious circuit for relay 429, which relay locks over conductor 431 to ground at the lower left contact of cam 1511. The operation of relay 429 also extends ground from conductor 431, over its inner left front contact, the winding of relay 509 to battery. This relay operates and locks over its inner right contact to conductor 431. The operation of relay 429 also closes a circuit from battery through the winding of sequence switch magnet 1100, lower left contact of cam 1122, lower contact of cam 510, outer left contact of relay 429 to ground which advances sequence switch 1100 to position 8.

Switch 1100 is now advanced to position 11 in a circuit through its winding, upper left contact of cam 1123, lower left contact of cam 511 to ground, since no other selections are to be made. With relay 1102 released due to the operation of relay 3504 as previously described, relay 1104 is also released. With relay 1104 released a circuit is closed from battery, sequence switch magnet 1500, lower right contact of cam 1506, conductor 1536, upper right and lower left contacts of cam 1124, lower contacts of cam 512, inner right back contact of relay 1104, upper right and lower left contact of cam 513 to ground. Sequence switch 1500 is advanced to position 9 in this circuit. It is then advanced to position 15 in a circuit through its winding, upper right contact of cam 1537, conductor 1538, upper left contact of cam 514 to ground; and to position 16 in a circuit over the left contact of cam 1518, to ground at the left contact of cam 2013. A circuit is now closed through the winding of sequence switch magnet 1100, lower left contact of cam 1123, conductor 1126, right contact of cam 1529, right back contact of relay 1616, upper contact of cam 1511 to ground, advancing switch 1100 to position 17. Switch 1100 is then advanced to position 18 in a circuit through its winding, upper left contact of cam 1117, middle right contact of relay 1104, upper right and lower left contacts of cam 513 to ground.

With switch 1100 in position 18 a circuit is closed from battery through the winding of relay 1616, left back contact of relay 1617, middle right contact of relay 1613, lower contacts of cam 1515, conductor 1539, lower left and upper right contacts of cam 1127, conductor 1128, right contacts of cam 2014 to ground. The operation of relay 1616 closes the usual circuit for advancing switch 1500 out of position 16 and that switch is advanced to position 18 under the control of its master cam.

With switch 1500 in position 18, relay 1601 is operated in an obvious circuit. The operation of relay 1601 connects ground over its outer right front contact and the lower left contact of cam 1123 to the winding of sequence switch magnet 1100, advancing that switch to position 1. The operation of relay 1601 opens the circuit of relay 3602 and that relay releases, initiating the release of the sender as previously described.

When the sender is completely released, relay 3601 closes its back contact, and connects battery to conductor 3501. This conductor is extended over brushes 3142 and 3116 and thence as previously traced through resistance 1604, 1603 and 1602 and the winding of relay 1619 to ground at the lower right contact of cam 1540, since the operation of relay 1601 has removed the direct ground from the circuit. Relay 1619 operates in this circuit and closes a circuit from battery through the winding of sequence switch magnet 1500, upper right contact of cam 1506, lower right and upper left contacts of cam 1124, contact of relay 1619, inner right front contact of relay 1601 to ground, advancing sequence switch 1500 to position 1. The test circuit is now ready to proceed with the second test which imposes the condition simulating a full mechanical call.

*Test of sender for full mechanical call.*

When sequence switch 1500 reaches position 1 the previously traced circuit for sequence switch 1700 is closed and that switch is advanced to position 4. With sequence switch 1700 in position 4 relay 1200 is again operated and relay 1208 is operated in a circuit, lower contact of cam 1709, conductor 1710 to ground as previously traced. The operation of these relays closes circuits for positioning the registers. Class register 500 will be set in position 2. District brush register in position 4, district group register in position 4, office brush register in position 4, and office group register in position 4. Compensating resistance switch 900 will be set in position 4. Tandem hundreds register 1400 in position 2, tandem tens register 1450 in position 2, tandem units register 1900 in position 1, thousands register 1930 in position 4, hundreds register 1960 in position 9, tens register 2300 in position 2, and units register 2300 in position 2. Switch 2600 remains in position 1 since in the case of a full mechanical call the station's designation is taken care of by other means. When these registers have all been set the series circuit through the front contacts of the register relays is closed as previously described to conductor 1905 whence it extends over the contact of cam 2333, contact of cam 2303, contact of cam 1963, contact of cam 1933, conductor 1990, upper left contact of cam 1702 to the winding of sequence switch magnet 1700 and battery, advancing switch 1700 to position 5. Relay 1703 is operated in the usual manner and locked while switch 1700 is in position 4. District group and district brush selections are checked in the manner described for a desk call after the completion of which switch 1500 is in position 4 and switch 1100 in position 2.

Sender sequence switch 3810 will be in position 6, and switch 3910 in position 13. Switch 1100 is advanced to position 3 in the manner previously described, after which relays 1102 and 1104 are operated and switch 1100 advances to position 4. With switch 1500 in position 4 and switch 1100 in position 4 the sender is tested for office brush selection. Office group selection is tested with switch 1500 in position 5 and switch 1100 in position 5, after which both sequence switches are advanced. As before switch 1500 is advanced to position 8 immediately. Circuits for lighting one of lamps 1520 to 1529 and 2390 to 2399 are closed in each position that a selection is checked. Sequence switch 3810 will be in position 12 at this time and switch 3910 in position 14. The circuit for testing relay 3826 is reestablished except that with switch 500 in position 2, battery is connected to the winding of relay 430 through resistance 520 instead of direct. Resistance 518 is shunted at the outer right contact of relay 1614. Resistance 520 is of such magnitude as to prevent the operation of relay 3826 if that relay is in standard condition. However, relay 430 operates in this circuit causing the operation of relays 429 and 509 as previously described, these relays locking to conductor 431 as before. The operation of relay 429 at this time causes the advance of switch 1100 into position 8 as previously described.

If relay 3826 operates falsely, it opens the fundamental circuit and permits the release of relay 430. With relay 430 released and relay 429 locked up a circuit is closed from battery through the winding of relay 505, right contacts of cam 521, outer right contact of relay 509, conductor 522, left contacts of cam 1531, conductor 432, back contact of relay 430 to ground. Relay 505 operates and locks over conductor 524 to ground at the lower left contact of cam 1540. It also closes an obvious circuit for lighting lamp 523 and prevents the reestablishment of the fundamental circuit.

However, if relay 430 is not released, and switch 1130 is advanced to position 8 it is immediately advanced out of position 8 to position 11 over the circuit previously described. Switch 1500 is advanced out of position 8 with switch 1100 in position 11 as previously described. When switch 1500 arrives in position 9 the fundamental circuit is established as previously traced. The current in this circuit is sufficient to permit the operation of relay 3826 which advances the sender sequence switch 3810 to position 2 of its second revolution and switch 3810 to position 15 as described in connection with the operation of the sender. Subsequent selections are checked with sequence switches 3810, 3910, 1100 and 1500 in the positions indicated according to the following table:

|                           | 3810 | 3910 | 1100 | 1500 |
|---------------------------|------|------|------|------|
| Incoming brush selection  | 2    | 15   | 11   | 9    |
| Incoming group selection  | 4    |      | 12   | 10   |
| Final brush selection     | 6    |      | 13   | 11   |
| Final tens selection      | 8    |      | 14   | 12   |
| Final units selection     | 10   |      | 15   | 13   |

At the completion of final units selection switch 3810 will be in position 12, 3910 in position 15, 1500 in position 14 and switch 1100 in position 16. A circuit is now established in simulation of the advance of the incoming selector. Battery is connected over the upper contacts of cam 526, through the winding of relay 527, left contacts of cam 1108, upper contacts of cam 507, conductor 529, lower left contact of cam 1534, conductor 910, lower contact of cam 909, resistances 907, 906 and 905, conductor 2012, lower left contact of cam 2004, conductor 3034, upper contacts of cam 3023, lowermost left contact of key 2404, conductor 3153, brush 3115, brush 3146, conductor 3518, upper left contact of cam 3934, resistance 3837, right contact of cam 3833, left contact of cam 4101, winding of relay 3804, winding of relay 3803, back contact of relay 3802, lower contact of cam 3801, upper left contact of cam 3919, conductor 3519, brush 3147, brush 3114, conductor 3152, inner upper left normal contact of key 2404, upper contacts of cam 3032, conductor 3033, right contacts of cam 2003, inner back contact of relay 2100, conductor 2101, conductor 1509, left contacts of cam 1503, conductor 1542, upper contacts of cam 512, conductor 528, left back contact of relay 1616, conductor 1622, left back contact of relay 525, lower right contact of cam 514 to ground. The current in this circuit being in the right direction to operate relay 3803 causes the operation of relays 3840 and 3818 which relays lock over the front contact of relay 3840, to ground at the upper right contact of cam 3811. Relay 3804, being operated in conjunction with relay 3818, closes a circuit from battery through the No. 0 counting relay, lower contact of cam 3841, middle left contact of relay 3818, upper contacts of cam 3809, front contact of relay 3804, upper left contact of cam 3811 to ground. The No. 0 counting relay operates and closes the usual locking circuit for itself through the windings of relays 3802 and 3815 to ground at the upper right contact of cam 3825.

Relay 527 also operates in the fundamental circuit just described and closes a circuit from battery through the winding of relay 1613, outer right contact of relay 1614, conductor 1615, conductor 1013, lower contact of cam 530, front contact of relay 527 to ground. The operation of relay 1613 closes a circuit from battery, winding of sequence switch magnet 1500, lower left contact of cam 1506, conductor 1543, inner right front contact of relay 1613, conductor 1621, lower right and upper left contacts of cam 1127, lower left contact of cam 514 to ground, advancing sequence switch 1500 to position 15 after which it is immediately advanced to position 16 as previously described.

The advance of sequence switch 1500 from position 14 opens the fundamental circuit as traced and permits the release of relays 3804 and 3803. Relays 3802 and 3815 operate in the locking circuit of the No. 0 counting relay, relay 3802 serving to prevent the reestablishment of the fundamental circuit and relay 3815 advancing sequence switch 3810 to position 13. With relay 3818 operated sequence switch 3810 is now advanced to position 15 in a circuit over the upper right contact of cam 3832, upper contact of cam 3936, inner left contact of cam 3818 to ground. Since relay 3503 should be energized at this time, switch 3810 should be advanced to position 16 as previously described. When switch 3810 reaches position 16 relay 3504 is operated as previously described to disconnect ground from conductor 3530 permitting the release of relays 1102 and 1104. The subsequent release of the testing circuit and the sender are the same as described for the previous call.

The third and fourth tests which take place with the number switch 1700 in positions 6 and 8 are not of special interest with the present invention and will not be described since the number switch 1700 is advanced from position to position in the usual manner.

*Test of sender for call to a manual tandem office.*

The fifth test sets up the condition necessary for a call to a manual tandem office equipped with relay call indicator apparatus. In this case class switch 500 will be set in position 5, and the registers set to give the correct routing. District and office selections will be checked in the manner described after which sequence switch 1500 will be in position 8. Sequence switch 1100 will also be advanced to position 7 as previously described. At this time sequence switch 3810 will be in position 12 and 3910 in position 14, having been advanced in the manner previously described. In the case of a tandem relay call indicator call class switch 4100 will be in position 6, 12 or 16.

As soon as switch 3910 was advanced to position 13 a circuit was closed from battery, winding of relay 4114, contacts of cam 4115, conductor 4143, right contact of cam 3931, conductor 3932, back contact of relay 4102 to ground. This relay locks over its inner right front contact, upper contact of cam 4116, conductor 4117, upper right contact of cam 3929, to ground. With the sequence switches in the above mentioned positions, relay 3826 is connected across conductors 3519 and 3518 the circuit extending from battery, through resistances 535, 536, and 545 and thence as previously traced through the winding of relay 430 to conductor 3519, upper right contact of cam 3919, conductor 3920, lower contact of cam 3801, back contact of relay 3802 winding of relay 3803, contact of cam 4105, winding of relay 3826, contact of cam 4113, upper contact of cam 3827, upper left and lower right contacts of cam 3828, lower contact of cam 3934, to conductor 3518 and thence through the test circuit in the manner previously traced to ground at the back contact of relay 1011. Relays 430 and 3826 operate in this circuit.

Relay 430 in operating closes the usual circuit for relays 429 and 509, while relay 3826 causes the operation of relays 3829 and 3830.

Figure 2:
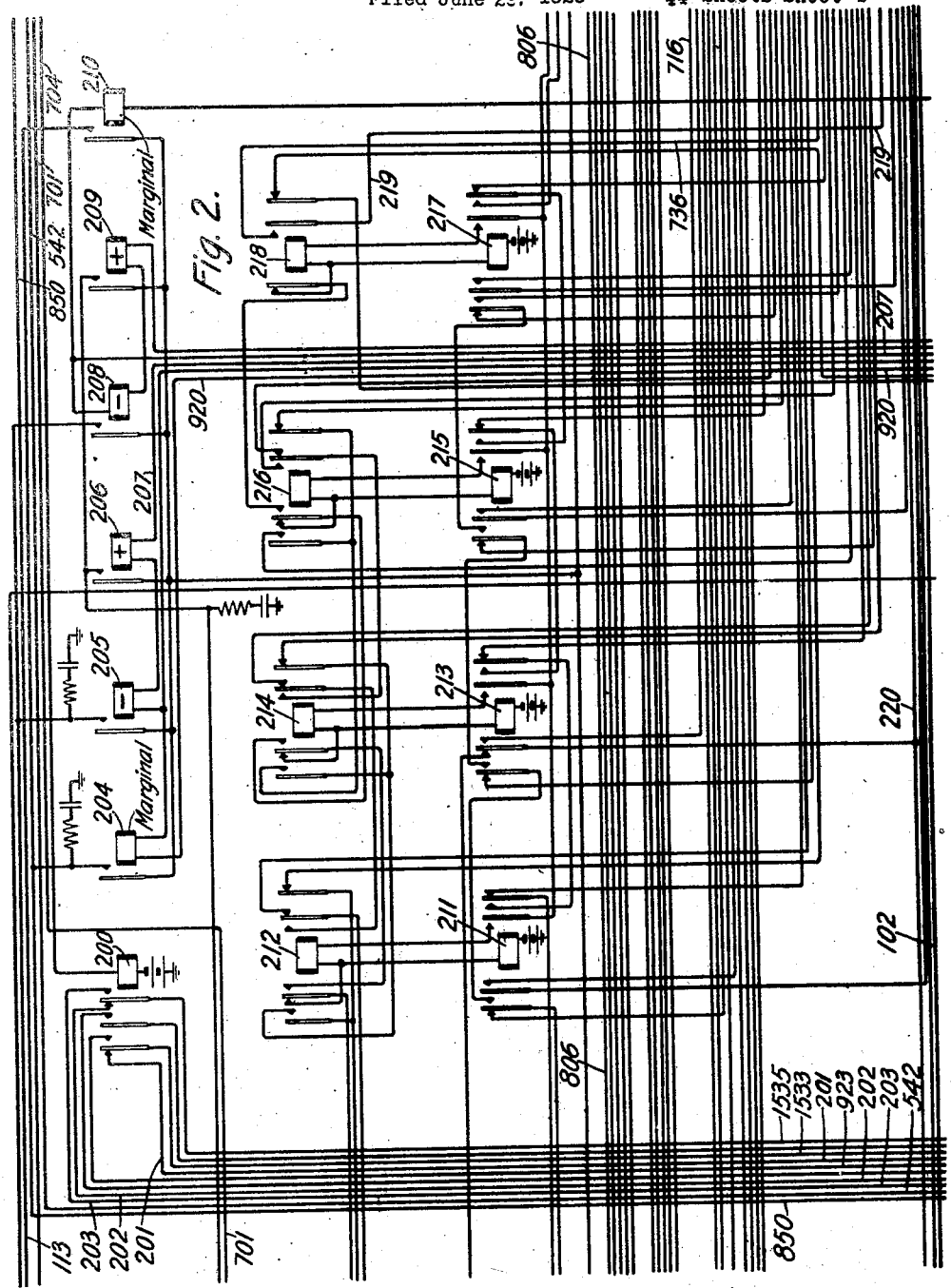
Figure 3:
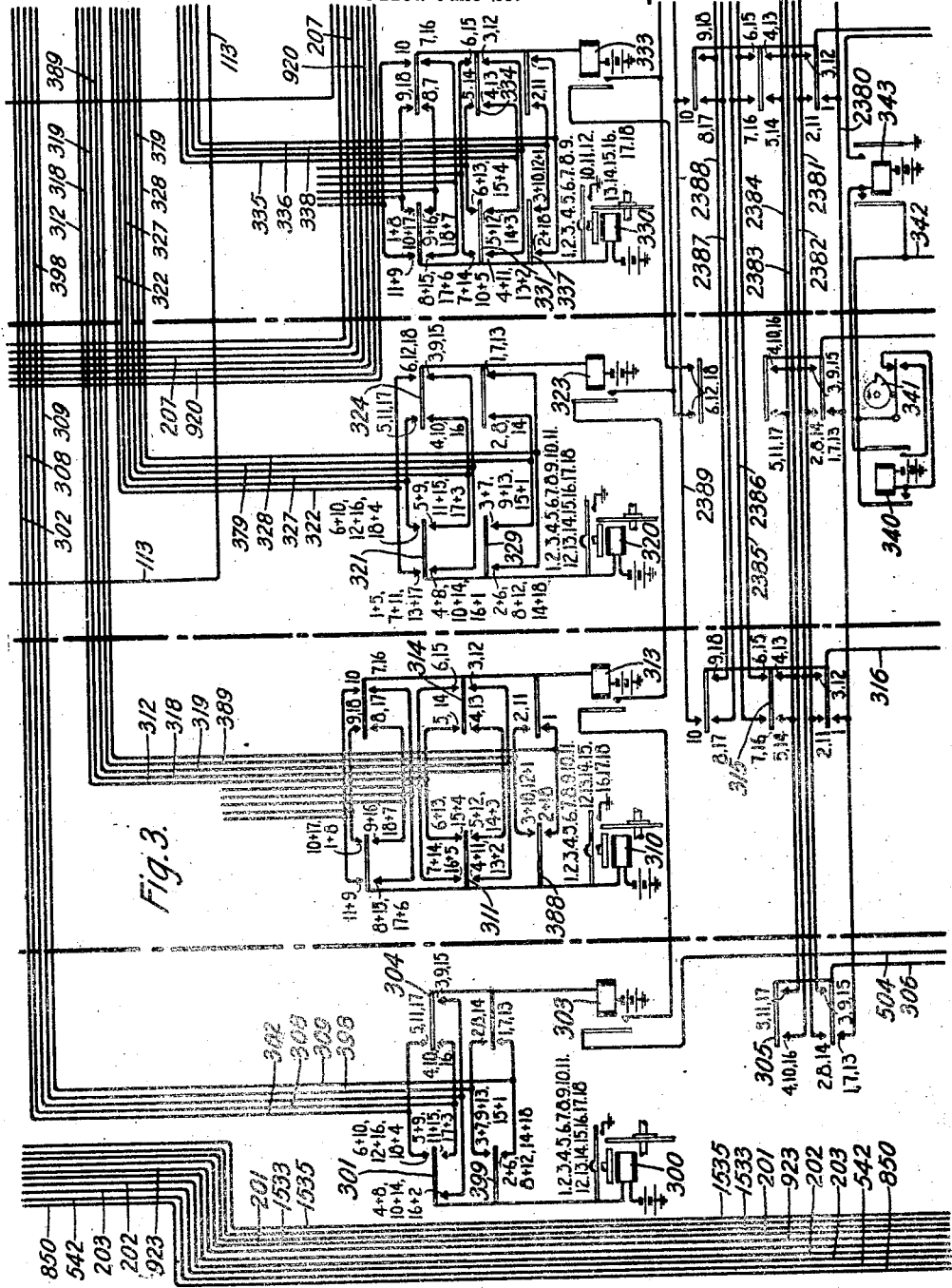

The operation of relay 3830 advances sequence switch 3810 to position 13 and closes a shunt around the contacts of cam 3828 to hold relay 3826 operated under the control of the test circuit. Sequence switch 3810 is advanced to position 14 in a circuit over the upper right contact of cam 3820, left contact of cam 4122, left contact of cam 4123 to ground. The operation of relay 429 closes a circuit from battery through the winding of sequence switch magnet 1100, lower left back contact of cam 1122, lower contact of cam 510, left contact of relay 429 to ground, advancing that sequence switch to position 8. As soon as switch 1100 reaches position 8 a circuit is closed from battery through the winding of relay 700, conductor 701, inner left back contact of relay 100, right back contact of relay 101, conductor 102, upper left contact of cam 1131, conductor 1015, upper right contact of cam 523 to ground. Relay 700 locks over its middle contact, conductor 703, to ground at the upper left contact of cam 1540. It also closes an obvious circuit for relay 702 and furnishes locking ground for the relays of Figs. 7 and 8. It also closes a circuit from battery, winding of relay 200, inner middle contact of relay 700 to grounded conductor 703. The operation of relay 200 opens the fundamental circuit and transfers it to the control relays of Fig. 2. It will be noted that two sets of polarized relays are provided as well as two marginal relays and that these relays may be employed according to the setting of switch 900 to simulate the various conditions to be met with in practice.

Assuming that switch 900 was set in position 2, the fundamental circuit is extended from conductor 1535, over the inner left front contact of relay 200, conductor 203, contacts of cam 917, resistance 918, upper contact of cam 919, conductor 920, marginal relay 204, negatively polarized relay 205, positively polarized relay 206, conductor 207, left contact of cam 921, left contacts of cam 922, conductor 923, outer front contact of relay 200 to conductor 1533.

The opening of the fundamental circuit by the operation of relay 200 permits the release of relay 3826 and in turn the release of relays 3829 and 3830. Relay 3830 at its back contacts extends the fundamental circuit to the impulse sequence switch 4110. The circuit may be traced from conductor 3519, upper contacts of cam 3919, left contacts of cam 3839, outer left back contact of relay 3830 to conductor 4132, and from conductor 3518, lower contact of cam 3934, right back contact of relay 3830, upper right and lower left contacts of cams 3828, right contacts of cam 4126 to conductor 4133. For a description of the sending of pulses by switch 4110 reference may be made to the above identified application of Johnson et al.

Relay 205, responding to negative pulses, controls the combination of relays 110 and 111 in the usual manner. This relay combination in turn controls the transfer relays 101 and 103 to 109, and 211 to 218. These transfer relays extend the conductors controlled by relays 206 and 204 to the proper relays of registers 810, 820, 830, 840, 710, 720 and 730. The test circuits start checking as soon as relay 104 is operated during the reception of the tandem tens digits. According to the circuit arrangement, tandem hundreds register was set in position 5, which corresponds to the digit 4, and is represented by a code of a light negative pulse, a positive pulse and a light negative pulse. Therefore, relay 803 of register 800 will have been operated due to the transmission of the tandem hundred pulses provided the sender operates correctly. At the operation of relay 104 a circuit is closed from battery, through the winding of relay 1132, conductor 1133, upper left contact of cam 1134, conductor 1016, upper back contact of relay 804, conductor 805, left contact of cam 1409, lower left contact of cam 1410, conductor 1300, outer upper back contact of relay 801, outer lower back contact of relay 802, upper front contact of relay 803, conductor 806, inner left front contact of relay 104, conductor 102, upper left contact of cam 1131, conductor 1015, upper right contact of cam 533 to ground.

Relay 1132 operates and closes a circuit from battery through the winding of sequence switch magnet 1100, lower right contact of cam 1122, front contact of relay 1132, lower left contact of cam 515 to ground. Sequence switch 1100 advances to position 9 in this circuit in which position tandem tens digits will be checked. One of the series of lamps 1150 and 1157 is lighted during the check of each digit. The circuit of lamp 1150 for example, extends from ground at the lower left contact of cam 515, upper left contact of cam 1139, through lamp 1150, conductor 1140, lower left contact of cam 1413, conductor 2384, lamp 2394 to battery, thus indicating the digit to be checked and the value of that digit. If the sender should not send back the correct pulse, the above traced circuit for relay 1132 will be open and sequence switch 1100 will not be advanced.

Figure 14:
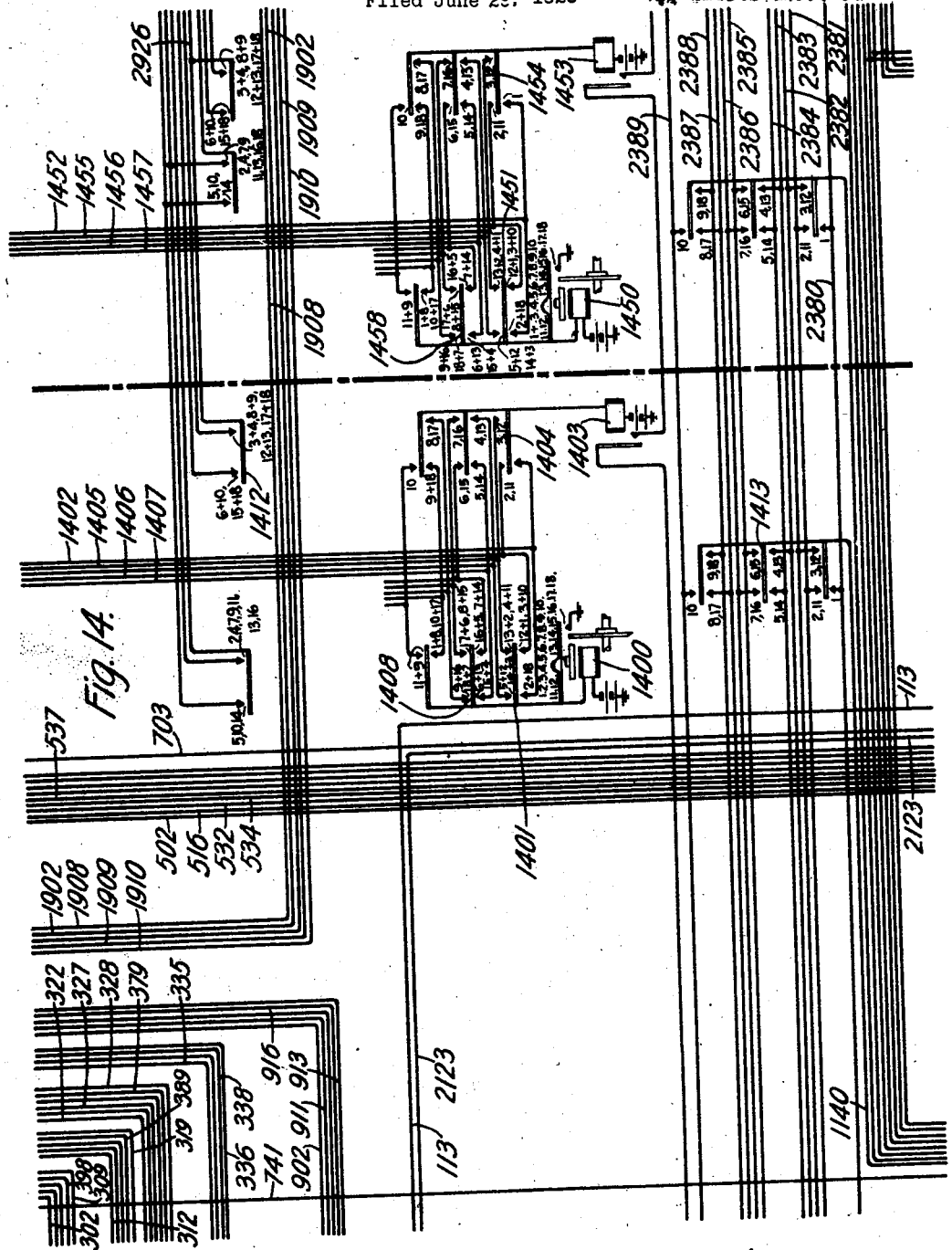
Figure 23:
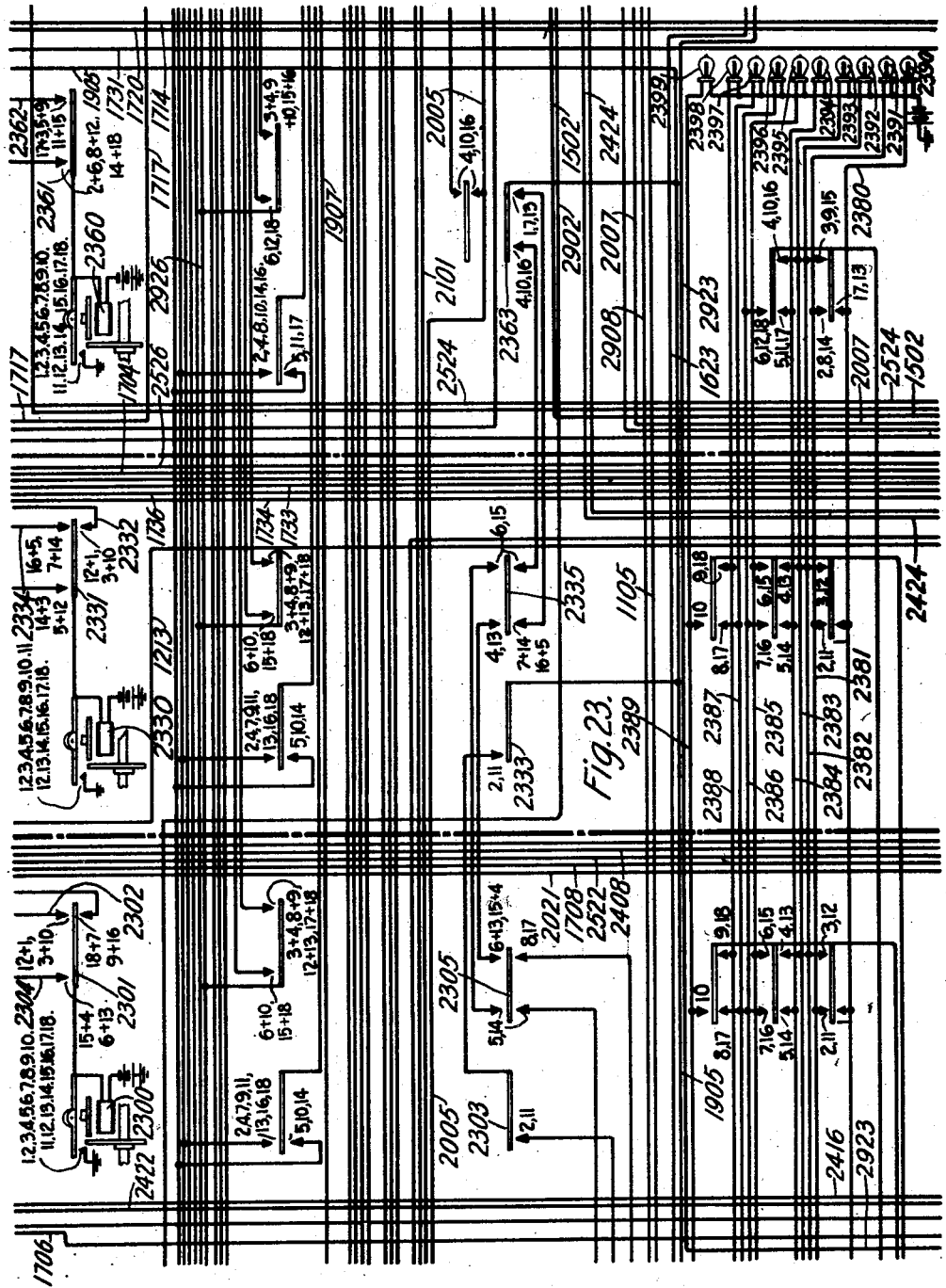

Subsequent digits are checked in subsequent positions of sequence switch 1100, the switch being advanced from position to position by means of circuits through the control registers of Figs. 14, 19 and 23 and the receiving registers of Figs. 7 and 8, in the manner described for the tandem hundreds digit. At the completion of checking the units digit, relay 1132 will be operated in a circuit similar to that previously described. The operation of relay 1132 now closes a circuit from battery, winding of sequence switch magnet 1500, upper left contact of cam 1537, conductor 1544, lower contact of cam 1130, front contact of relay 1132 to ground at the lower left contact of cam 515.

This circuit advances sequence switch 1500 to position 14. Sequence switch 1500 is then advanced to position 15 over the lower left contact of cam 1506, conductor 1543, lower left contact of cam 533 to ground. It is advanced to position 16 in a circuit over the lower left contact of cam 1518 to ground at the left contact of cam 2013. When sequence switch 1500 leaves position 14 the locking circuit of relay 700 is opened and this relay releases, opening the locking circuit of the transfer and receiving register relays. As soon as sequence switch 1500 reaches position 16, switch 1100 is advanced to position 17 in a circuit over the lower right contact of cam 1123, conductor 1126, right contact of cam 1529, conductor 1530, left back contact of relay 1616, upper contact of cam 1511 to ground.

Switch 4110 is advanced through two revolutions in the manner described in the above mentioned application of L. H. Johnson et al. When it reaches position 13 of its second revolution, relay 4139 is operated, closing a circuit from ground at its front contact over conductor 3845, upper contact of cam 3841, through the winding of the No. 0 counting relay to battery. The No. 0 counting relay operates and locks through the windings of relays 3802 and 3815 to ground at the upper left contact of cam 3825. When switch 4110 leaves position 16 the circuit of relay 4139 is opened, so that relays 3802 and 3815 are permitted to operate in the locking circuit of the No. 0 counting relay. Relay 3815 closes the usual circuit for advancing sequence switch 3810 to position 15. Since relay 3503 should be released at this time, switch 3810 is immediately advanced to position 16, in which position the circuit of relay 3504 is closed in the usual manner to release the sender. The operation of relay 3504 opens the circuit over conductor 3530, in which relay 1102 is operated and that relay releases, in turn releasing relay 1104. With relay 1104 released switch 1100 is advanced to position 18 in a circuit over the upper left contact of cam 1117, middle right contact of relay 1104, upper right and lower left contacts of cam 513 to ground. The further release of the test circuit is the same as previously described.

*Test of sender for a direct call to manual call indicator office.*

The sixth call establishes conditions representing a direct relay call indicator call. The operation in this case is practically identical with that of the last call described, except that the sender does not send out any office code pulses. Class sequence switch 500 is set in position 6 and a circuit is closed from battery, winding of relay 100, conductor 113, left contacts of cam 1545, conductor 1546, lower right contact of cam 515 to ground when switch 1500 reaches position 7. Relay 100 closes an obvious circuit for relay 112 and the two relays serve to transfer the control leads from the tandem hundreds relays 101 and 103 to the stations relays 109 and 108. Since the office code pulses do not have to be checked sequence switch 1100 is advanced to position 11 by means of a circuit over the upper left contact of cam 1123, lower left contact of cam 511 to ground. Therefore when the hundreds pulses have been received a circuit is closed from battery, winding of relay 1132, conductor 1133, lower left contact of cam 1134, conductor 1014, over the armature of relay 714, contacts of cam 2364 and thence over the contacts of cam 2365, back to register 710.

Assuming that stations designation R has been set up by the register 2360 and that the sender has operated correctly to cause the operation of relays 711 and 712, the above traced circuit will extend over the back contact of the upper armature of relay 714, conductor 715 to the left contact of cam 2364, upper right contact of cam 2365, to conductor 1301 and thence to conductor 612, outer lower front contact of relay 711, upper front contact of relay 712, upper back contact of relay 713, conductor 716, inner left front contact of relay 213, conductor 220, lower left contact of cam 1131, conductor 1015, upper right contact of cam 533 to ground. The remainder of the operation is the same as that described in connection with the tandem call indicator test.

The remaining tests differ but slightly from those described in the above identified patent to William L. Dodge and will not be described hereinafter.

*Advance of test circuit to next sender.*—After setting the registers for the ninth test switch 1700 is advanced to position 18. When now switch 1500 reaches position 18 and the sender is dismissed, a circuit is established from battery through the winding of sequence switch magnet 3000, lower right contact of cam 3016, conductor 3039, upper right contact of cam 1515, lower right contact of cam 1549, conductor 1550, inner lower normal contact of repeat key 2415, conductor 2416, right contact of cam 1701 to ground. Sequence switch 3000 advances to position 17 in this circuit.

With sequence switch 3000 in position 17 the following circuits are closed for restoring the various sequence switches to normal, providing that they are off normal: battery through the winding of sequence switch magnet 1100, lower left contact of cam 1123, conductor 1137, lower contact of cam 3029, to ground; winding of sequence switch magnet 1500, lower right contact of cam 1537, conductor 1551, upper left contact of cam 3029 to ground; battery, through the winding of sequence switch magnet 1700, upper right contact of cam 1729, conductor 1734, lowermost operated contact of multi-test key 2401, left normal contact of key 2407, conductor 2417, lower left contact of cam 3020 to ground.

With switches 1100, 1500, 1700 and 2900 in position 1 the normal ground is again extended to conductor 3040. A circuit is completed for sequence switch 3000, through its winding, upper left contact of cam 3016, conductor 3018, outer right contact of relay 2508, conductor 2529, left contacts of cam 3019, brush 3102, conductor 3150, upper contact of cam 3005, to normal ground over conductor 3040 and switch 3000 is advanced to position 18. With switch 3000 still in position 17 the following circuits are prepared: from battery through resistance 3012, winding of relay 3013, lower right contact of cam 3014 to cam 3015; battery, winding of stepping magnet 3141, brush 3104, outer upper left operated contact of start key 2400, to the upper left contact of cam 3015; and from battery through resistance 3012, upper right contact of cam 3017, upper contact of cam 3008, brush 3105, back contact of stepping magnet 3141 and thence over the circuit traced for magnet 3141 to the upper contact of cam 3015. When switch 3000 arrives in position 18 these circuits are extended over the right contact of cam 3015, right back contact of relay 2509, brush 3103 and its corresponding contact, brush 3113 and its corresponding contact, right back contact of relay 2519, left contacts of cam 3003 to the normal ground at conductor 3040.

Magnet 3141 operates in this circuit but the shunt over the back contact of that magnet prevents the operation of relay 3013 until its armature is completely attracted. When the shunt circuit is opened relay 3013 operates and advances sequence switch 3000 to position 1. Switch 3140 is now engaging the second FM sender and a complete test of that sender is made as just described for the first sender. The senders connected to switch 3140 are tested in rotation and switch 3140 advanced from sender to sender as described.

*Passing spare positions.*—Switch 3140 has been shown connected to the first terminals of switches 3100 and 3110. However, in order to avoid the unnecessary duplication of switches the wiring for the last switch connecting with FM senders is shown on the arc of brush 3142. When such last switch is stepped on to its first spare terminals, at the same time that switch 3000 is moved to position 1, a circuit is closed from battery, through the right winding of relay 2500, conductor 2501, upper contacts of cam 303 to the normal ground at conductor 3040. The operation of relay 2500 advances switch 3000 to position 2. Switch 3000 is then advanced to position 3 in the manner previously described. With switch 3000 in position 3, a circuit is closed from battery, right winding of relay 2502, back contact of relay 2505, conductor 2531, first spare terminal and brush 3142, brush 3116 and its corresponding terminal, lowermost right normal contact of key 2404, middle left contact of cam 2519, lower contact of cam 3021, conductor 2514, left back contact of relay 2511, windings of relays 2513 and 2512 to ground. Relay 2502 operates and closes an obvious circuit for relay 2532 which in turn closes a circuit for relay 2515. The operation of relay 2515 closes a circuit from battery through the winding of sequence switch magnet 3000, lower right contact of cam 3016, conductor 3039, outer right contact of relay 2515, inner left back contact of relay 2504, conductor 3151, lower contact of cam 3006 to ground. Switch 3000 is advanced to position 8 in this circuit. Relay 2502 being slow to release remains operated until switch 3000 reaches position 8 in which position a circuit is prepared through its left winding, inner left contact of relay 2532, brush 3105 and its corresponding contact, left back contact of magnet 3141, brush 3104 and its corresponding contact, uppermost left operated contact of key 2400 to the upper contact of cam 3015. It will be obvious that this circuit is in part an energizing circuit for stepping magnet 3141. The usual circuit and shunt for relay 3013 is also prepared.

Switch 3000 is advanced from position 8 to position 9 in the usual manner and, upon arriving in position 9, completes the holding circuit of relay 2502 and the circuits of relay 3013 and magnet 3141 as before. Switch 3140 is stepped to its second spare terminal in this manner. A self-interrupting circuit is thereupon established extending through the winding and back contact of magnet 3141, brush 3142, brush 3116, lowermost right normal contact of key 2404, middle left contact of relay 2519, to the left front contact of relay 2532, advancing switch 3140 over its strapped contacts to the 21st terminal. The No. 21 terminals of all switches are similarly wired. The operation of relay 3013 as above described serves to advance switch 3000 to position 10 in the usual manner.

Relay 2502 is slow to release and therefore holds its armature attracted until the establishment of a second holding circuit for that relay which extends through its right winding, inner right contact of relay 2532, conductor 2533, brush 3105, over the strapped contacts of brush 3142 to ground as traced for magnet 3141. When switch 3140 reaches its No. 21 terminal, a circuit is closed from battery, resistance 3155, brush 3142 to ground through the windings of relays 2513 and 2512 as described. Current in this circuit is sufficient to cause the operation of relay 2513 which relay closes a shunt around its high resistance winding to permit the operation of relay 2512. Since relay 2502 is held operated as long as switch 3140 is advanced over the spare terminals, relay 2500 is not able to close the circuit for advancing switch 3000 out of position 10. Relay 2500 is operated from normal ground in the usual manner with switch 3000 in position 10. When brush 3142 leaves the last strapped terminal, the circuit of relay 2502 is opened and that relay releases after an interval, connecting ground from its armature to that of relay 2500 to cause the advance of switch 3000 to position 11. Switch 3000 is advanced to position 12 in the usual manner. Since relay 2512 is operated, relay 2500 cannot be locked and it releases as soon as switch 3000 leaves position 11. A circuit is then closed over the back contact of relay 2500 to advance switch 3000 to position 13. With relay 3000 in position 13 relay 2504 is operated over the No. 21 terminal and brush 3143, brush 3117, inner lower right normal contact of key 2404, inner left contact of relay 2519, conductor 3043, lower contacts of cam 3024, conductor 1607, left back contact of relay 1600, back contact of relay 1605 or 1606, through resistances 1604, 1603 and 1602 to ground at the back contact of relay 1601. Relay 2504 locks over its left front contact to grounded conductor 3151. Relay 2504 closes an obvious circuit for relay 2505 and also closes a circuit from battery through the right winding of relay 2500, conductor 2501, right contacts of cam 3003, conductor 1608, outer right back contact of relay 1600, conductor 2405, upper right normal contact of key 2404, brush 3107 and its corresponding contact, brush 3144 and its No. 21 terminal, inner right front contact of relay 2504 to ground. The operation of relay 2500 closes a circuit from battery through the winding of magnet 3000, lower right contact of cam 3004, conductor 3041, conductor 2507, right front contact of relay 2500, left back contact of relay 2502 to ground advancing sequence switch 3000 to position 14.

With switch 3000 in positions 13 and 14 the usual circuits are completed for relay 3013 and magnet 3141, except that the circuit is extended over the lower left contact of cam 3015, uppermost right operated contact of switch 2400 to ground at the inner right front contact of relay 2504. The operation of relay 3013 advances switch 3100 to position 15. The operation of magnet 3141 advances switch 3140 to normal. Switch 3000 is carried through position 15 to position 16 under the control of its master cam. While passing through position 15 the usual circuits are prepared for relay 3013 and stepping magnets 3101 and 3111, which are extended to cam 3015 as previously described. In position 16 these circuits are completed through key 2400, to ground at the inner right contact of relay 2504, advancing the master switches to the next terminal. The operation of relay 3013 advances switch 3000 to position 17 as previously described.

*Preparation of test circuit for testing SM senders.*—Since we assumed at this point of the description that switch 3140 was the last one serving the FM senders, master switches 3100 and 3110 are now stepped to their first spare terminals. A self-interrupting circuit is immediately closed for magnet 3101 over its back contact, spare terminals of brush 3102, conductor 3150, over the upper contact of cam 3005 to normal ground on conductor 3040. The circuit of magnet 3111 extends over its back contact and the strapped terminals of brush 3112 to grounded conductor 3151. These switches will therefore be stepped directly to their No. 21 terminal which has been shown in the present disclosure as connected to switches 3120 and 3130 which connect the test circuit to the SM senders.

With sequence switch 3000 in position 17 the following circuits are prepared: from battery through resistance 3012, upper right contact of cam 3017, upper contact of cam 3008, brush 3105 and its No. 21 terminal, brush 3137 and its normal terminal, back contacts of relay 2535, conductor 2536, brush 3104 and its No. 21 terminal, uppermost left operated contact of key 2400 to the upper contact of cam 3015; battery winding of relay 2537, conductor 2536, uppermost left operated contact of key 2400 to the upper contact of cam 3015, from battery through resistance 3012, winding of relay 3013, lower right contact of cam 3014, to cam 3015. Sequence switch 3000 is advanced to position 9 in the circuit from battery through its winding, upper left contact of cam 3016, conductor 3018, conductor 2534, upper normal contact of key 2419, conductor 2420, No. 21 terminal of brush 3102, conductor 3150, upper contact of cam 3005, to normal ground on conductor 3040.

When switch 3000 reaches position 18 the above traced circuits are completed over the lower right contact of cam 3015, right back contact of relay 2509, brush 3103, and its corresponding contact, brush 3113 and its corresponding contact, right back contact of relay 2519, left contacts of cam 3003 to normal ground on conductor 3040. Relay 2537 operates in this circuit, causing in turn the operation of relay 2535. Relay 2535 in operating extends the shunt around relay 3013 through the back contacts of the stepping magnets 3121 and 3131. Relay 2537 in operating, closes operating circuits for magnets 3121 and 3131 so that when these magnets operate the shunt is opened around relay 3013 and that relay operates and advances switch 3000 to position 1.

Relay 2500 is operated and locked as previously described over the normal ground on conductor 3040. The operation of relay 2500 advances switch 3000 to position 2. In position 2 a circuit is closed from battery, winding of relay 2525, brush 3112 and its No. 21 contact, conductor 3151, to ground at the lower left contact of cam 3006. The operation of relay 2525 closes a circuit from battery, winding of relay 2538, conductor 2539, right contacts of cam 3042, brush 3123 and its corresponding contact, conductor 3156, outer left contact of relay 2525, conductor 3151 to ground. Relay 2538 closes an obvious circuit for relay 2521 and for relay 2511. Relay 2511 in operating closes a circuit from battery, winding of sequence switch magnet 3000, upper left contact of cam 3004, conductor 3007, outer left front contact of relay 2511, conductor 2540, lower contacts of cam 3025 to ground. The operation of relay 2511 also transfers the locking circuit of relay 2500 from its right back contact to its inner left front contact, conductor 2514, lower contact of cam 3021, middle left contact of relay 2519, lowermost right normal contact of key 2404, brush 3116, and its corresponding contact, brush 3126 and its corresponding contact to conductor 3161. If the SM sender is idle, battery will be connected to conductor 3161 through the winding of relay 3203, lower left contact of cam 3202 and the contact of jack 3201. If it is busy ground will be connected thereto from the district selector associated therewith or from the back contact of relay 3203, if the sender is busy but restoring to normal.

As long as ground remains connected to conductor 3161 and relay 2500 remains locked, the test is not advanced. When the sender becomes idle and the locking circuit of relay 2500 is opened that relay releases and completes a circuit from ground at its left back contact, inner left front contact of relay 2511, conductor 2514, and thence as above traced to conductor 3161. This ground is extended through the winding of relay 3203 causing that relay to operate and close a locking circuit for itself over its left front contact and the lower right contact of cam 3202, which is completed when switch 3200 reaches position 2.

The release of relay 2500 also closes a circuit from battery, winding of sequence switch magnet 3000, lower left contact of cam 3004, conductor 3010, right back contact of relay 2500, left back contact of relay 2502 to ground, advancing sequence switch 3000 to position 4.

The operation of relay 3203 also closes an obvious circuit for relay 3204 and prepares a locking circuit for relay 3209. It also closes a circuit, initiating the timing operation involving relays 3205, 3206, 3207 and 3208 which results, if an undue period of time elapses before switch 3200 is restored to position 1, in the operation of an auxiliary signal and the lighting of lamp 3248. Relay 3203 also prepares a circuit from battery, winding of relay 3212, upper right contact of cam 3213, upper left contact of cam 3214, inner right contact of relay 3203, to conductor 3266. The operation of relay 3204 also connects conductor 3160, 3163 and 3164 through to the impulse control circuit and connects relay 3209 to conductor 3163.

When sequence switch 3000 reaches position 4 the circuit of relay 3212 is extended over conductor 3166, brushes 3133, 3132 and 3122 in series, brush 3117, inner lower right normal contact of key 2404, inner left back contact of relay 2519, conductor 3043, contacts of cam 3024, conductor 1607, left back contact of relay 1600, back contacts of relays 1605 and 1606, resistances 1604, 1603 and 1602 to ground at the right back contact of relay 1601. Relay 3212 operates in this circuit and connects ground from the upper left contact of cam 3216, left front contact of relay 3212, upper left and lower right contact of cam 3217, middle right contact of relay 3204 to conductor 3160, brush 3127, conductor 3157, uppermost left normal contact of key 2404, conductor 2421, inner left contact of relay 2505, brush 3103, right back contact of relay 2509, left contacts of cam 3042, inner right contact of relay 2538, conductor 2541, right contacts of cam 1545, conductor 1552, upper right contact of cam 2017, winding of sequence switch magnet 2000 and battery. Sequence switch 2000 advances to position 2.

When switch 2000 reaches position 2 a circuit is completed from battery through the winding of relay 2109 to ground at the lower left contact of cam 2018. The operation of relay 2109 closes a circuit from battery through the winding of relay 1600, conductor 1627 to ground at the middle left contact of cam 2109. Relay 1600 in operating closes an obvious circuit for relay 1614. A circuit is also closed from battery, through the winding of relay 428, conductor 2019 to ground at the lower right contact of cam 2018. Relay 428 operates and closes obvious circuits for operating relays 426, 427 and 433. The operation of these relays establishes control circuits of the counting relays to take care of registration in semi-mechanical operation. The operation of relays 1600, 1614, 2109 and 2521 is to rearrange the control conductors to bring them under the control of sequence switch 2000 or otherwise as necessary for testing SM senders. The registers and class switch are set in the same manner as when testing FM senders, excepting that provision is made for differently cross-connecting the registers to switch 1700 and the relays controlled by it. After the registers have been positioned for the first test, switch 1700 is advanced to position 3 in the usual series circuit through the register relays. The class of call of the first test, that is to an operator's desk, is not usually required in connection with SM senders. Therefore, with switch 2000 in position 2, a circuit is at once closed from battery through the winding of sequence switch magnet 1700, upper left contact of cam 1729, conductor 1736, upper right contact of cam 2030 to ground, advancing switch 1700 to position 4, in which position the registers are set to impose conditions corresponding to a full mechanical call at the sender after which switch 1700 is advanced to position 5. When switch 1700 passes through position 3 a circuit is closed from battery through the winding of magnet 2000, lower left contact of cam 2020, conductor 2021, upper contacts of cam 1715, middle right contact of relay 1703 to ground; relay 1703 having been operated and locked in the usual manner with switch 1700 in position 2. Switch 2000 is advanced in the above traced circuit to position 3.

A circuit is now established from battery through the winding of relay 1000, right back contact of relay 1001, back contact of relay 4000, right back contact of relay 1002, right contact of key 1003, conductor 1004, left contacts of cam 2008, resistance 2103, winding of relay 2104, resistance 2110, conductor 2111, upper contact of cam 2001, conductor 2002, left back contact of relay 2107, conductor 2106, right contacts of cam 3030, conductor 3031, left back contact of relay 2520, conductor 2405, upper right normal contact of key 2404, brush 3107, brush 3135, conductor 3164, right front contact of relay 3204, right back contact of relay 3219, upper contact of cam 3220 to ground. Relay 1000 operates, but since relay 1614 is operated and switch 2000 has not yet reached position 14, no circuit is closed for relay 1613 and that relay is not operated. Relay 2104 operates and closes a circuit from ground at the back contact of relay 1009, conductor 2105 over the front contact of relay 2104, left back contact of relay 2112, conductor 2028, to cam 2027, from whence the circuit is extended over the lower contact of that cam and the cams of register 1400 to the proper counting relay. Assuming that register 1400 has been set in position 3 this circuit will extend over the lower contact of cam 2027, conductor 1303, lower right contact of cam 1411, conductor 450, right back contact of counting relay 420, winding of relay 419, conductor 1115, left contact of cam 1114, conductors 1513 and 2026, upper right contact of cam 2025 to battery.

The circuit is also closed from battery through the winding of relay 3209, upper contacts of cam 3218, outer right front contact of relay 3204, conductor 3163, brush 3125, brush 3115, conductor 3153, lowermost left normal contact of key 2404, upper contacts of cam 3023, conductor 3034, upper contact of cam 2004 to ground. Relay 3209 operates and locks over its left front contact, to the middle right contact of relay 3203. The operation of relay 3209 extends conductors 3163 and 3165 to the sender control circuit. It also closes a circuit from battery, through the winding of sequence switch magnet 3200, lower left contact of cam 3221, outer right front contact of relay 3209 to ground advancing sequence switch 3200 to position 2.

With switch 3200 in position 2 a circuit is extended from the lower right contact of cam 2008, over conductor 2009, back contact of relay 505, conductor 506, back contact of relay 1018, left back contact of relay 1001, conductor 1631, back contact of relay 1630, conductor 2022, lower right contact of cam 2015, conductor 3036, contacts of cam 3035, conductor 2410, inner lower left normal contact of key 2404, conductor 3154, brush 3106, brush 3134, conductor 3162, inner right contact of relay 3204, upper left contact of cam 3222, conductor 2637, which is connected to the cams 2603, 2613, etc. to 2683. The contacts of these cams are connected to conductor 2638 which extends in position 2 of switch 3200 over the upper contacts of cam 3217, right front contact of relay 3212 to ground at the upper left contact of cam 3216. This circuit forms a branch of the circuit of relay 1000 and is in shunt of the winding of relay 2104.

Relay 1000 in operating closes a circuit from ground at its front contact, over conductor 1615, lower contacts of cam 2023, conductor 2024, inner left front contact of relay 1600, conductor 1607, contacts of cam 3024, conductor 3043, inner left contact of relay 2519, inner lower right normal contact of key 2404, brush 3117, brush 3122, brush 3132, brush 3133, conductor 3166, inner right contact of relay 3203, upper left contact of cam 3214, upper right contact of cam 3213, over the right front contact of relay 3212, lower right contact of cam 3224, upper left contact of relay 3225, conductor 2636, upper right contact of cam 2605, winding of tandem hundreds register magnet 2600 and battery.

*Setting the register switches of SM sender.*—Sequence switch 2600 is energized in this circuit and moves the switch out of position 1 and through its subsequent positions. As it passes positions 1⅜, 2⅜, etc., the circuit previously traced in shunt of relay 2104 is completed and that relay releases. Each release of the stepping relay causes the locking of a pair of the counting relays of Fig. 4 in the usual manner. When switch 2600 passes through position 3⅜ and switch 2104 is released the third time, relays 424 and 400 operate in the locking circuit of relay 423. The operation of relay 400 opens the circuit of relay 1000 which in turn opens the circuit of sequence switch 2600 bringing the register to rest in position 4, and releasing relay 3212.

The operation of relay 424 closes a circuit from battery through the winding of relay 1018, conductor 1019, outer left contact of relay 427, front contact of relay 424, inner left front contact of relay 427 to ground. Relay 1018 in operating closes a circuit from battery through the winding of sequence switch magnet 2000, upper left contact of cam 2020, conductor 2029, front contact of relay 1018 to ground. Sequence switch 2000 advances to position 5 in this circuit. In passing from position 3 to position 5 switch 2000 opens the locking circuit of the counting relays. When switch 2000 leaves position 3¾ a circuit is closed from battery through the winding of relay 1001, conductor 1020, lower right contact of cam 2010 to ground. The operation of relay 1001 disconnects relay 1000 from the fundamental circuit.

As soon as switch 2600 is brought to rest in position 4 translator 2460 is selected by the operation of relay 2704 in the manner described. Relay 2606 is also operated. The operation of relay 2703 advances sequence switch 3200 to position 3 as previously described.

With switch 2000 in position 5 and switch 3200 in position 3 the fundamental circuit is extended from battery, through the winding of relay 3227, lower left and upper right contacts of cam 3228, conductor 2646, off normal contact of cam 2602, normal contacts of cams 2612, 2622, etc. to 2682, conductor 2637, left contact of cam 3222, inner right contact of relay 3204, conductor 3162, brush 3134, brush 3106, conductor 3154, inner lower left normal contact of key 2404, conductor 2410, contacts of cam 3035, conductor 3036, lower right contact of cam 2015, conductor 2022, back contact of relay 1630, conductor 1631, front contact of relay 1001, back contact of relay 400, right back contact of relay 1002, right contact of key 1003, conductor 1004, left contacts of cam 2008, resistance 2103, winding of stepping relay 2104, resistance 2110, conductor 2111, upper contact of cam 2001, conductor 2002, back contact of relay 2107, conductor 2106, right contacts of cam 3030, conductor 3031, back contact of relay 2520, conductor 2405, upper right normal contact of key 2404, brush 3107, brush 3135, conductor 3164, right front contact of relay 3204, right back contact of relay 3219, upper right contact of cam 3220 to ground. Relays 3227 and 2104 operate in this circuit, relay 2104 closing a counting relay circuit similar to that traced in position 3 of switch 2000. Relay 3227 operates and locks over its right front contact and the upper right contact of cam 3222 to the end conductor 3162 to the fundamental circuit independent of the contacts of the register cams.

The operation of relay 3227 closes a circuit from battery through the winding of relay 3212, upper contacts of cam 3213, right front contact of relay 3227 to ground. Relay 3212 operates and extends ground over its front contact, lower right contact of cam 3224, lower left contact of cam 3225, left contact of cam 2614 to the winding of register magnet 2610 starting switch 2610 out of its normal position indicated by N.

As switch 2610 passes through position N⅜ 1⅜, etc. a circuit is intermittently completed through the winding of relay 3227 and its front contact, over the upper contacts of cam 3222, conductor 2637, upper contact of cam 2613, conductor 2638, upper contacts of cam 3217, left front contact of relay 3212, to ground at the upper left contact of cam 3216. This circuit serves to hold relay 3227 operated and shunts the stepping relay 2104 in the usual manner. When sufficient counting relays have been energized and locked up relays 400 and 424 will be operated in the manner previously described, relay 400 opening the fundamental circuit and relay 424 causing the operation of relay 1018. The opening of the fundamental circuit causes the release of relay 3227 and brings register 2610 to rest. The operation of relay 1018 advances sequence switch 2000 to position 7. The release of relay 3227 opens the circuit of relay 3212 and that relay closes a circuit for advancing sequence switch 3200 to position 4.

Switch 2620 is set in position 4 of 3200 and 7 of 2000. When relay 424 operated at the completion of this set of operations, relay 1018 operates and advances switch 2000 to position 8. A circuit is immediately closed from battery, winding of sequence switch 2000, lower right contact of cam 2017, right back contact of relay 2112, conductor 2113, upper right contact of cam 2030 to ground, in which circuit sequence switch 2000 is advanced to position 17. When sequence switch 2000 reaches position 17 a circuit is closed from battery through the winding of relay 2114, left back contact of relay 2115, lower right contact of cam 2030 to ground. Relay 2114 locks in a circuit over the outer left back contact of relay 2116, outer right front contact of relay 2114, outer left front contact of relay 2109, upper right contact of cam 2013 to ground. This circuit remains closed until sequence switch 2000 has reached position 5 of its second revolution. Relay 2114 also closes a holding circuit for relay 2109 while sequence switch 2000 is passing through position 1. The operation of relay 2114 closes a circuit from battery through the winding of magnet 2000, lower contact of cam 2031, right back contact of relay 2115, outer left front contact of relay 2114 to ground, advancing sequence switch 2000 to position 1.

With sequence switch 2000 in positions 1 and 2 a circuit is closed from battery, through the winding of relay 2112, middle right contact of relay 2114, upper left contact of cam 2018, to ground. This relay locks over its right front contact, conductor 2113, to the upper right contact of cam 2030 as soon as switch 2000 reaches position 2.

As soon as switch 2000 reaches position 18, with relay 2114 operated, the circuit of relay 1001 is extended from conductor 1020 over the inner right contact of relay 2114, to the lower right contact of cam 2013, the original circuit of that relay having been opened when switch 2000 left position 13¼. Switch 2000 is advanced to position 2 in a circuit over the upper right contact of cam 2017, over conductor 2032, to ground at the middle left contact of cam 2112. Switch 2000 is then advanced out of position 2 over the lower left contact of cam 2020, conductor 2021, upper contacts of cam 1715 to ground at the middle right contact of cam 1703 which is still operated, since switch 1500 has not left position 1.

With switch 2000 in position 3 and switch 3200 in position 5 incoming brush register 2630 is positioned. It will be noted that the counting relay circuit in the testing device will now extend over the outer left front contact of relay 2112 and conductor 2117 to cams 2033 and 2041 and to cams of the numerical registers. Incoming group register 2640 is set with switch 2000 in position 5 and 3200 in position 6. Final brush register 2650 is set with switch 2000 in position 7 and 3200 in position 7. Final tens register 2600 is set with 2000 in position 9 and switch 3200 in position 8. Final units register 2670 is set with switch 2000 in position 11 and switch 3200 in position 9. Stations register 2680 is set with switch 2000 in position 13 and switch 3200 in position 10, these sequence switches being advanced from position to position in the manner previously described. Due to the operation of relay 2112 the previously traced circuit for advancing sequence switch 2000 out of position 8 is opened.

After the setting of stations register 2680, sequence switch 2000 is moved to position 14 and sequence switch 3200 to position 11. When sequence switch 2000 reached position 10, battery was connected to one side of the winding of relay 2115 over the lower right contact of cam 2037. Since the other terminal of this relay had already been connected through the right front contact of relay 2112 to ground at the upper right contact of cam 2030, relay 2115 is operated in position 10 of switch 2000. When switch 2000 leaves position 13¼ the circuit of relay 428 is opened and that relay releases in turn releasing relays 427, 433 and 426. The release of these relays restores the counting relays to their previous condition where they are ready to check the control of selections by the sender. When switch 2000 reaches position 14 a circuit is closed from battery through the winding of sequence switch magnet 1500, upper left contact of cam 1506, conductor 1507, right back contact of relay 1104, conductor 1106, lower right and upper left contacts of cam 2006, conductor 2042, inner left front contact of relay 2115, conductor 3027, upper right contact of cam 1505 to ground. Sequence switch 1500 advances in this circuit to position 2 and opens at the upper right contact of cam 1505 the locking circuit of relay 1703.

As soon as sequence switch 3200 reaches position 5 a circuit is closed from battery through the winding of sequence switch magnet 2600, upper right contact of cam 2605, left contacts of cam 3309, right contacts of cam 3226, front contact of relay 2704, to ground advancing the register sequence switch to position 6. The setting of the translator under the control of sequence switch 2600 has already been described in connection with the operation of the sender and need not be repeated.

With the translator positioned the relays of Fig. 28 are operated and locked in the manner described, after which sequence switch 3400 is positioned and switch 3300 is advanced to position 2. Since switch 3200 is adready advanced beyond position 5, a circuit is immediately closed from battery through the winding of relay 3301 and the windings of relays 3302 and 3303 in parallel, upper contacts of cam 3315, upper left contact of cam 3232 to ground. Relays 3301, 3302, and 3303 operate. The operation of relay 3302 closes a circuit from battery, winding of sequence switch magnet 3300, upper left contact of cam 3323, upper contacts of cam 3322 to ground at the front contact of relay 3302, advancing switch 3300 to position 3 whereupon the above traced circuit for relays 3301 and 3302 and 3303 is opened and these relays release.

*Checking sender for control of selections.*—With switch 1500 in position 2 a fundamental circuit is closed for checking district brush selections. This circuit may be traced from battery through the winding of relay 1000, right back contact of relay 1001, back contact of relay 400, right back contact of relay 1002, right contact of key 1003, conductor 1004, upper right and lower left contacts of cam 2008, conductor 2009, back contact of relay 505, conductor 506, lower contact of cam 1508, conductor 1509, conductor 2101, inner back contact of relay 2100, right contacts of cam 2003, conductor 3033, upper contacts of cam 3032, inner upper left normal contact of key 2404, conductor 3152, brush 3114, brush 3124, conductor 3165, middle right contact of relay 3209, lower right contact of cam 3234, right contacts of cam 3309, to the winding of either relay 3306 or 3329, a lower contact of cam 3421, conductor 3422, back contact of relay 3303, winding of relay 3307, upper contact of cam 3327, resistance 3330, upper contacts of cam 3326, to ground at the upper left contact of cam 3232.

Assuming that class switch 3400 has been set in position 10, relay 3329 will be employed in making selections in this case. Relays 1000 and 3329 operate in this circuit. Relay 3307 is polarized and does not receive current in the right direction to operate it. Relay 1000 in operating closes a circuit for relay 1613 as previously described, which in turn causes the operation of relay 1005 and of relay 1002. The functioning of interrupter 1007 and the check of the selections is the same as described for a full mechanical call in connection with the FM sender.

Assuming that relay 2812 alone of the district brush register has been operated, the operation of relay 3306 will close a counting relay circuit from battery over the lower left contact of cam 3314, winding of counting relay 3339, right contact of relay 3338, conductor 3337, to conductor 2814, outer right front contact of relay 2812, right back contact of relay 2813, conductor 2841, lower contact of cam 3432, inner right back contact of relay 2702, conductor 3344, lower left contact of cam 3310, left contacts of cam 3233, upper contacts of cam 3321, front contact of relay 3329, lower contact of cam 3320 to ground. The counting relay 3339 operates in this circuit and closes the usual locking circuit for itself through the winding of relay 3338. The further operation of checking selections is the same as described for a FM sender.

When switch 1500 reaches position 8 a circuit may be traced from battery through the winding of sequence switch magnet 2000, upper left contact of cam 2031, left contacts of cam 1531, right contacts of cam 2038, to ground, advancing sequence switch 2000 to position 15. With sequence switch 2000 in position 15 a circuit is closed from ground over the second contact of the middle left armature of relay 2112, resistance 2039, upper contact of cam 2015, conductor 3036, contacts of cam 3035, conductor 2410, inner lower left normal contact of key 2404, conductor 3154, brush 3106, brush 3134, conductor 3162, inner right front contact of relay 3204, left contact of cam 3222, conductor 2637, off normal contact of cam 2682, right contacts of cam 3228, winding of relay 3236 to battery. Relay 3236 operates and closes a circuit from battery through the winding of relay 3237, contact of relay 3236, upper right contact of cam 3225, lower left contact of cam 3224 to ground. Relay 3237 operates and locks over the left normal contact of relay 3219, upper right contact of cam 3225, lower left contact of cam 3224 to ground. The operation of relay 3237 connects tone to conductor 3164.

In the meantime sequence switch 3300 has been advanced to position 13 after the completion of office group selection, and a circuit is closed from battery winding of relay 3350, lower right contact of cam 3316, upper left contact of cam 3317 to ground, causing the operation of this relay. A circuit is also closed from battery through the winding of relay 3238, upper right contact of cam 3216, upper left contact of relay 3217 to ground, causing the operation of that relay. When relay 3237 is operated a circuit is closed from battery through the winding of relay 3219, conductor 3249, right contact of cam 3409, conductor 3412, inner left contact of relay 3238, inner right front contact of relay 3237, left normal contact of relay 3219, upper right contact of cam 3225, lower left contact of cam 3224 to ground. Relay 3219 in operating closes a locking circuit for itself over its inner right front contact, upper left contact of cam 3230 to ground. Relay 3219 also extends the locking circuit of relay 3237 over its outer right contact to cam 3231 before it opens the previously traced circuit of that relay. The operation of relay 3219 closes a circuit from battery through the winding of sequence switch magnet 3200, upper right contact of cam 3221, middle right contact of cam 3219, upper right contact of cam 3225, lower left contact of cam 3224 to ground advancing switch 3200 to position 12. A circuit is now closed from battery, through the winding of sequence switch magnet 3200, upper left contact of cam 3229, off normal contact of cam 2681, back contact of relay 3212, outer left contact of cam 3238, upper left contact of cam 3232 to ground advancing sequence switch 3200 to position 13. As soon as switch 3200 reaches position 13 a circuit is closed through the winding of sequence switch magnet 3300, upper right contact of cam 3324 to ground at the lower right contact of cam 3231, advancing switch 3300 to position 14.

With sequence switch 1100 in position 5, 1500 in position 8, 2000 in position 15, 3200 in position 13, 3300 in position 14, the testing circuit through the winding of relay 430 is reestablished extending in the sender as described in the operation thereof. Relay 3311 operates in turn operating relays 3313 and 3315 as described. The operation of relay 3315 closes a circuit from ground over the right contact of cam 3414, lower left contact of cam 3324, winding of sequence switch magnet 3300 advancing sequence switch to position 1.

Switch 3300 is advanced out of position 1 in a circuit over the upper right contact of cam 3324, lower right contact of cam 3321 to ground. When switch 3300 arrives in position 2, switch 3200 is advanced to position 14. With switch 3200 in position 14 and switch 3300 in positions 2, 4, 6, 8 and 10 the incoming and final selections are checked, with switch 1500 passing through positions 9, 10, 11, 12 and 13 as described in connection with the FM sender. At the completion of these selections switch 1500 will be in position 14, 2000 in position 15, 3200 in position 14, 3300 in position 13, 1100 in position 16. When switch 3300 arrives in position 13 the circuit is closed for operating relay 3350 and relay 3228 as previously described. Sequence switch 3300 advances to position 14 in a circuit over the upper right contact of cam 3324, lower right contact of cam 3231 to ground. When switch 3300 leaves position 13 relay 3238 releases. A circuit is now established from battery through resistances 535 and 536, winding of relay 537 and thence as traced in the testing of the FM sender, brush 3115, brush 3125, conductor 3163, inner right contact of relay 3209, right back contact of relay 3242, left contact of cam 3241, conductor 3245, right contacts of cam 3418, lower contacts of cam 3419, lower left contact of cam 3308, winding of relay 3307, back contact of relay 3303, conductor 3422, left contact of cam 3421, winding of relay 3329, right contacts of cam 3309, conductor 3235, right contact of cam 3234, middle right contact of relay 3209, conductor 3165 and thence as traced to ground at the lower right contact of cam 514.

The current in this circuit is of the correct strength and direction to cause the operation of relay 3307 and that relay operates in addition to relay 3329. The joint operation of relays 3329 and 3307 closes a circuit from battery through the winding of relay 3301, back contact of relay 3304, conductor 3342, front contact of relay 3350, front contact of relay 3307, upper left contact of cam 3246, upper right and lower left contact of cam 3233, upper contacts of cam 3221, front contact of relay 3329, lower contact of cam 3320 to ground. Relay 3301 operates in this circuit and locks through the windings of relays 3302 and 3303 in parallel, left back contact of relay 3344, left front contact of relay 3301 to ground at the left contacts of cam 3317.

Relay 527 operates and closes a circuit from battery through the winding of relay 1613, left contacts of cam 2014, conductor 1615, conductor 1013, lower contact of cam 530, front contact of relay 527 to ground. Relay 1613 operates and closes a circuit from battery, through the winding of sequence switch magnet 1500, lower left contact of cam 1506, inner right contact of relay 1613, conductor 1621, lower right and upper left contacts of cam 1127, lower left contact of cam 514 to ground, advancing sequence switch 1500 to position 15 and opening the fundamental circuit traced. The opening of this circuit permits the release of relays 3329 and 3307, and permits relays 3302 and 3303 to operate in the locking circuit of relay 3301. Relay 3303 holds the fundamental circuit open and relay 3302 closes the circuit from battery, winding of relay 3347, left front contact of relay 3300, front contact of relay 3302 to ground.

Relay 3347 operates and locks over its inner left contact to ground at the upper right contact of cam 3222. It also connects ground over the lower right contact of cam 3216, inner right contact of relay 3247, middle right contact of relay 3204 to conductor 3160 whence it is extended as previously described to the conductor 2541 over the upper right contact of cam 2020, winding of sequence switch 2000 and battery, advancing that sequence switch to position 16.

When switch 2000 reaches position 15¾ a circuit is closed from battery through the winding of relay 3227, upper contacts of cam 3214, inner right contact of relay 3203, conductor 3166, brush 3133, 3132, 3122 and 3117, inner lower right normal contact of key 2404, inner left contact of relay 2519, conductor 3043, contact of cam 3024, conductor 1607, inner left front contact of relay 1600, conductor 2024 lower right and upper left contacts of cam 2023, conductor 2032, middle contact of relay 2112 to ground. Relay 3227 operates, opening the locking circuit of relay 3212 which was operated in position 14 of switch 3200 as described in the operation of the sender, and extends ground from conductor 3166 by which it is operated, over its front contact, outer left contact of relay 3247, left contact of relay 3204 to conductor 3164, brush 3135, brush 3107, uppermost right normal contact of key 2404, conductor 2405, left back contact of relay 2520, conductor 3031, right contacts of cam 3030, conductor 2106, right contact of relay 2107, winding of relay 2116, outer right front contact of relay 2115, resistance 2118, upper left contact of cam 2025, to battery. Relay 2116 operates and closes a circuit from battery through the winding of sequence switch magnet 2000, lower left contact of cam 2017, inner right contact of relay 2116 to ground advancing sequence switch 2000 to position 17.

When switch 2000 leaves position 16 the circuit of relay 3227 is opened and that relay releases. When switch 2000 arrives in position 17 a circuit is closed from battery over the lower right contact of cam 2025, through the winding of relay 2107, conductor 2124, lower right contact of cam 511 to ground. Relay 2107 operates and connects ground over its right front contact, to conductor 2106 and thence to conductor 3164, left contact of relay 3204, outer left contact of relay 3247, right back contact of relay 3227, outer right front contact of relay 3247, back contact of relay 3212, middle right front contact of relay 3247, lower right contact of relay 3221, winding of sequence switch magnet 3200, to battery. This circuit advances sequence switch 3200 out of position 14 and it continues to position 17 under the control of its master cam.

As switch 3200 passes through position 15 relay 3230 is released and the locking circuits of the register relays are opened. When sequence switch 3200 reaches position 17 the circuit from ground to conductor 3164 is extended over the left contact of relay 3204, outer left front contact of relay 3247, right back contact of relay 3227, outer right front contact of relay 3247, back contact of relay 3212, middle right front contact of relay 3247, left contacts of cam 3214, inner right front contact of relay 3203, conductor 3166, brushes 3133, 3132, 3122 and 3117, inner lower right normal contact of key 2404, inner left back contact of relay 2519, conductor 3043, contacts of cam 3024, conductor 1607, inner left front contact of relay 1600, conductor 2024, middle contact of relay 2100, right contacts of cam 2040, inner left back contact of relay 2116, back contact of relay 2119, conductor 2120, lower right contact of cam 543, conductor 544, lower left contact of cam 1518, winding of sequence switch magnet 1500 to battery advancing sequence switch 1500 to position 16.

As sequence switch 1500 arrives in position 16 a circuit is completed from battery, through the winding of relay 2108, outer left front contact of relay 2109, conductor 2021, right contacts of cam 1553, conductor 1554, inner upper left normal contact of repeat key 2415, inner lower right operated contact of multi-test key 2401, conductor 2422, lower left contact of cam 1701 to ground. Relay 2108 operates and locks over its left front contact, to conductor 2121. It disconnects ground from the winding of relay 3203 and that relay releases in turn releasing relays 3209 and 3204. The release of relay 3204 connects ground over the lower right contact of cam 3202, contact of jack 3201, to conductor 3161, holding the circuit busy until the sender returns to normal condition. The release of relay 3209 closes a circuit from battery through the winding of sequence switch magnet 3200, upper left contact of cam 3221, right back contact of relay 3209 to ground advancing this sequence switch to position 18.

When sequence switch 3200 reaches position 18 a circuit is closed from battery through the winding of magnet 3300, lower right contact of cam 3324, lower left contact of cam 3232, to ground, advancing sequence switch 3300 to position 17. If sequence switch 3460 and 3430 are normal at this time, a circuit is at once closed from battery through the winding of magnet 3300, lower left contact of cam 3323, conductor 3343, upper left contact of cam 2706, outer left contact of cam 2702, lower right contact of cam 2607 to ground. It is then advanced to position 1 in a circuit over the lower contacts of cam 3319, left contacts of cam 3162, right contact of cam 3431 to ground.

When switch 3200 reaches position 18 the registers relays restore to normal as previously described. Sequence switch 3200 is then advanced to position 1 in a circuit over the left contacts of cam 3226, normal contacts of the registers, conductor 3639, lower contacts of cam 3213, upper left contact of cam 3320 to ground.

When switch 1500 reaches position 16 as previously described, a circuit is completed from battery through the winding of sequence switch magnet 1100, lower right contact of cam 1123, conductor 1126, lower right contact of cam 1529, conductor 1530, back contact of relay 1616, upper contact of cam 1511 to ground. This advances sequence switch 1100 to position 17. Switch 1100 is then advanced to position 18 in a circuit over the upper left contact of cam 1117, middle back contact of relay 1104, upper right and lower left contacts of cam 513 to ground. A circuit is then closed from battery through the winding of relay 1616, left back contact of relay 1617, right back contact of relay 1613, (which released when sequence switch 2000 left position 17), lower contacts of cam 1515, conductor 1539, lower left and upper right contacts of cam 1127, conductor 1128, lower left contact of cam 2030 to ground. Relay 1616 operates and closes a circuit from battery through the winding of sequence switch magnet 1500, right contact of cam 1518, right back contact of relay 1617, left front contact of relay 1616, upper contact of cam 1511 to ground, advancing sequence switch 1500 to position 18.

When sequence switch 1500 reaches position 17 it closes a circuit from battery through the winding of relay 1601, to ground at the lower left contact of cam 1505. The operation of relay 1601 closes a circuit from battery through the winding of magnet 1100, lower left contact of cam 1123, conductor 1137, outer right front contact of relay 1601 to ground, advancing that sequence switch to position 1.

When sequence switch 1500 reaches position 18 a circuit is closed from battery through the winding of sequence switch magnet 2000, lower contact of cam 2031, inner right front contact of relay 2115, upper right contact of cam 1555 to ground, advancing sequence switch 2000 to position 1. When sequence switch 2000 leaves position 18 relays 2109, 1600, 1614 and 2115 release. The release of relay 2109 connects ground over its middle right contact, upper contact of cam 3021, middle left contact of cam 2519, lowermost right normal contact of key 2404, brush 3116, brush 3126, conductor 3161, contact of jack 3201, left contact of cam 3202, winding of relay 3203 to reselect the sender for the second test. A circuit is also closed from ground over the right contact of cam 1540, winding of relay 1619, resistances 1602, 1603, 1604, back contacts of relays 1605 and 1606, left back contact of relay 1600, conductor 1607, contacts of cam 3024, conductor 3043, inner left contact of relay 2519, inner lower right normal contact of key 2404, brush 3117, brushes 3122, 3132 and 3133, conductor 3166, over the inner right front contact of relay 3203 as previously described for initiating the operation of the sender in connection with the second test. The operation of relay 1619 closes a circuit from battery through the winding of sequence switch magnet 1500, upper right contact of cam 1506, lower right and upper left contacts of cam 1124, front contact of relay 1619, inner front contact of relay 1601 to ground advancing sequence switch 1500 to normal, in which position the circuit of relay 1601 is opened. The sender is then tested for the second type of call and succesively for other types as mentioned in connection with the FM sender.

The operation of the relay call indicator impulse switch 3460 is essentially the same as any other relay call indicator switch, as for example, that described in the patent to E. W. Hancock above referred to. The sequence switch 3430 is employed in connection with certain routings to alter the cross connections but does not alter the operation materially and hence will not be described.

The use of the keys of Fig. 24 to make special tests and the operation of the testing device at the end of the test are substantially the same as described in the above mentioned patent to W. L. Dodge and will not be described.

What is claimed is:

1. In a system for testing senders employing registers of different types, a testing device for testing the senders, means in said testing device for setting the registers of each type and means for varying the operation of said testing device in accordance with the type of registers employed by the sender to be tested.

2. In a system for testing register senders of a plurality of types, a testing device, means in said testing device for generating code impulses for setting the registers of one type of sender, means comprising a stepping relay and a set of counting relays to position the registers of the second type of sender, and means for discriminating between said register setting means in accordance with the type of sender to be tested.

3. In a sender testing device, a plurality of counting relays, means for employing said counting relays to control the setting of registers in a sender under test, means for employing said counting relays to check the selecting operation of the sender, means to control said counting relays in each of these operations and means to discriminate between said control means in accordance with the function to be performed.

4. In a testing device for testing register senders, a set of counting relays, means to control the operation of said counting relays to set the registers in the sender to be tested, means for controlling the operation of said counting relays to check the selecting operations of the sender and means to extend the circuits of said counting relays to one control device or to the other during the period necessary.

5. In a system for testing senders employing registers set by code impulses and senders employing registers whose setting is determined by revertive impulses from the registers themselves, a sender testing device for testing both types of senders, comprising means for sending code impulses to set one type of register, means for receiving revertive impulses to determine the setting of the other type of registers, means for checking selections by either type of sender and means for selecting the proper type of register setting apparatus in accordance with the type of register to be set.

6. In a system for testing senders certain of which are primed by code impulses and others of which are primed by means of revertive impulses from the sender, a testing device for testing said senders, comprising separate means for priming each type of sender and means for checking the selection control operation of either sender.

7. In a testing device for testing senders of a plurality of types, a plurality of selector switches for connecting with said senders, said switches being divided into groups according to the type of sender to be connected with, master switches for connecting with said selector switches, circuits for controlling the operation of each type of sender and means for discriminating between the control circuits to be employed in accordance with the position occupied by said master switches.

8. In a testing device for testing senders of a plurality of types, a plurality of selector switches for connecting with said senders, said switches being divided into groups according to the type of sender to be connected with, master switches for connecting with said selector switches, sequence switches for respectively controlling the setting of the registers of each type of sender and means for automatically initiating the operation of the proper sequence switch in accordance with the position occupied by said master switches.

9. A testing device for testing register senders, means for establishing a fundamental circuit connecting said testing device with the stepping relay of the sender to be tested, a stepping relay in said testing device, counting relay circuits under the control of each of said stepping relays, and means for simultaneously deenergizing said stepping relays to cause the simultaneous progressive operation of said counting relays to check the ability of the sender to control selections.

10. A testing device for testing register senders, means for establishing a fundamental circuit connecting said testing device with the stepping relay of the sender to be tested, a stepping relay in said testing device, counting relay circuits under the control of each of said stepping relays, an interrupter, and means for causing said interrupter to simultaneously deenergize said stepping relays to cause the simultaneous progressive operation of said counting relays to check the ability of the sender to control selections.

11. A testing device for testing register senders, means for establishing a fundamental circuit connecting said testing device with the stepping relay of the sender to be tested, a stepping relay in said testing device, counting relay circuits under the control of each of said stepping relays, and means in said testing circuit for simultaneously shunting said stepping relays to cause the simultaneous progressive operation of said counting relays to check the ability of the sender to control selections.

12. A testing device for testing register senders, means for establishing a fundamental circuit connecting said testing device with the stepping relay of the sender to be tested, a stepping relay in said testing device, counting relay circuits under the control of each of said stepping relays, an interrupter, and means in said testing circuit for causing said interrupter to simultaneously shunt said stepping relays to cause the simultaneous progressive operation of said counting relays to check the ability of the sender to control selections.

In witness whereof, I hereunto subscribe my name this 16th day of June, A. D., 1925.

EDGAR H. CLARK.